(12) United States Patent
Sakatani et al.

(10) Patent No.: US 7,394,395 B2
(45) Date of Patent: Jul. 1, 2008

(54) WIRELESS SENSOR, ROLLING BEARING WITH SENSOR, MANAGEMENT APPARATUS AND MONITORING SYSTEM

(75) Inventors: Ikunori Sakatani, Kanagawa (JP); Kouichi Morita, Kanagawa (JP); Takeshi Takizawa, Kanagawa (JP); Shigeru Endo, Kanagawa (JP); Tomoyuki Yanagisawa, Kanagawa (JP); Yoshio Shoda, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/362,158

(22) Filed: Feb. 27, 2006

(65) Prior Publication Data
US 2006/0145881 A1   Jul. 6, 2006

Related U.S. Application Data

(62) Division of application No. 10/212,051, filed on Aug. 6, 2002, now Pat. No. 7,034,711.

(30) Foreign Application Priority Data

| Aug. 7, 2001 | (JP) | P.2001-239700 |
| Aug. 21, 2001 | (JP) | P.2001-250800 |
| Aug. 27, 2001 | (JP) | P.2001-255989 |
| Nov. 1, 2001 | (JP) | P.2001-337018 |
| Mar. 26, 2002 | (JP) | P.2002-086611 |

(51) Int. Cl.
*G08B 21/00* (2006.01)

(52) U.S. Cl. ............... 340/679; 340/686.3; 384/91

(58) Field of Classification Search ......... 340/679, 340/682, 584, 870.16, 683, 686.3, 686.5; 73/593; 384/459, 448, 91
See application file for complete search history.

(56) References Cited

U.S. PATENT DOCUMENTS

| 4,406,169 | A | | 9/1983 | Ikeuchi et al. |
| 5,642,105 | A | * | 6/1997 | Duffy et al. ............ 340/870.17 |
| 5,701,119 | A | | 12/1997 | Jurras, III |
| 5,805,080 | A | | 9/1998 | Lemoine et al. |
| 6,161,962 | A | | 12/2000 | French et al. |
| 6,236,328 | B1 | * | 5/2001 | Smith et al. ............... 340/682 |
| 6,271,761 | B1 | | 8/2001 | Smith et al. |
| 6,324,899 | B1 | * | 12/2001 | Discenzo ................... 73/53.05 |
| 6,331,823 | B1 | * | 12/2001 | El-Ibiary ............... 340/870.16 |
| 6,529,135 | B1 | | 3/2003 | Bowers et al. |
| 6,535,135 | B1 | | 3/2003 | French et al. |
| 6,714,135 | B2 | * | 3/2004 | Froman et al. ............. 340/682 |

FOREIGN PATENT DOCUMENTS

EP   594 550 B1   4/1994

(Continued)

*Primary Examiner*—Phung T. Nguyen
(74) *Attorney, Agent, or Firm*—Sughrue Mion, PLLC

(57) ABSTRACT

The wireless sensor adds identification information peculiar to respective sensor modules to detection data of vibration, temperature, and soon, detected by the sensor modules respectively. The wireless sensor transmits the detection data with the identification information as a signal through a communication unit by radio waves. On the other hand, the management apparatus receiving the signal classifies and files the detection data on the basis of the identification information included in the signal. Then, the monitoring system is designed to make the management apparatus manage a plurality of wireless sensors attached to movable shafts of processing machines or the like.

46 Claims, 24 Drawing Sheets

FOREIGN PATENT DOCUMENTS

| | | |
|---|---|---|
| JP | 02155893 A | 6/1990 |
| JP | 9310721 A | 12/1997 |
| JP | 10-217964 | 8/1998 |
| JP | 11-125244 A | 5/1999 |
| JP | 11-235411 | 8/1999 |
| JP | 2000-048066 A | 2/2000 |
| JP | 2001-222668 | 8/2000 |
| JP | 2000-329593 | 11/2000 |
| JP | 2001-500597 A | 1/2001 |
| JP | 2001-138911 | 5/2001 |
| JP | 2001-138916 | 5/2001 |
| JP | 2001-151090 | 6/2001 |
| JP | 2001-184396 A | 7/2001 |
| JP | 2002542973 A | 12/2002 |
| JP | 2003-028151 A | 1/2003 |
| WO | 00/51869 A1 | 9/2000 |
| WO | WO 02/01086 A2 | 1/2002 |

* cited by examiner

AT INACTIVE ACCELERATION

AT ACTIVE ACCELERATION

WIRELESS SENSOR, ROLLING BEARING WITH SENSOR, MANAGEMENT APPARATUS AND MONITORING SYSTEM

This is a divisional of application Ser. No. 10/212,051 filed Aug. 6, 2002 now U.S. Pat. No. 7,034,711. The entire disclosure of the prior application, application Ser. No. 10/212,051 is hereby incorporated by reference.

BACKGROUND OF THE INVENTION

1. Field of the Invention

The present invention relates to a bearing unit with sensor which detects the condition (including vibration, temperature, rotation speed and the like) of a bearing, a gear box, a spindle or the like incorporated in machinery (for example, a movable body such as a railway vehicle, a car or a guided vehicle, or a mechanical equipment such as a continuous-casting machine or a rolling mill), so that preventive maintenance can be achieved thereon.

In addition, the invention relates to a linear motion unit with sensor which detects the condition (including vibration, temperature, speed and the like) of a ball screw, a linear guide or the like incorporated in a lathe, a machining center, an injection molder, semiconductor manufacturing equipment or the like, so that preventive maintenance can be achieved thereon.

In addition, the invention relates to a wireless sensor attached to an industrial machine or a vehicle such as a car or a railway vehicle so as to transmit signals showing running condition by wireless; a bearing unit or a linear motion unit having the wireless sensor; a management apparatus for receiving the transmitted signals; and a monitoring system using these.

2. Description of the Related Art

Bearings for supporting rotating shafts as axles of vehicle such as cars and railway vehicles, or linear motion units such as ball screws or linear guides and bearings applied to industrial machines such as processing machines or assembling machines may produce vibration (that is, a change of acceleration) due to motion or heat due to friction. Such vibration or temperature does not only affect the lives of the bearings or the linear motion units but also takes part in the accuracy of the industrial machines, the safety of the vehicles, and soon. It is therefore desired to measure the vibration and the temperature appropriately and monitor whether they are in the rated condition. In addition, the rotation speed of bearings is often monitored constantly or reported with constant period because the rotation speed is important to grasp the running condition of apparatus or the like to which the bearings are attached.

Therefore, a general-purpose vibration sensor with an accelerometer, a general-purpose temperature sensor with a thermocouple or the like, a rotation sensor for detecting rotation speed, or the like, is attached to a housing of a bearing or a movable element of a linear motion unit that is a target. Such a sensor is connected to a measuring device through a cable so as to monitor vibration, temperature or the like.

In a related-art bearing unit, for example, as shown in FIG. 30, a temperature sensor 1104 and a rotation speed sensor 1106 are disposed separately and independently on a housing 1102 in which a rolling bearing 1100 has been set. The running condition (a change of temperature, a change of rotation speed, and so on) of the rolling bearing 1100 is detected by the temperature sensor 1104 and the rotation speed sensor 1106.

Actually, the running condition of the rolling bearing 1100 includes not only the change of temperature, the change of rotation speed and the like but also impact vibration caused by an impact load from external force applied to the rolling bearing and abnormal vibration generated with abrasion, flaking, cracking or the like in the rolling bearing by way of example. When only the temperature sensor 1104 and the rotation speed sensor 1106 are provided as in the related-art bearing unit, it takes much time for temperature to be transmitted to a temperature measuring portion even if abnormality such as flaking occurs in the bearing. Further, when abnormality is slight, it is difficult to detect the abnormality in an early stage of the abnormality occurrence in which the bearing temperature does not increase so much.

In addition, when the temperature sensor 1104 and the rotation speed sensor 1106 are disposed separately and independently, it is necessary to secure a space therefor in the bearing unit. As a result, it is difficult to make the unit compact.

In addition, for example as a railway vehicle, signals of the temperature, the rotation speed and so on detected by the sensors 1104 and 1106 are transmitted to a control unit attached to the vehicle body side 10-20 m distant. Here, the rotation speed signal is a digital signal, and the temperature signal is an analog signal.

However, since the distance between the sensors 1104 and 1106 attached to the bearing unit and the control unit attached to the vehicle body side is 10-20 m, the signals of the rotation speed, the temperature and so on detected by the sensors 1104 and 1106 are easily distorted in their output waveforms or affected by noise due to the signal transmission. Particularly, the analog temperature signal is easily distorted in its output waveform or affected by noise, so as to cause the deterioration of measuring accuracy. In addition, when the temperature signal which is an analog signal is transmitted through a cable together with the rotation speed signal which is a digital signal, noise from the rotation speed signal may be superimposed on the analog temperature signal due to electromagnetic coupling (coupling based on electrostatic coupling, electromagnetic induction or electromagnetic waves).

Further, in such a related-art bearing unit with sensor, for example, as shown in FIG. 31, a vibration sensor 2104 and a temperature sensor 2106 are disposed on a housing 2102 in which a rolling bearing 2100 has been set. The vibration sensor 2104 and the temperature sensor 2106 are connected (wire-connected) to a monitor 2112 and a thermometer 2114 through cables 2108 and 2110 respectively. In this case, changes of condition in vibration and temperature appearing during the operation of the rolling bearing 2100 are detected by the vibration sensor 2104 and the temperature sensor 2106 respectively. The respective detection data is transmitted to the monitor 2112 and the thermometer 2114 through the cables 2108 and 2110. Then, on the basis of the detection data transmitted to the monitor 2112 and the thermometer 2114, a recorder 2116 performs recording/tabulating processing about the vibration condition and the temperature condition, while an alarm device 2118 performs monitoring/alarming processing about the change of vibration and the change of temperature.

In the related-art bearing unit with sensor, detection data from the vibration sensor 2104 and the temperature sensor 2106 is transmitted (wire-transmitted) through the cables 2108 and 2110 to the monitor 2112, the thermometer 2114 and so on installed externally. In this case, when the number of the vibration sensors 2104 and the temperature sensors 2106 installed increases, the number of the cables 2108 and 2110 for external transmission has to be increased so much. As a result, the wiring processing of the cables 2108 and 2110 becomes troublesome while the number of parts for the wiring processing increases so that the manufacturing cost of the unit increases. Further, a space for wiring the cables 2108 and 2110 has to be secured in the unit. Thus, the unit increases so much in scale. In addition, when great vibration is given externally, the cables 2108 and 2110 may be disconnected so that signals cannot be transmitted/received.

In addition, when the bearing 2100 and the housing 2102 move as those in a railway vehicle or a car, the monitor 2112 or a measuring instrument 2116 has to be mounted on the movable body of the railway vehicle or the like.

Further, even in the case of a fixed machine, when the bearing housing 2102 is removed frequently, the cables 2108 and 2110 have to be removed whenever the bearing housing 2102 is removed.

Since there is a limit in the frequency band of vibration waves that can be detected by the vibration sensor 2104 disposed in the related-art bearing unit, the vibration waves cannot be detected sensitively when vibration waves generated in the unit are infinitesimal. For example, the related-art vibration sensor 2104 can detect deformation or failure of a member generating comparatively great vibration waves. However, since initial symptoms of abnormal vibration such as infinitesimal deformation, microcrack, abrasion, flaking or peeling appear before the deformation or failure of the member, and the vibration at this time has a form of infinitesimal elastic waves (high frequency vibration) with a high-frequency component of 10 kHz or higher, the vibration condition cannot be detected sensitively. As a result, even if abnormality begins to appear in the rolling bearing 2100, the symptoms of the abnormality cannot be detected in an early stage. Thus, it is difficult to plan preventive maintenance for the unit.

Particularly, when the rolling bearing 2100 rotates at a low speed, vibration waves generated in the unit become infinitesimal. It is therefore difficult for the vibration sensor 2100 described above to detect the vibration waves accurately. As a result, it is impossible to grasp the abnormality of the bearing in an early stage. In addition, temperature increase in the unit rarely appears in the thermometer, either. Thus, it is impossible to grasp the symptoms of abnormality such as seizure in an early stage.

SUMMARY OF THE INVENTION

It is therefore a first object of the invention to provide a wireless sensor, a rolling bearing unit or a linear motion unit having no need of wiring for sending sensor signals; a management apparatus for receiving the signals; and a monitoring system used in combination of the wireless sensor, the rolling bearing unit or the linear motion unit with the management apparatus.

It is a second object of the invention to provide a bearing unit and a linear motion unit in which signals of rotation speed, temperature, vibration (acceleration) and so on can be transmitted to a control unit attached to the vehicle body side in the condition that there is negligible distortion in the output waveform or negligible influence of noise.

It is a third object of the invention to provide a bearing unit with sensor with a compact sensor in which the vibration condition of bearings can be detected with high accuracy.

It is a fourth object of the invention to provide a low-price and compact bearing unit with sensor and a low-price and compact linear motion unit with sensor in which the condition of vibration ranging from a low frequency to a high frequency can be detected.

In order to attain the foregoing objects, the invention is configured as follows.

(1) A wireless sensor for detecting normal condition or abnormality in one of a rolling bearing, a ball screw and a linear guide, having:
a detection unit for detecting a subject of detection;
a data processing unit for processing data detected by the detection unit; and
a communication unit for transmitting, by wireless, detection data processed by the processing unit.

(2) A wireless sensor according to (1), wherein:
the communication unit transmits, by wireless, the detection data processed by the processing unit together with identification information peculiar to the detection unit.

(3) A wireless sensor according to (1) or (2), wherein:
the detection unit includes at least one of a vibration sensor for detecting vibration, a temperature sensor for detecting temperature, and a rotation speed sensor for detecting rotation speed.

(4) A wireless sensor according to any one of (1) to (3), wherein:
in response to an instruction signal corresponding to identification information of the detection unit, the communication unit for performing transmission and reception transmits the detection data of the detection unit specified by the instruction signal together with the identification information.

(5) A wireless sensor according to any one of (1) to (4), wherein:
the communication unit converts one of information detected by the detection unit and information involved therein into digital information, and transmits the digital information.

(6) A bearing unit with sensor having:
outer and inner rings; and
a plurality of rolling elements disposed between the outer and inner rings; wherein:
one of the outer and inner rings is a stationary ring while the other is a rotating ring; and
a wireless sensor according to any one of (3) to (5), fixed integrally to one of the stationary ring and a member attached to the stationary ring, or provided to move integrally with one of the rotating ring and a member attached to the rotating ring.

(7). A bearing unit with sensor having:
a pair of first and second raceway rings rotating relatively through rolling elements;
a pulsar ring provided in the first raceway ring; and
a wireless sensor according to any one of (1) to (5), attached to the second raceway ring rotating relatively to the pulsar ring so as to be opposed to the pulsar ring.

(8) A bearing unit with sensor according to (7), wherein:
data about a periodic signal detected by the rotation speed sensor of the wireless sensor is transmitted in an FM modulation system in accordance with relative rotation between the pulsar ring and the wireless sensor.

(9) A bearing unit with sensor according to (7) or (8), wherein:
the communication unit transmits at least one of rotation number and rotation speed of the bearing unit obtained by the data processing unit on a basis of one of a wavelength and a frequency of a periodic signal generated in the rotation speed sensor in accordance with relative rotation between the pulsar ring and the wireless sensor.

(10) A bearing unit with sensor according to (7) or (8), wherein:
the communication unit transmits at least peculiar identification information at a breakpoint of each period of a periodic signal generated in the rotation speed sensor in accordance with relative rotation between the pulsar ring and the wireless sensor.

(11) A management apparatus having:
a communication tool for receiving a signal transmitted from one of a wireless sensor and a bearing unit having a detection unit for detecting a subject of detection; and
a signal processing unit for managing the received signal on a basis of identification information peculiar to at least one of the detection unit, the wireless sensor and the bearing unit, the identification information being included in the signal.

(12) A management apparatus having:
a communication unit for selectively receiving a signal transmitted from one of a wireless sensor and a bearing unit having a detection unit for detecting a subject of detection in accordance with identification information peculiar to the detection unit included in the signal, the selectively received signal including identification information registered in advance in the management apparatus.

(13) A management apparatus having:
a communication unit for receiving a signal transmitted from one of a wireless sensor and a bearing unit, and transmitting an instruction signal to make a request to one of the wireless sensor and the bearing unit for receiving the signal.

(14) A management apparatus according to any one of (11) to (13), wherein:
the management apparatus communicates with the wireless sensor and the bearing unit by digital signals.

(15) A monitoring system having:
one of a wireless sensor according to any one of (1) to (5) and a bearing unit according to any one of (6) to (10); and
a management apparatus according to any one of (11) to (14).

(16) A monitoring system having:
a plurality of wireless sensors according to any one of (1) to (5);
a plurality of bearing units according to any one of (6) to (10); and
management apparatus according to any one of (11) to (14);
wherein the management apparatus communicates with the wireless sensors and the bearing units by carrier waves of peculiar frequencies different from one another.

(17) A rolling bearing with sensor, having:
an outer ring and an inner ring which can rotate relatively to each other, one of the outer and inner rings being a stationary ring while the other is a rotating ring;
a plurality of rolling elements incorporated between the outer ring and the inner ring; and
a detection sensor unit provided in at least one of the stationary ring, a member attached to the stationary ring, the rotating ring and a member attached to the rotating ring, the detection sensor unit detecting condition of the rolling bearing;
wherein the detection sensor unit has a communication function for transmitting or transmitting/receiving data to or to/from outside by wireless.

(18) A rolling bearing with sensor according to (17), further having:
at least one relay unit which can transmit detection data detected by the detection sensor unit to outside by wireless.

(19) A rolling bearing with sensor according to (18), the relay unit including:
a communication unit which can convert the detection data from the detection sensor unit into a signal wave with a predetermined frequency component and transmit the signal wave to outside by wireless.

(20) A rolling bearing with sensor according to (18) or (19), wherein:
the detection sensor unit and the relay unit are electrically connected through a cable, and the detection data from the detection sensor unit is transmitted to the relay unit through the cable.

(21) A rolling bearing with sensor according to (18) or (19), the detection sensor unit including:
a communication unit which can convert the detection data of the detection sensor unit into a signal wave with a predetermined frequency component and transmit the signal wave to the relay unit by wireless.

(22) A rolling bearing with sensor according to any one of (19) to (21), wherein:
the signal wave is one of a radio wave, a light wave and an ultrasonic wave with a predetermined frequency component.

(23) A rolling bearing with sensor according to (18) or (19), wherein:
the detection sensor unit and the relay unit are electrically connected by use of electromagnetic induction; and
the detection sensor unit has a modulation circuit for modulating the detection data of the detection sensor unit into a predetermined modulated signal while the relay unit has a demodulation circuit for demodulating the modulated signal.

(24) A rolling bearing with sensor according to (17), wherein:
the detection sensor unit includes at least one of a vibration sensor, a temperature sensor, a rotation speed sensor and a pressure sensor.

(25) A rolling bearing with sensor according to (18), wherein:
signals from a plurality of detection sensor units having identification numbers respectively are relayed by relay units the number of which is smaller than the number of the detection sensor units.

(26) A rolling bearing with sensor according to (17), wherein:
the detection sensor unit has an acoustic detection sensor for detecting vibration condition of the rolling bearing; and
detection data detected by the acoustic detection sensor is transmitted to outside by wireless.

(27) A rolling bearing with sensor according to (26), wherein:
the acoustic detection sensor transduces a vibration wave generated mechanically into an electric signal.

(28) A rolling bearing with sensor according to (26) or (27), wherein:
the acoustic detection sensor having been incorporated in a sensor holder is set, and the sensor holder has an amplification circuit for amplifying an output of the acoustic detection sensor.

(29) A rolling bearing with sensor according to (28), wherein:
the sensor holder has a comparator for comparing the output of the acoustic detection sensor with a reference value and a counter for counting number of times of the output of the acoustic detection sensor exceeding the reference value within a predetermined time.

(30) A rolling bearing with sensor according to (28) or (29), wherein:
the sensor holder has a transmission circuit which can convert the output of the acoustic detection sensor into a signal wave with a predetermined frequency component and transmit the signal wave to output.

(31) A rolling bearing with sensor according to (31), wherein:
the signal wave is one of a radio wave, a light wave and an ultrasonic wave with a predetermined frequency component.

(32) A bearing unit with sensor having:
a rolling bearing having at least an outer ring, an inner ring and a plurality of rolling elements, at least one of the outer and inner rings being a rotating ring while the other is a stationary ring;

an integral-type sensor having at least one sensor for detecting condition of the bearing unit and a single sensor holder for including the sensor, the integral-type sensor being attached to one of the stationary ring and a member attached to the stationary ring; and at least one relay unit provided near one of the integral-type sensor and the bearing, the relay unit amplifying an output signal from the integral-type sensor or converting the output signal into a signal suitable for long distance transmission so as to transmit the output signal to a control unit provided outside the bearing unit.

(33) A bearing unit with sensor according to (32), wherein:

at least one of a rotation speed sensor, a temperature sensor and a vibration sensor is provided as the sensor for detecting condition of the bearing unit.

(34) A bearing unit with sensor according to (32) or (33), wherein:

the signal from the relay unit is extracted from the bearing unit to outside by use of a cable.

(35) A bearing unit with sensor according to (32) or (33), wherein:

the signal from the relay unit is extracted from the bearing unit to outside by wireless.

(36) A rolling bearing with sensor having:

an outer ring and an inner ring which can rotate relatively to each other, one of the outer and inner rings being a stationary ring while the other is a rotating ring;

a plurality of rolling elements incorporated between the outer ring and the inner ring;

at least one sensor provided in at least one of the stationary ring, a member attached to the stationary ring, the rotating ring and a member attached to the rotating ring, the sensor measuring at least vibration condition of the rolling bearing; and a board fixed to the sensor holder by screwing.

(37) A rolling bearing with sensor having:

an outer ring and an inner ring which can rotate relatively to each other, one of the outer and inner rings being a stationary ring while the other is a rotating ring;

a plurality of rolling elements incorporated between the outer ring and the inner ring; and at least one sensor provided in at least one of the stationary ring, a member attached to the stationary ring, the rotating ring and a member attached to the rotating ring, the sensor measuring at least vibration condition of the rolling bearing;

a board in which a portion mounted with the sensor and various electronic elements is surrounded by one of flexible silicon rubber and forming rubber, and then molded with hard molding resin.

(38) A rolling bearing with sensor having:

an outer ring and an inner ring which can rotate relatively to each other, one of the outer and inner rings being a stationary ring while the other is a rotating ring;

a plurality of rolling elements incorporated between the outer ring and the inner ring; and at least one sensor provided in at least one of the stationary ring, a member attached to the stationary ring, the rotating ring and a member attached to the rotating ring, the sensor measuring at least vibration condition of the rolling bearing;

wherein a bi-morpheme piezoelectric element having a double end support structure is used as the sensor.

(39) A bearing unit with sensor according to any one of (36) to (38), wherein:

the sensor includes at least one of a rotation speed sensor for measuring rotation speed of the rolling bearing and a temperature sensor for measuring temperature of the rolling bearing.

(40) A bearing unit with sensor according to any one of (36) or (39), wherein:

the sensor is incorporated in a single sensor holder together with various electronic elements for driving the sensor, and the sensor and the various electronic elements are mounted on a predetermined board.

(41) A bearing unit with sensor according to any one of (36) to (40), further having:

an amplification circuit for amplifying an output of the sensor.

BRIEF DESCRIPTION OF THE DRAWINGS

FIG. 27A shows the state of a piezoelectric element during the absence of acceleration acting thereon, and FIG. 27B shows the state of the piezoelectric element during the presence of acceleration acting thereon;

DETAILED DESCRIPTION OF THE PREFERRED EMBODIMENTS

Figure 1:
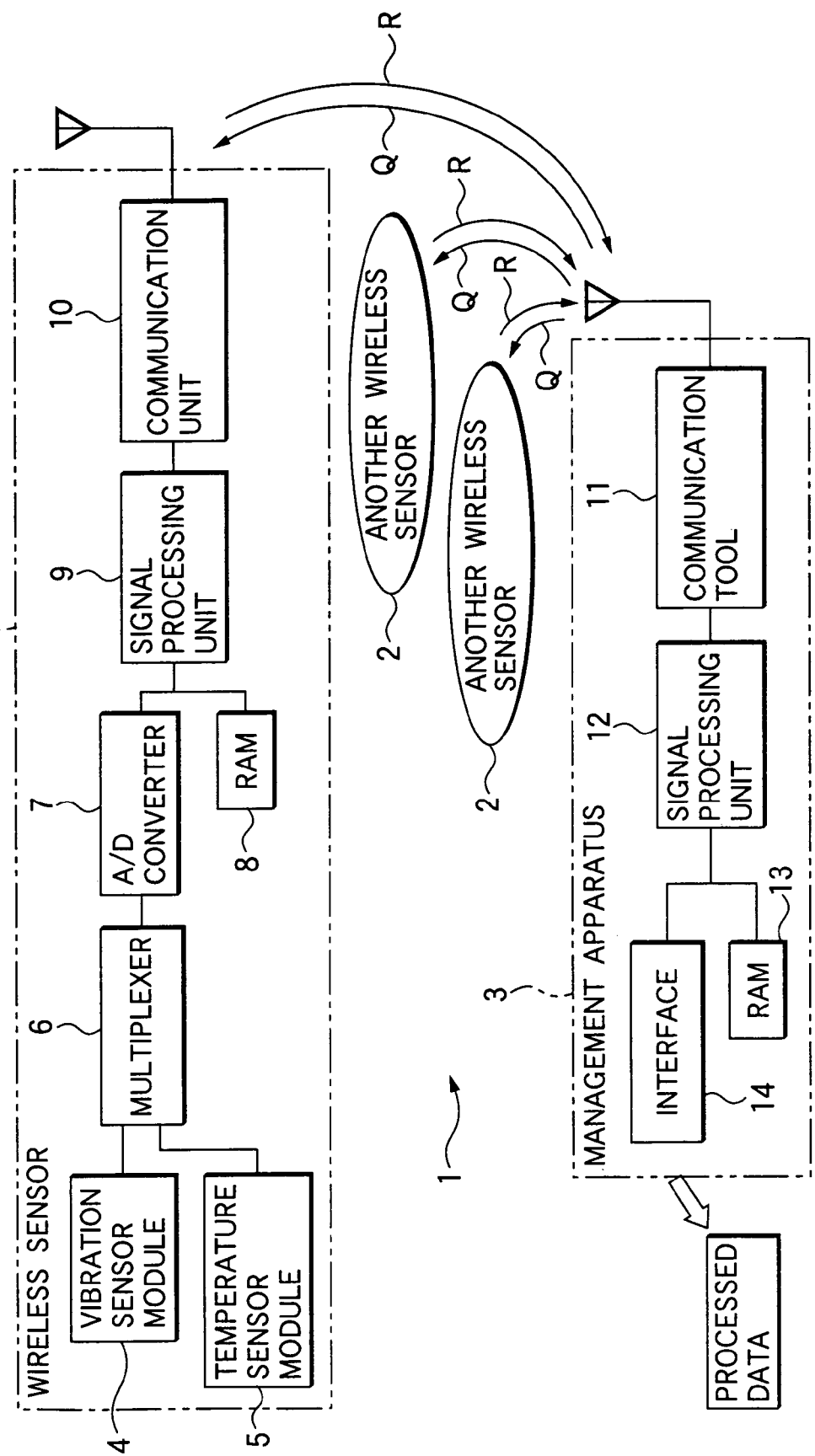
FIG. 1 is a block diagram of a monitoring system according to a first embodiment of the invention.

A first embodiment of the invention will be described with reference to FIGS. 1 to 3. A monitoring system 1 shown in FIG. 1 is constituted by a plurality of wireless sensors 2 and management apparatus 3. Each of the wireless sensors 2 detects vibration or temperature as a subject of detection and transmits the detection data (signal) thereof. The management apparatus 3 receives signals R output from the plurality of wireless sensors 2.

Each wireless sensor 2 has a vibration sensor module 4, a temperature sensor module 5, a multiplexer 6, an A/D converter 7, a RAM (Random Access Memory) 8, a signal processing unit 9 and a communication unit 10. The vibration sensor module 4 has a vibration sensor as a detection unit for detecting vibration as a subject of detection, so as to convert the change of vibration detected in the form of acceleration or the like into an electric signal, and output the electric signal. The temperature module 5 has a temperature sensor as a detection unit for detecting temperature as a subject of detection, so as to convert detected temperature into an electric signal and output the electric signal.

The multiplexer 6 multiplexes the signals output from the vibration sensor module 4 and the temperature sensor module 5 respectively so that the signals can be separated later as detection data independent of each other. Incidentally, the multiplexing by the multiplexer 6 may be based on either a multichannel system or a time-sharing system. In addition, when there is provided only one of the sensor modules 4 and 5, the multiplexer 6 is dispensable. In addition, a plurality of A/D converters 7 may be provided instead of the multiplexer 6.

The A/D converter 7 converts an analog signal from the vibration sensor module 4 or the temperature sensor module 5 into a digital signal. The RAM 8 is provided to store detection data converted by the A/D converter 7 temporarily before the detection data is processed. Incidentally, the RAM 8 is an example of a storage unit. Any storage unit may be used if it can store the detection data temporarily.

The signal processing unit 9 makes a sequential call for the detection data of the respective sensor modules 4 and 5 stored temporarily in the RAM 8, and performs processing to compare the detection data with predetermined threshold values for vibration and temperature respectively. After that, the signal processing unit 9 supplies the detection data to the communication unit 10 together with the identification information peculiar to the respective sensor modules 4 and 5. Incidentally, the value of vibration or temperature may be supplied directly to the communication unit 10 together with the identification information. Further, the A/D converter 7, the RAM 8 and the signal processing unit 9 may be integrated into a processing unit.

When the sensor module 4, 5 has a plurality of detection units, identification information may be issued for each detection unit that has detected its corresponding detection data. In addition, it is preferable that identification information for each wireless sensor 2 together with the identification information for each sensor module 4, 5 is added to detection data to be transmitted. In this case, classification and management used for various purposes can be achieved on the side of the management apparatus 3. Since the identification information is given to each detection unit, the identification information may be added to detection data and output together by the sensor module 4, 5.

The communication unit 10 can transmit and receive the signal. The communication unit 10 converts a signal supplied from the signal processing unit 9 into a radio-wave signal R, and transmits the signal R. Incidentally, in an environment where it is difficult to use radio waves, a communication unit 10 for converting a signal into an ultrasonic wave or light such as infrared light may be used.

In the wireless sensor 2 configured thus, the detection data detected by the respective sensor modules 4 and 5 is multiplexed by the multiplexer 6, converted into a digital signal by the A/D converter 7, and then stored in the RAM 8 temporarily. The stored detection data is read out sequentially by the signal processing unit 9, subjected to processing such as calculation, and formed into a signal R added with identification information peculiar to each sensor module 4, 5. The signal R is transmitted from the communication unit 10. Incidentally, it is preferable that the interval with which vibration, temperature and the like are detected is set to be a predetermined time interval, or an interval set up by a trigger using a predetermined threshold value. In this case, the amount of information corresponding to data can be reduced.

In such a manner, communication lines are dispensable because the wireless sensor 2 transmits the detection information by radio waves. Accordingly, when the wireless sensor 2 is attached to a movable shaft of a processing machine or the like, or a bearing unit of a vehicle, there is no trouble in the work of wiring. Thus, the use of the wireless sensor 2 results in avoiding the trouble in wiring and reduce the number of man-hours for wiring. In addition, identification information for each sensor module 4, 5 is added to any signal R transmitted from the wireless sensor 2. Thus, even if signals R are transmitted from a plurality of wireless sensors 2 at the same frequency, the signals R from the wireless sensors 2 can be identified individually. Accordingly, the management apparatus 3 receiving the signals R does not have to change the frequency for each wireless sensor 2 or each sensor module 4, 5. In addition, even when another wireless sensor 2 is added as a target of reception, reception can be carried out with the setting of the management apparatus 3 as it is. Then, detection data detected by the respective wireless sensors 2 or the respective sensor modules 4 and 5 can be classified easily on the basis of the identification information.

In addition, when the wireless sensor 2 receives an instruction signal Q corresponding to individual identification information, the wireless sensor 2 detects the latest condition of a sensor module specified by the instruction signal Q, and transmits the latest condition together with the identification information through the communication unit 10. Thus, whenever a user wants to confirm detection data again, the user can obtain the latest detection data of a desired wireless sensor easily.

Incidentally, the instruction signal Q may be transmitted from the management apparatus 3 at any time interval so as to acquire the latest detection data of a desired wireless sensor. As a result, there is no case that a plurality of wireless sensors 2 transmit detection data perfectly simultaneously. Thus, transmitted data is prevented from in completion, and the reception accuracy is improved.

Incidentally, at least one of the vibration sensor module 4 and the temperature sensor module 5 provided in the wireless sensor 2 in FIG. 1 may be provided, or a rotation speed sensor module for detecting rotation speed may be provided instead of both or one of the sensor modules 4 and 5. Further, the vibration sensor module 4, the temperature sensor module 5 and the rotation speed sensor module may be provided respectively.

Next, the management apparatus 3 will be described. The management apparatus 3 shown in FIG. 1 has a communication tool 11, a signal processing unit 12, an RAM 13 and an interface 14. The communication tool 11 receives signals R transmitted from a plurality of wireless sensors 2 scattered around the management apparatus 3 by wireless, for example, by radio waves. The communication tool 11 sends the received signals R to the signal processing unit 12. Incidentally, the radio waves used by the communication tool 11 may be of a single frequency. It is, however, preferable that at least two frequency bands can be used for transmission and reception.

The signal processing unit 12 classifies detection data included in the transmitted signals R on the basis of identification information peculiar to each wireless sensor 2 or each sensor module 4, 5 included in the signals R. The RAM 13 has a memory capacity much larger than that of the RAM 8 of the wireless sensor 2. The RAM 13 manages and stores the classified detection data (or the signals R) individually. Incidentally, the RAM 13 is an example of a storage unit. Any storage unit may be used if it can manage and store the received detection data (or the signals R) individually. The interface 14 is provided in parallel with the RAM 13 and from the signal processing unit 12. The interface 14 outputs the detection data classified by the signal processing unit 12 to the outside.

In addition, the management apparatus 3 transmits an instruction signal Q through the communication tool 11 so as to make a request to a desired wireless sensor 2 or a desired sensor module 4, 5 for the latest detection data. This instruction signal Q is added with information (data) corresponding to the identification information of the wireless sensor 2 or the sensor module 4, 5 specified by the user, for example, the identification information peculiar to the desired wireless sensor 2 or the desired sensor module 4, 5.

The management apparatus 3 configured thus receives signals R transmitted from a plurality of wireless sensors 2, classifies detection data on the basis of identification information of sensor modules 4 and 5 included in the signals R, records and stores the detection data in the RAM 13. In addition, the management apparatus 3 outputs the detection data stored in the RAM 13 to the outside through the interface 14 in accordance with necessity. Accordingly, on the basis of the accumulated detection data of the respective wireless sensors 2 or the sensor modules 4 and 5, the running conditions of respective machinery and equipment or the like can be analyzed by the signal processing unit 12 of the management apparatus 3, or can be extracted to the outside through the interface 14 for the purpose of data processing. Thus, higher-level and more accurate analysis can be achieved.

Next, the monitoring system 1 constituted by the wireless sensors 2 and the management apparatus 3 makes the wireless sensors 2 detect vibration or temperature of subjects of detection at a predetermined interval or when the vibration or the temperature exceeds a threshold value set in the signal processing unit 9 of each wireless sensor 2 in advance. The monitoring system 1 adds identification information of each wireless sensor 2 or each sensor module 4, 5 to the detection data, and transmits the detection data as signals R. Then, the monitoring system 1 makes the management apparatus 3 receive the signals R, classify the detection data for each identification information, store and manage the classified detection data.

In addition, the monitoring system 1 makes the management apparatus 3 transmit an instruction signal Q. The instruction signal Q corresponds to a desired wireless sensor 2 or a desired sensor module 4, 5. For example, the instruction signal Q includes identification information peculiar to the desired wireless sensor 2 or the desired sensor module 4, 5. Thus, the latest detection data of the respective sensor modules 4 and 5 of the wireless sensor 2 specified by the identification information included in the instruction signal Q or the sensor module (4 or 5) specified by the identification information can be transmitted (by return) as a signal R from the wireless sensor 2. Accordingly, the latest detection data of any wireless sensor 2 or any sensor module 4 or 5 desired by the user can be acquired appropriately in the management apparatus 3.

Figure 2:
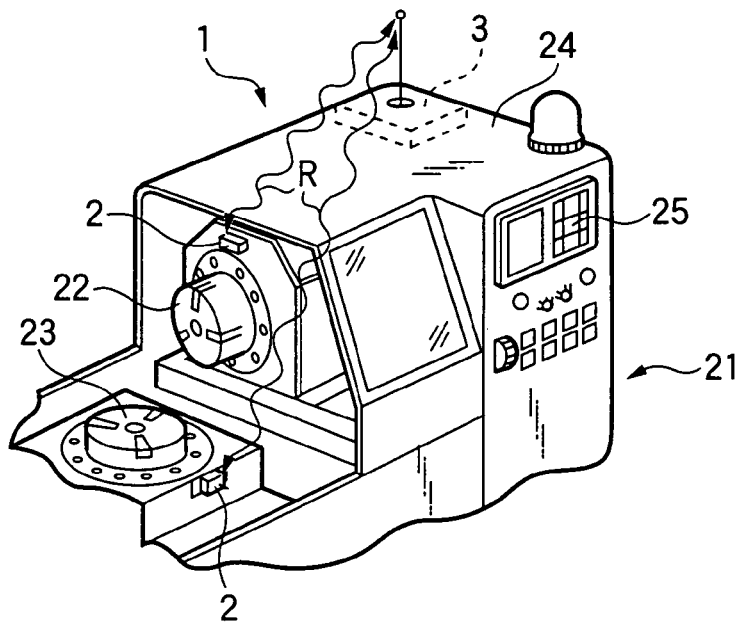
FIG. 2 is a perspective view showing the state where the monitoring system in FIG. 1 has been applied to a machine tool.

Then, the wireless sensors 2 of the monitoring system 1 are attached to spindle 22 and rotational shaft 23 of a machine tool 21 respectively as shown in FIG. 2, while the management apparatus 3 is provided in a body 24 of the machine tool. Then, vibrations, temperatures, or speeds of rotating shafts or moving shafts are detected by the wireless sensors 2 at a predetermined time interval. Detection data obtained by each wireless sensor 2 is received by the management apparatus 3, and the detection data is classified and stored for each identification information.

When the monitoring system 1 is applied to the machine tool 21, the wireless sensors 2 can be attached easily to the movable shafts 22 and 23 because the wireless sensors 2 make communication by wireless (radio waves). In addition, since there is no communication wiring, the wireless sensors 2 can be removed and attached easily when the peripheries of the wireless sensors 2 are disassembled for maintenance or the like. In addition, when another wireless sensor 2 is added, the wireless sensor 2 is attached easily. In addition, since detection data is transmitted as a signal R together with identification information, the detection data of the added wireless sensor 2 can be classified and managed by the management apparatus 3 in accordance with the identification information in the same manner as that of the other wireless sensors 2. Further, when the user uses the management apparatus 3 to transmit an instruction signal added with identification information of the sensor module 4 or 5 of the wireless sensor 2 from which the user wants to obtain the latest detection data, the user can acquire the latest detection data of the desired sensor module 4 or 5. Incidentally, to make the management apparatus 3 user-friendly, it will go well if the instruction signal is transmitted from the management apparatus 3 in response to an input to a control panel 25 of the machine tool 21.

In addition, it is effective in self-diagnosis of the machine tool 21 or prevention of defects that the detection data stored in the management apparatus 3 is supplied to the control panel 25 of the machine tool 21 through the interface 14 (FIG. 1).

When the monitoring system 1 is used adjacently to other monitoring systems 1, identification information of wireless sensors 2 to be received is set in the management apparatus 3 in advance so that detection data of the wireless sensors 2 to be received can be received selectively. Thus, crosstalk with signals of wireless sensors 2 for other machine tools can be prevented.

Further, when respective detection data of wireless sensors 2 provided in a plurality of processing machines 26 such as NC lathes or machining centers is received and managed together in the management apparatus 3 provided at a remote place, signals R output from the wireless sensors 2 attached to the respective processing machines 26 are once packed for each processing machine 26, and the packed signals R are transmitted to the management apparatus 3. In this case, detection data may be processed and accumulated for each processing machine 26, and output in response to an instruction signal from the management apparatus 3. Alternatively, on every occasion of detection in any wireless sensor 2 or any sensor module, detection data may be transmitted to the management apparatus 3 together with identification information of the wireless sensor 2 or the sensor module. When the output of the wireless sensor 2 is small, it is preferable to transmit the output via the relay unit 27.

In such a manner, the user does not have to go to the respective processing machines 26 in order to check and monitor the running conditions of the processing machines 26. In addition, since communication is performed by wireless between each of the wireless sensors attached to the processing machines 26 and the management apparatus 3, it is not necessary to lay communication lines additionally. Thus, the monitoring system 1 is easy to introduce into existing equipment.

In addition, when mobile communication lines of portable telephone, PHS (Personal Handyphone System), satellite phone, or the like, is used for communication between each of the wireless sensors or each of the processing machines and the management apparatus 3, the running conditions of bearings or gear boxes of cars or railway vehicles moving extensively can be managed and monitored under central control in real time. In this case, mobile communication lines may be used for communication between each of the wireless sensors 2 and the management apparatus 3. Alternatively, signals R of the wireless sensors may be transmitted to a relay unit 27 close thereto, while mobile communication lines, serial-parallel communication (wire), general telephone lines (wire), LAN (Local Area Network), cables, radio transmission or the Internet is used for the communication between the relay unit 27 and the management apparatus 3. Further, the management apparatus 3 may receive the signals R through general telephone lines (wire).

Assume that equipment in which wireless sensors 2 are installed is used movable among a plurality of buildings in accordance with the progress and schedule of work, or a plurality of pieces of such equipment are prepared and used to be replaced by one another for maintenance in order to increase the operating rates of lines. In such a case, pieces of management apparatus 3 installed in each building or each room may share management numbers or detection data of the wireless sensors through mobile communication or general telephone lines, LAN or the Internet. Thus, monitoring can be carried out without omission.

Incidentally, when mobile communication lines or general telephone lines are used for communication of the monitoring system 1, the processing machine 26, the car or the railway vehicle a wireless sensor is attached to may be judged to have need for maintenance and inspection on the basis of detection data transmitted by the wireless sensor and received by the management apparatus 3. In such a case, the management apparatus 3 can be set to automatically give notice to mobile communication apparatus carried by a maintenance stuff. In addition, the maintenance stuff can use the mobile communication apparatus to search detection data of any wireless sensor.

Figure 4B:
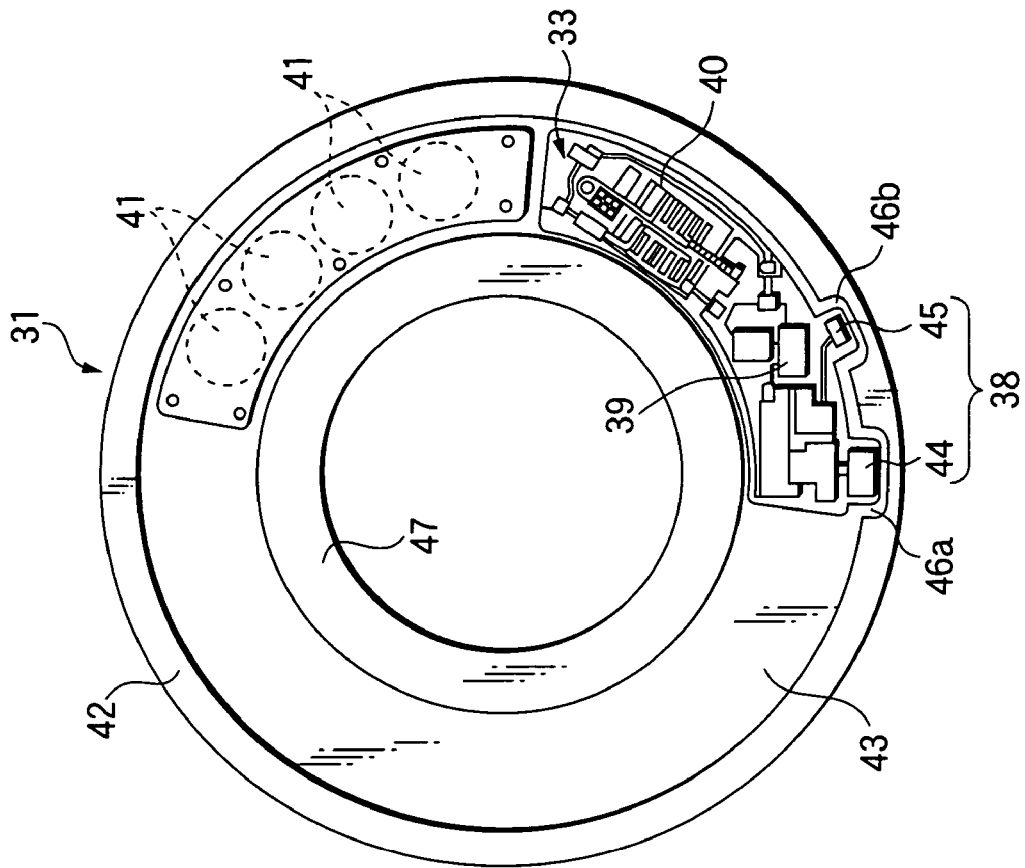
FIG. 4B is a side view of a sensor portion of the bearing unit, taken on line F4-F4 in FIG. 4A.
Figure 4A:
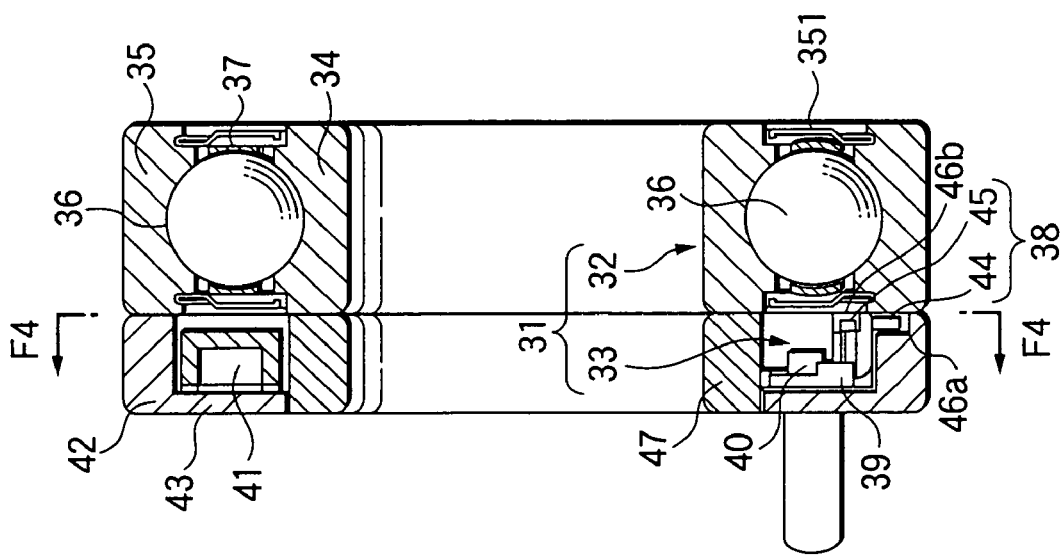
FIG. 4A is a sectional view showing a bearing unit according to a second embodiment of the invention.

Next, a second embodiment of the invention will be described with reference to FIGS. 4A to 5. A rolling bearing unit 31 shown in FIG. 4A has a bearing unit 32 and a sensor unit 33 which is a wireless sensor. The bearing unit 32 has inner and outer rings 34 and 35, rolling elements 36 disposed between these raceway rings 34 and 35, a retainer 37 for the rolling elements 36, and a seal or shield plate 351. The sensor unit 33 has a detection unit 38, a processing unit 39, a communication unit 40, and cells (batteries) 41 as shown in FIG. 4B. The detection unit 38 detects a subject of detection. The processing unit 39 processes detected data. The communication unit 40 transmits a signal output from the processing unit 39 by wireless. The cells 41 supply electric power to the detection unit 38, the processing unit 39 and the communication unit 40.

The sensor unit 33 is attached to a flange 43 formed toward the center of an outer ring spacer 42 integrally fixed or closely contacted to the outer ring 35 of the bearing unit 32. The detection unit 38 has a vibration sensor 44 for detecting vibration (that is, a change of acceleration) and a temperature sensor 45 for detecting temperature. The vibration sensor 44 and the temperature sensor 45 are attached to recess portions 46a and 46b provided in parts of the outer ring spacer 42 opposed to the bearing unit 32, respectively, so as to detect vibration and temperature of the bearing unit 32 more accurately. Incidentally, the recess portions 46a and 46b to which the acceleration sensor 44 and the temperature sensor 45 are attached may be provided independently of each other, or provided integrally with each other. Incidentally, to detect the vibration or the temperature of the inner ring 34 of the bearing unit 32 aggressively, the sensor unit 33 may be attached to an inner ring spacer 47 integrally fixed or closely contacted to the inner ring 34. In addition, the bearing unit may be designed so that the sensor unit 33 is incorporated directly in the inner ring 34, the outer ring 35, or the seal or shield plate 351. Alternatively, the bearing unit may be designed so that the sensor unit 33 is incorporated in a member attached to the inner ring 34 or the outer ring 35.

Figure 5:
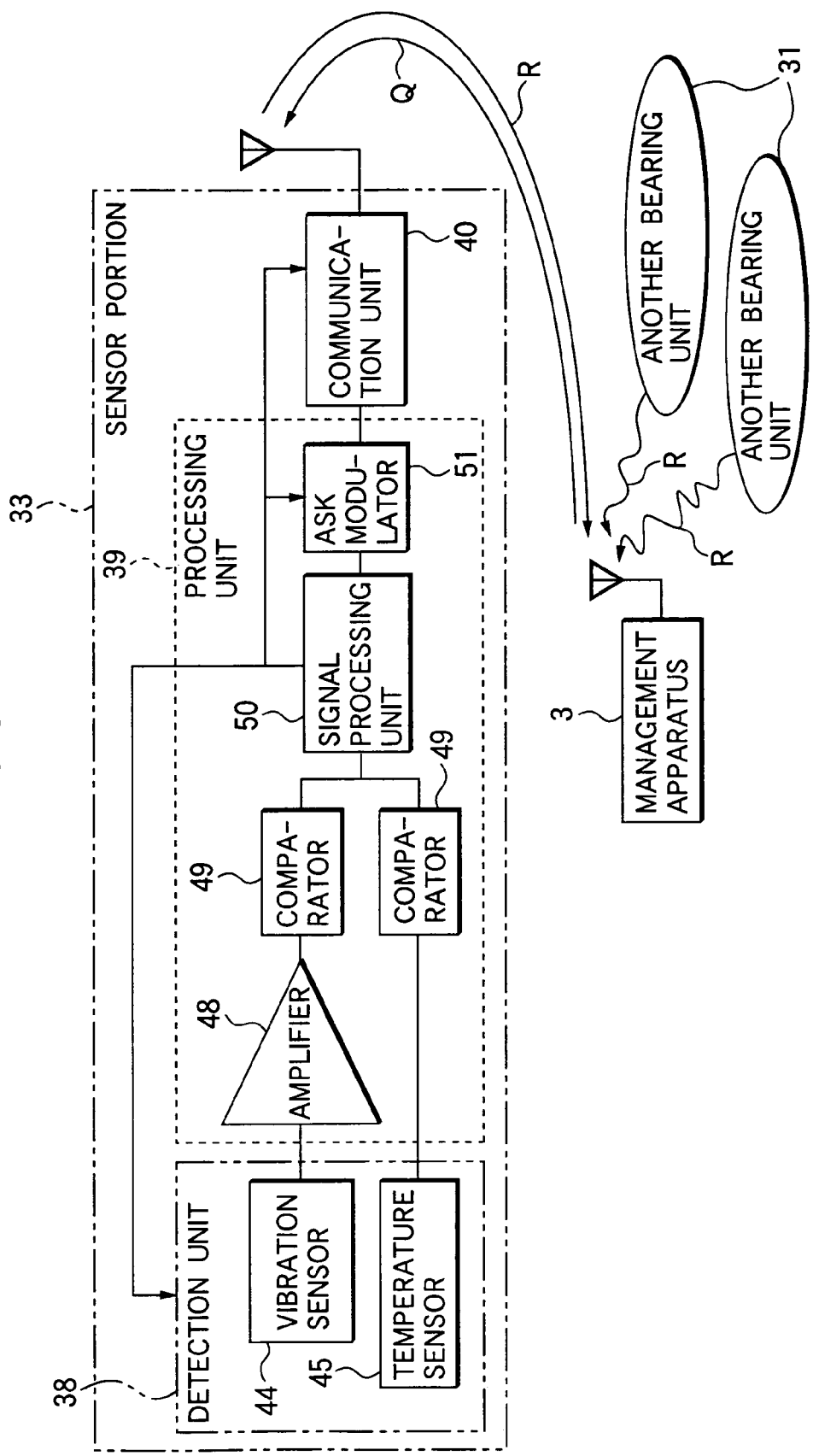
FIG. 5 is a block diagram of the bearing unit in FIG. 4.

In addition, as shown in FIG. 5, the processing unit 39 has an amplifier 48, a comparator 49, a signal processing unit 50 and an ASK (Amplitude Shift Keying) modulator 51. The amplifier 48 forms a signal of vibration detected by the vibration sensor 44 into an absolute value. The comparator 49 compares the signal of the vibration sensor 44 formed into an absolute value by the amplifier 48 and a signal output from the temperature sensor 45 with threshold values set in advance respectively. Thus, the comparator 49 outputs a result thereof. The signal processing unit 50 adds identification information peculiar to the vibration (acceleration) sensor 44 or the temperature sensor 45 outputting detection data to the detection data output from the comparator 49. In addition, of the detection data, detection data judged to exceed the threshold value is added with an alarm signal, and output together. The ASK modulator 51 modulates the signal output from the signal processing unit 50 so as to digitize (binarize) the signal. Incidentally, any other system such as an FSK (Frequency Shift Keying) system may be adopted as the modulation system for communication. The communication unit 40 converts the signal digitized by the ASK modulator 51 into a radio wave, and transmits the radio wave as a signal R. In addition, the power supply to the detection unit 38, the ASK modulator 51, the communication unit 40 and soon may be controlled appropriately by the signal processing unit 50 so as to suppress power consumption with the exception of the detection time or the signal output time. In this case, the lives of the cells (batteries) 41 can be extended.

Incidentally, the sensor unit 33 may be incorporated in a portion in which the cells 41 cannot be exchanged, or vibration or temperature may be monitored constantly. In such a case, it is preferable that not-shown multi-polar magnets or spur-gear-like irregularities are provided in the inner ring spacer 47, and a not-shown coil or a coil with magnets are provided in the flange 43 or the outer ring spacer 42. Thus, a generator is formed to supply electric power to the detection unit 38, the processing unit 39 and the communication unit 40 through a power supply circuit. Incidentally, it is more preferable that a storage battery is also used in the power supply circuit. In this case, the wireless sensor can be operated even when the generator is not operated.

The signal R transmitted from the bearing unit 31 is received by management apparatus 3 provided in a body of a processing machine or a vehicle the bearing unit 31 is attached to, or at a remote place. Incidentally, the management apparatus 3 is similar to the management apparatus 3 described in the first embodiment. Thus, the description thereof will be omitted.

In the bearing unit 31 configured thus, detection data is output by radio waves, and communication lines are dispensable. Thus, the bearing unit 31 can be attached easily as a bearing for a movable shaft of a processing machine, a vehicle, or the like. In addition, the signal R transmitted from the bearing unit 31 is added with identification information peculiar to the bearing unit 31, the detection unit 38 of the bearing unit 31, or the acceleration (vibration) sensor 44 or the temperature sensor 45. Thus, even if each signal R is transmitted at the same frequency as other signals R, the management apparatus 3 receiving the signals R can identify the signal R easily individually for each bearing unit 31, each detection unit 38, each acceleration sensor 44 or each temperature sensor 45. Incidentally, at least one of the vibration sensor 44 and the temperature sensor module 45 may be provided, or a rotation speed sensor may be provided instead of both or one of the sensors. Further, the vibration sensor 44, the temperature sensor 45 and the rotation speed sensor may be provided respectively.

Further, another bearing unit 31 as a target of reception to be detected can be added easily because communication lines are dispensable. Then, a signal R transmitted therefrom has an identification signal for each detection data. Thus, even if each signal R is transmitted at the same frequency as other signals R, the signals R can be classified easily.

In addition, when the bearing unit 31 receives an instruction signal Q corresponding to identification information peculiar to the acceleration (vibration) sensor 44 or the temperature sensor 45, the detection unit 38 or the bearing unit 31, the bearing unit 31 detects latest data of the acceleration sensor 44 or the temperature sensor 45, the detection unit 38 or all the detection units 38 of the bearing unit 31 specified by the instruction signal Q. Then, the bearing unit 31 transmits the detected latest data together with the identification information through the communication unit 40. Accordingly, the user can acquire the latest data of a desired bearing unit 31 easily on a case-by-case basis. Then, when the bearing unit 31 is used together with the management apparatus 3 described in the first embodiment so as to form a monitoring system, effect similar to that of the monitoring system 1 in the first embodiment can be obtained.

In addition, the block diagram shown in FIG. 5 of the bearing unit 31 according to the second embodiment may be replaced by the block diagram shown in FIG. 1 of the wireless sensor 2 according to the first embodiment. On the contrary, the block diagram shown in FIG. 1 of the wireless sensor 2 according to the first embodiment may be replaced by the block diagram shown in FIG. 5 of the bearing unit 31 according to the second embodiment. In addition, the block diagrams do not limit the embodiments. Any other block diagram may be used if it takes similar effect.

Figure 3:
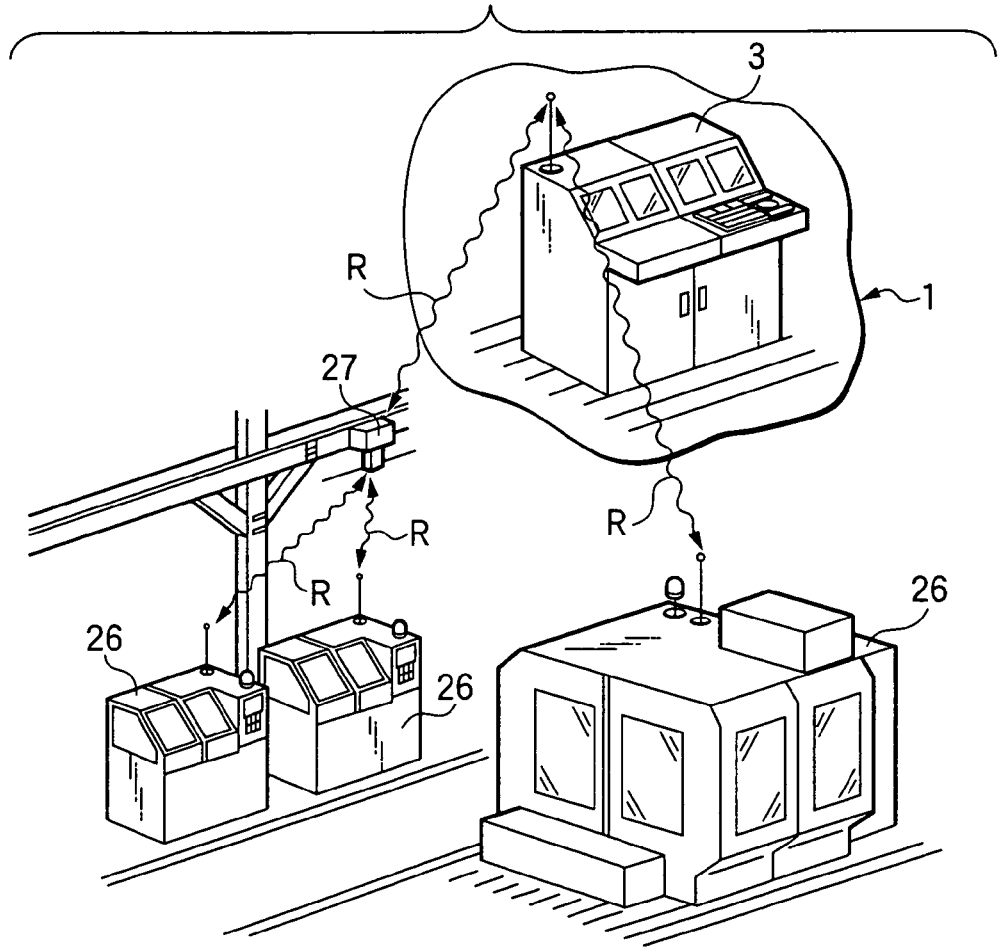
FIG. 3 is a perspective view showing the state where the monitoring system in FIG. 1 has been applied to a plurality of processing machines.

Further, when the bearing unit 31 according to the second embodiment is used in attachment to the rotating shaft of the machine tool 21 in FIG. 2 or the processing machine in FIG. 3, similar effect can be obtained.

In addition, this embodiment is applicable not only to rolling bearings but also to linear guides or ball screws. In the case of a linear guide or a ball screw, its movable portion corresponds to a rotating ring of a rolling bearing.

A third embodiment of the invention will be described with reference to FIGS. 6 to 10, using a monitoring system 63 by way of example. The monitoring system 63 is used for ABS (Anti-lock Braking System) to monitor the rotation speed or rotation numbers of wheels 62 of an automobile 61. Incidentally, constituent parts the same as those in the wireless sensor, the bearing unit, the management apparatus and the monitoring system described in the first and second embodiments are referenced correspondingly, and the description thereof will be omitted.

Figure 6:
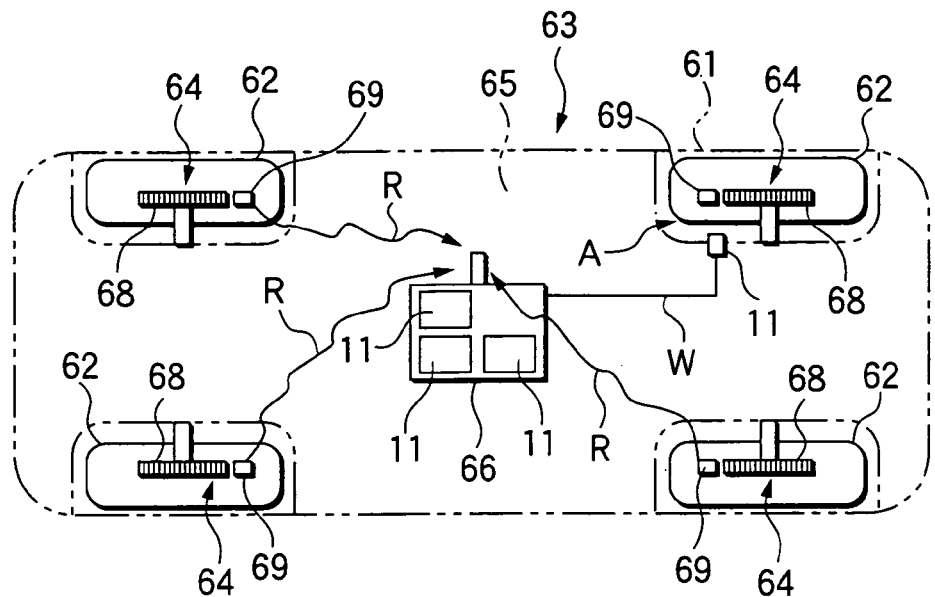
FIG. 6 is a schematic view showing the state where a monitoring system according to a third embodiment of the invention has been applied to an automobile.
Figure 7:
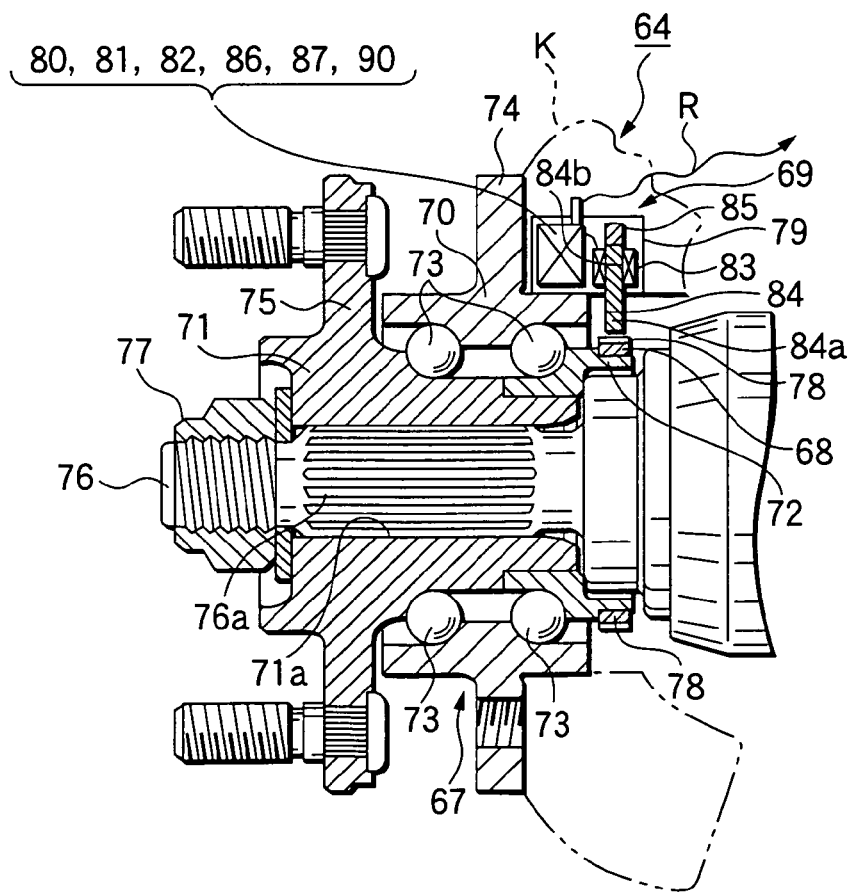
FIG. 7 is a sectional view of a hub bearing unit for use in the monitoring system in FIG. 6.

The monitoring system 63 shown in FIG. 6 has hub bearing units 64 attached to the wheels 62 of the automobile 61 respectively, and management apparatus 66 attached to a body 65. Each of the hub bearing units 64 has a wheel bearing 67, a pulsar ring 68 and a wireless sensor 69 as shown in FIG. 7. The wheel bearing 67 has a set of raceway rings using an outer ring 70, a first inner ring 71 and a second inner ring 72, and two rows of rolling elements rolling on these raceway rings. The outer ring 70 has a flange 74 fixed to a knuckle portion K by a bolt. The first inner ring 71 has a flange 75 fixed to the wheel 62 through a brake disc by a bolt. A spline 71a is formed in the inner surface of the first inner ring 71 so as to be fitted to a spline 76a formed in the outer surface of an axle 76. Thus, the first inner ring 71 is fixed to the axle 76 by a nut 77. The second inner ring 72 is fitted to the first inner ring 71. When the first inner ring 71 and the second inner ring 72 approach their rotating axes, the pre-load on the wheel bearing 67 increases.

In the pulsar ring 68, convex portions 78 are formed circumferentially at an equal interval. The pulsar ring 68 is attached to the second inner ring 72. Incidentally, it will go well if the pulsar ring 68 is attached to a position where the pulsar ring 68 rotates relatively to the wireless sensor 69.

Therefore, the pulsar ring 68 may be attached not to the second inner ring 72 but to the rotating side rotating with the axle 76. In addition, when the wireless sensor 69 is attached to the rotating side, the pulsar ring 68 is attached to the fixed side.

Figure 8:
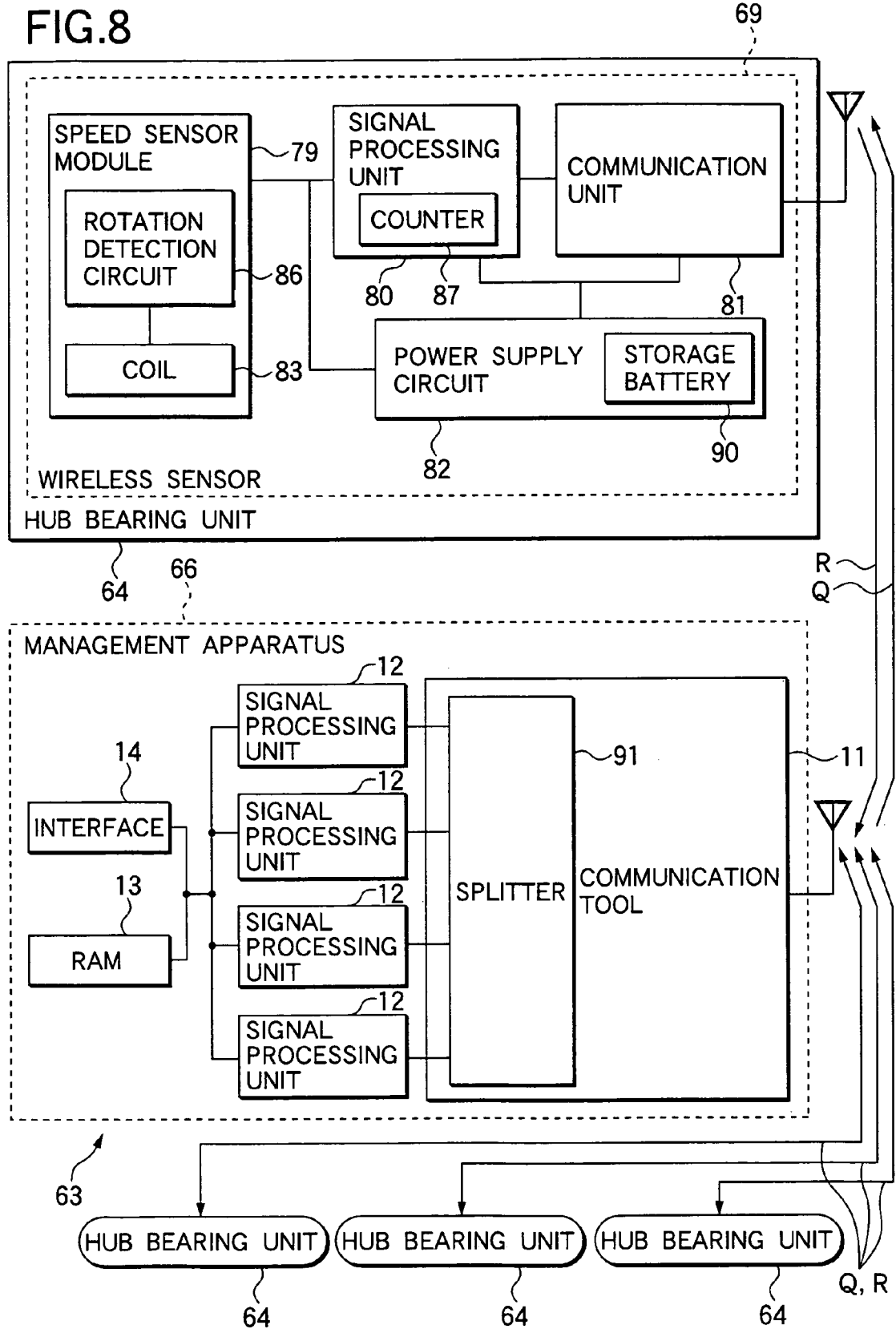
FIG. 8 is a block diagram of the monitoring system in FIG. 6.

The wireless sensor 69 is fixed to the outer ring 70 as shown in FIG. 7. The wireless sensor 69 has a speed sensor module 69 for detecting the rotation speed, a signal processing unit 80, a communication unit 81, and a power supply circuit 82 as shown in FIG. 8. Incidentally, it will go well if the wireless sensor 69 is attached in a position where the wireless sensor 69 rotates relatively to the pulsar ring 68, so as to be opposed to the pulsar ring 68. Therefore, the wireless sensor 69 may be attached to the knuckle portion K.

The speed sensor module 79 has a coil 83, a pole 84, a magnet 85 and a rotation detection circuit 86. The pole 84 penetrates the center of the coil 83. The pole 84 is made of a member having a high magnetic permeability, for example, an iron core. One end 84a of the pole 84 is close to the convex portions 78 formed in the pulsar ring 68. The magnet 85 is attached to the other end 84b of the pole 84. The rotation detection circuit 86 detects a change of a current in the coil 83. When the outer ring 70 and the second inner ring 72 rotate relatively, the convex portions 78 of the pulsar ring 68 change the magnetic flux density of the pole 84. The coil 83 generates an induced current due to the change of the magnetic flux density of the pole 84. Incidentally, it will go well if the pulsar ring 68 changes the magnetic flux density passing through the coil 83. Therefore, the pulsar ring 68 may be a ring perforated at a fixed interval or a magnetic body such as a multi-polar magnet magnetized with N and S poles alternately at a fixed interval. When a multi-polar magnet is used for the pulsar-ring, the magnet 85 to be attached to the other end 84b of the pole 84 is dispensable. In addition, the shape of the pole 84 is not limited to a rod-like shape, but it may be any other shape such as an annular shape if an induced current can be generated in the coil.

Figure 9:
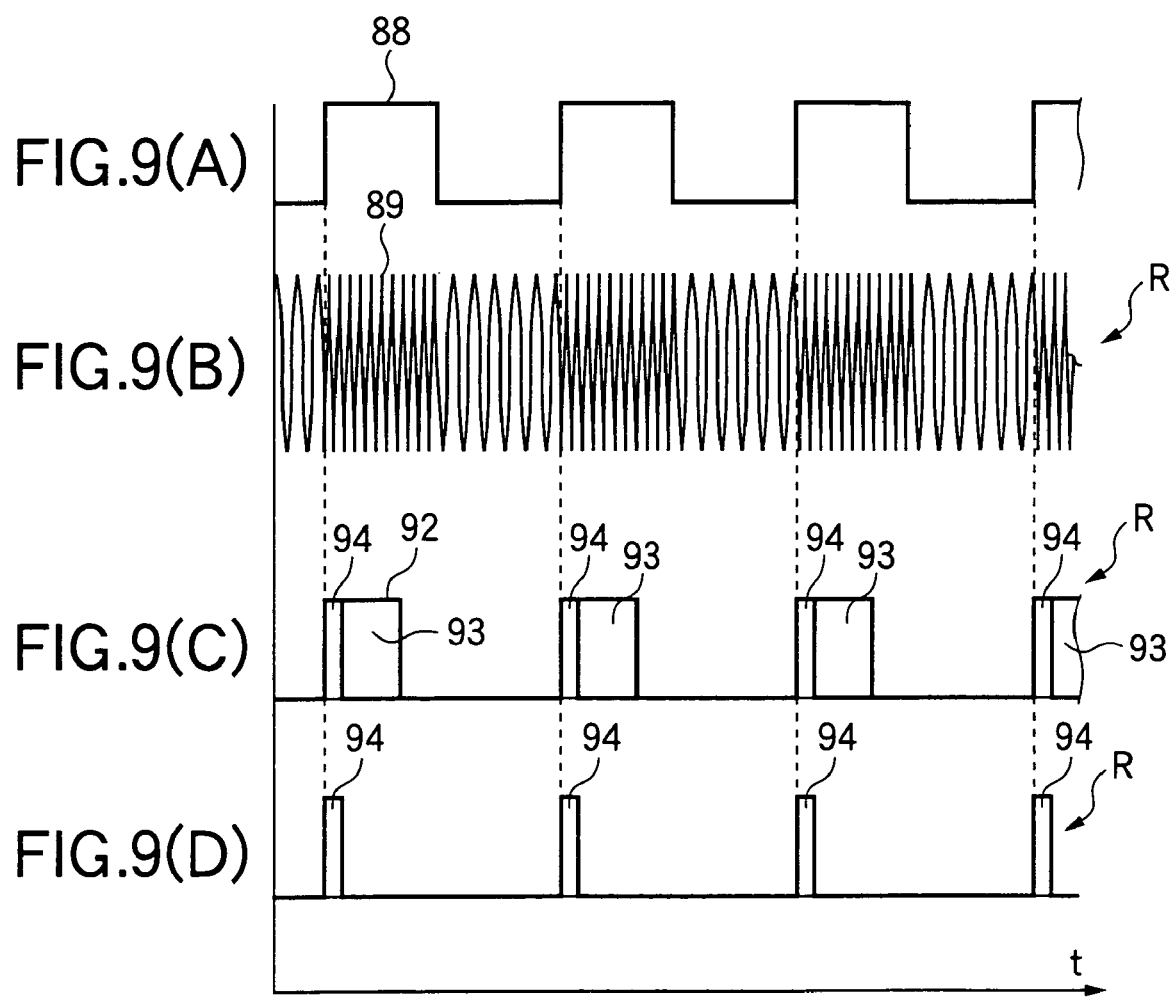
FIG. 9 is a waveform chart schematically showing a speed signal, a transmission signal, a digital signal of speed information and a digital signal of identification information output by a signal processing portion in FIG. 8.

The signal processing unit 80 converts a continuous sine waveform signal detected by the rotation detection circuit 86 into a binarized rectangular speed signal 88 shown by the waveform (A) of FIG. 9. Incidentally, the waveform (A) of FIG. 9 schematically designates the speed signal output by the signal processing unit in FIG. 8; (B), a transmission signal in which a carrier wave is modulated with the speed signal of the waveform (A) in an FM modulation system by the communication unit; (C), a digital signal including identification information transmitted from the communication unit synchronously with the period of the speed signal of the waveform (A) and speed information associated with this identification information; and (D), a digital signal of the identification information transmitted synchronously with the period of the speed signal of the waveform (A). In addition, the signal processing unit 80 may have a counter 87. In this case, the number of mountains or valleys of rectangular pulses is counted to obtain the rotation number or the rotation speed of the hub bearing unit 64. Then, a digitized signal based on the rotation number or the rotation speed is output as a speed signal. By forming the rotation number or the rotation speed into a digitized signal, it is possible to prevent the speed signal 88 from varying due to noise in the process of transmission.

The communication unit 81 uses the speed signal 88 produced by the signal processing unit 80 to FM-modulate a carrier wave having a wavelength much longer than the frequency of the speed signal 88, so as to form a transmission signal 89 as shown by the waveform (B) of FIG. 9. The transmission signal 89 is transmitted as a signal R. In this case, each hub bearing unit 64 uses a carrier wave at a different frequency from that of the other hub bearing units 64 so that the transmission signal 89 can be identified by the management apparatus 66.

The power supply circuit 82 generates electric power by use of a current generated in the coil 83, and supply the power to the speed sensor module 79, the signal processing unit 80 and the communication unit 81. In addition, the power supply circuit 82 has a storage battery 90. The storage battery 90 stores surplus power when the rotation speed of the hub bearing unit 64 is stable. On the contrary, the storage battery 90 discharges the stored power when the rotation speed of the hub bearing unit 64 drops down so that power to be supplied cannot be generated sufficiently. Accordingly, the wireless sensor 69 has no need of power supply using a cable, and is mounted with no primary battery having need to be exchanged. Thus, the wireless sensor 69 is suitable for long time use. Incidentally, the power supply circuit 82 has a rectification circuit for rectifying an AC current generated in the coil 83 into a DC current, a charging circuit for monitoring the remaining electric energy of the storage battery 90 and controlling charge and discharge, and so on.

Incidentally, the wireless sensor 69 may have an amplifier for amplifying the detected signal or a waveform shaping circuit for shaping the signal waveform in order to transmit the signal more surely. In addition, when the frequency of the signal detected by the rotation detection circuit 86 is much higher than the frequency of the carrier wave, that is, when the rotation speed of the axle 76 is so high that the detected signal has a high frequency, the frequency of the detected signal may be close to the frequency of the carrier wave so that the carrier wave cannot be modulated well. In such a case, the signal processing unit 80 binarizes the signal detected by the rotation detection circuit 86, counts the number of mountains or valleys of the rectangular waves in the counter 87, and outputs a rectangular signal proportional to the rotation number or the rotation speed of the axle 76 as a speed signal. Then, the speed signal is used for modulating the carrier wave into a transmission signal 89, and the transmission signal 89 is transmitted as a signal R.

The management apparatus 66 has a communication tool 11, a signal processing unit 12, a RAM 13 and an interface 14 as shown in FIG. 8. The communication tool 11 receives the signal R transmitted from each hub bearing unit 64, and transmits an instruction signal Q to each hub bearing unit 64. In addition, the communication tool 11 includes a splitter 91. The splitter 91 splits transmitted transmission signals 89 on the basis of carrier waves differing from one hub bearing unit 64 to another. The signal processing unit 12 is provided for each hub bearing unit 64 so as to separate the speed signal 88 included in the transmission signal 89 transmitted from the hub bearing unit 64. Incidentally, a plurality of communication tools 11 whose number is specifically corresponding to the number of the hub bearing units 64 may be provided instead of the splitter.

Incidentally, an FSK modulation, an AM modulation, an ASK modulation, and the like, other than the FM modulation, may be adopted as the modulation system for the signal used between the wireless sensor 69 and the management apparatus 66.

In the monitoring system 63 configured thus, the first and second inner rings 71 and 72, the axle 76 and the pulsar ring 68 of the hub bearing unit 64 rotate together with the wheel 62 when the automobile 61 runs. By the relative rotation to the wireless sensor 69, the pulsar ring 68 fluctuates the magnetic flux density passing through the coil 83 provided in the speed sensor module 79. When the magnetic flux density fluctuates, the coil 83 generates a current fluctuating like sine waves. By use of the generated current, the power supply circuit 82 supplies electric power to the signal processing unit 80 and the communication unit 81. In addition, the signal processing unit 80 detects and binarizes the fluctuation of the current. Then, the signal processing unit 80 outputs a speed signal 88. The communication unit 81 FM-modulates a carrier wave on the basis of the speed signal 88 so as to form a transmission signal 89, and transmits the transmission signal 89 to the management apparatus 66. In this case, the frequency of the carrier wave differs from one hub bearing unit 64 to another. Thus, signals transmitted from the hub bearing units 64 can be received by the management apparatus 66 without interference with one another.

The management apparatus 66 classifies the received transmission signals 89 for each hub bearing unit 64, and stores them in the RAM 13. In addition, in accordance with necessity, the information about speed signals stored in the RAM 13 is supplied through the interface 14 to the control unit controlling the running of the automobile 61.

When the monitoring system 63 is applied to a vehicle such as a truck or a railway vehicle with many wheels, in which wheels to be managed are distant from one another, the communication tools 11 of the management apparatus 66 are disposed in the body 65 close to the wireless sensors 69 so as to make communication with the wireless sensors 69 respectively as shown by the portion A in FIG. 6. In this case, wires W between the communication tools 11 and the management tool 66 are attached along the body 65 so as not to be bent by the running of the automobile 61. In such a manner, the communication tools 11 are disposed near their corresponding wireless sensors 69 of the hub bearing units 64 respectively. In addition, each communication tool 11 makes communication with the wireless sensor 69 of its corresponding hub bearing unit 64 by use of a transmission signal 89 output without interference with transmission signals 89 of the wireless sensors 69 of the other hub bearing units 64 which are attached to the other wheels 62 of the same automobile 61. In such a case, the frequencies of the carrier waves set in the communication units 81 of the respective hub bearing units 64 may be identical to one another.

The wireless sensor 69 may convert information detected by the speed sensor module 79 as a detection unit of the hub bearing unit 64 or information involved therein into digital information, and transmits a digital signal 92 as the signal R as shown by the waveform (C) of FIG. 9. In this case, the information detected by the speed sensor module 79 or the information involved therein includes a speed signal 88 made up on the basis of the signal detected by the speed sensor module 79, speed data 93 obtained by measuring the period of pulses of the speed signal 88 by the counter 87 and precise reference clock (not shown) and rearranging the period of pulses into a numeric value such as the rotation number or the rotation speed of the hub bearing unit 64, identification information 94 corresponding to each sensor module, time when the speed data 93 was detected, and so on. Incidentally, the waveform (C) of FIG. 9 shows the case where the speed data 93 and the identification information 94 are transmitted as a digital signal 92.

In such a manner, it becomes easy for the management apparatus 66 to identify the speed data 93 transmitted by the hub bearing unit 64. In addition, when the speed signal 88 is transmitted as the digital signal 92, the speed signal 88 can be reproduced on the reception side even if the digital signal 92 deteriorates due to ambient noise or the like. Thus, the speed signal 88 can be prevented from in completion. When the identification information 94 is added to the speed information 93, the digital signal 92 from the respective hub bearing units 64 can be transmitted on the carrier waves at the same frequency. Thus, the splitter 91 can be omitted from the management apparatus 66. In this case, in the management apparatus 66, a circuit for processing the speed information 93 in accordance with the identification information 94 is included in the signal processing unit 12. The speed information 93 may be information about the period of pulses of the speed signal 88 counted by the counter 87 and precise reference clock (not shown) of the signal processing unit 80 of the wireless sensor 69, or may be information about the period of pulses converted into rotation speed or rotation number. When the speed information 93 is transmitted subsequently after the identification information 94 is transmitted, it is easy to associate the identification information 94 and the speed information 93 with each other. The digital signal 92 including the identification information 94 and the speed information 93 is output synchronously with each pulse of the speed signal 88.

In addition, the wireless sensor 69 may transmit only the identification information 94 as the signal R synchronously with the speed signal 88 as shown by the waveform (D) of FIG. 9. In this case, a counter is provided in the signal processing unit 12 of the management apparatus 66 so as to measure the period of the identification information 94 transmitted by each hub bearing unit 64. Thus, the speed signal 88 detected by each hub bearing unit 64 is reproduced. In such a manner, the speed signal 88 of each hub bearing unit can be transmitted with a smaller amount of information (data) without interference. In addition, the identification information 94 may be transmitted whenever the hub bearing unit 64 rotates at one revolution. Alternatively, the identification information may be transmitted for every period of the current generated in the coil 83 of the speed sensor module 79 by the pulsar ring 68, or for every desired period.

When the identification information 94 corresponding to each hub bearing unit 64 is applied to the monitoring system 63, the management apparatus 66 can identify the hub bearing units 64 the number of which corresponds to the number of bits of the identification information 94. Accordingly, the monitoring system 63 can be applied easily to a vehicle having a large number of wheels, such as a truck or a railway vehicle. In addition, when the number of the bits increases so as to increase the amount of information that the management apparatus 66 can identify, it is possible to prevent interference with speed information 93 transmitted from hub bearing units 64 in the other vehicles. In consideration of prevention of interference with signals or information transmitted from hub bearing units in the other vehicles, it is preferable that the practical number of bits of the identification information 94 is 16 bits, 32 bits, 64 bits, or more.

Incidentally, the speed sensor module 79 may have a coil 83 and a rod-like pole 84 disposed in the center of the coil 83, or may be an annular coil twisted circumferentially at each convex portion 78 of the pulsar ring 68. The pulsar ring 68 and the speed sensor module 79 may be disposed among the rolling elements 73. In addition, the form of the speed sensor module may be either a passive type illustratively applied to the hub bearing unit in the third embodiment, or an active type. When an active type speed sensor module is used, a power generating coil is provided separately.

Although a ball bearing using balls as rolling elements is used for the hub bearing unit 64 shown in FIG. 7, a cylindrical roller bearing or a tapered roller bearing may be used. Alternatively, single row bearings may be used in combination. In addition, the vibration sensor module 4 and the temperature sensor module 5 shown in the first embodiment, and the vibration sensor 44 and the temperature sensor 45 shown in the second embodiment may be provided together with the speed sensor module 79. The signal transmission system is not limited to radio waves. Ultrasonic waves, infrared rays, light, and the like, may be used.

Figure 32:
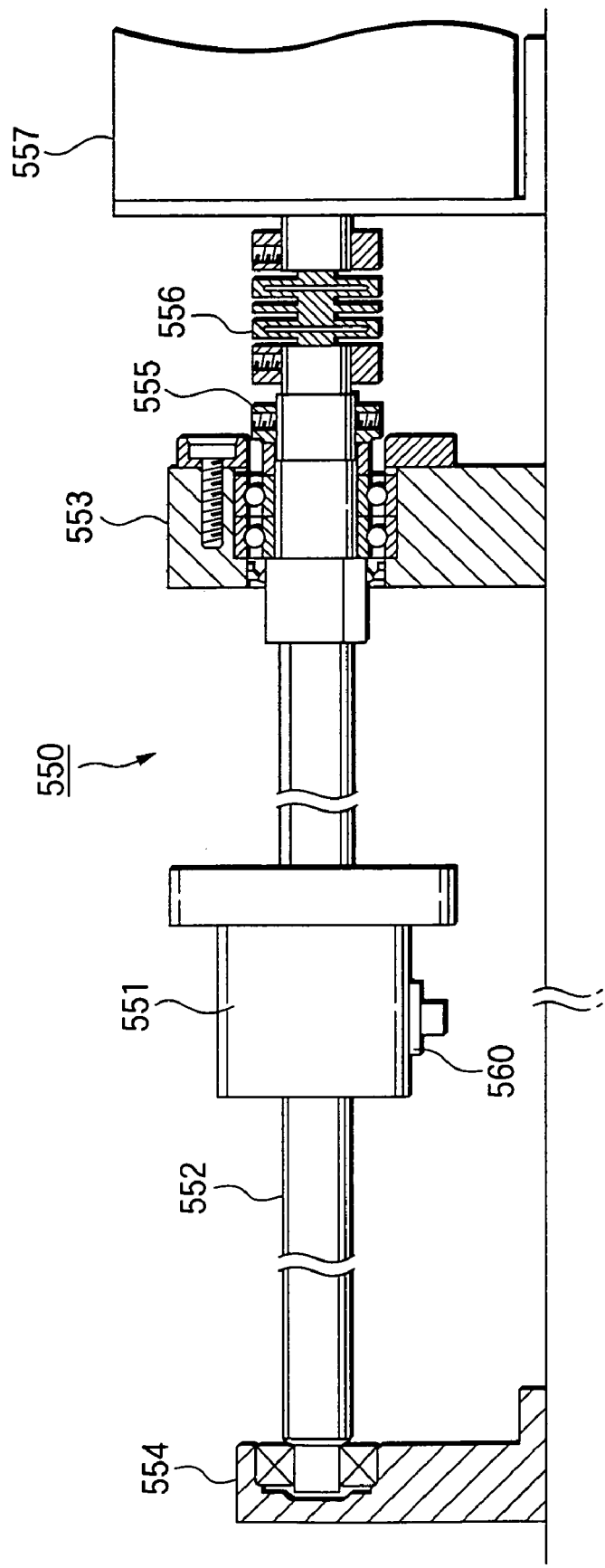
FIG. 32 is a schematic view showing the configuration in which the sensor apparatus is applied to the linear guide device.

Further, the invention is not limited to the bearing unit 64, but it is also applicable to a ball screw 550 which is a linear motion unit for achieving linear motion by rolling of rolling elements as shown in FIG. 32.

In the ball screw 550, a sensor unit 560 for a rolling unit is attached to a nut 551 so that abnormality such as flaking in the engagement portion between a screw shaft 552 and the nut 551 can be detected.

Incidentally, the partner to which the sensor unit 560 for a rolling unit is attached is not limited to the nut 551. The sensor unit 560 for a rolling unit may be attached to a fixed-side support unit 553 or a simple-support-side support unit 554 supporting the screw shaft 552. The screw shaft 552 is fixed axially to the fixed-side support unit 553 by a lock nut 555 so as to be rotated by a drive motor 557 coupled through a coupling 556.

In addition, when the sensor unit 560 for a rolling unit is attached to a movable portion or a rail of a linear guide or any other linear motion unit as well as the ball screw, it is possible to detect abnormality such as flaking.

The wireless sensor or the bearing unit according the invention has a detection unit for detecting a subject of detection, an data processing unit for processing data detected by the detection unit, and a communication unit for transmitting, by wireless, detection data processed by the processing unit. Accordingly, the detected data can be transmitted by wireless using radio waves, ultrasonic waves, light, or the like. Thus, there is no need to arrange wiring for sending signals. In addition, when the detection unit is provided in a movable portion, there is no need to arrange wiring for sending signals. Accordingly, there occurs no problem that the wiring is disconnected. In addition, when the wireless sensor or the bearing unit is used in a movable body such as a vehicle, measuring instruments are mounted on the movable body while detection data thereof can be managed at a place other than the movable body.

Further, the wireless sensor or the bearing unit has a detection unit for detecting a subject of detection, a data processing unit for processing data detected by the detection unit, and a communication unit for transmitting, by wireless, the detection data processed by the processing unit together with identification information peculiar to the detection unit. Accordingly, signals transmitted from a plurality of wireless sensors can be identified easily. In addition, when an instruction signal corresponding to identification information, the subject of detection of the detection unit specified by the instruction signal is detected, and the identification signal of the detection unit is transmitted together with the detection data thereof. Accordingly, latest data of any wireless sensor or any bearing unit desired by the user can be acquired easily. When the detected information or information involved therein is converted into digital information and the digital information is transmitted, a signal which has deteriorated due to ambient noise can be reproduced easily. Thus, in completion of information can be prevented.

In the bearing unit according to the invention, a pulsar ring is provided on a first raceway ring of a pair of raceway rings rotating relatively through rolling elements, and a wireless sensor according to the invention is attached to the second raceway ring rotating relatively to the pulsar ring. According to this bearing unit, a detected signal is transmitted by wireless, while electric power can be supplied to a circuit in the wireless sensor by use of a current generated in a coil of a rotation speed sensor provided to be opposed to the pulsar ring. Accordingly, there is no need to arrange a signal line for transmitting the detected signal and a wire for supplying power to the circuit in the wireless sensor.

When a plurality of bearing units are used simultaneously, the bearing units according the invention transmitting data involved in detected signals in an FM modulation system can transmit the data using carrier waves differing from one bearing unit to another and peculiar to the individual bearing units. Accordingly, interference of the signals from the bearing units with one another can be prevented.

In the bearing unit according to the invention, at least one of the rotation number or the rotation speed obtained by the signal processing unit on the basis of a periodic signal generated in the rotation speed sensor is transmitted. Accordingly, digitized data is transmitted. Thus, it is possible to prevent the detection data from changing during the signal propagation.

In the bearing unit according to the invention, at least peculiar identification information is transmitted at a breakpoint of each period of the periodic signal generated in the rotation speed sensor. Accordingly, a signal detected by each bearing unit can be transmitted to the monitoring system with a smaller amount of information and without interference with signals detected by the other bearing units.

In addition, in the management apparatus according to the invention, a signal output from any wireless sensor or any bearing unit is classified on the basis of identification information peculiar to the detection unit included in the signal. Accordingly, signals from wireless sensors or bearing units can be managed easily. Then, in the management apparatus according to the invention, on the basis of the identification information peculiar to the detection units included in signals, signals including the identification information registered in advance in the management apparatus are selectively received. Accordingly, interference can be prevented more surely.

In addition, the monitoring system according to the invention uses wireless sensors or bearing units according to the invention, and management apparatus according to the invention. Accordingly, each wireless sensor or each bearing unit transmits not only detection data detected by its detection unit but also identification information peculiar to the detection unit. The management apparatus classifies and manages the detection data on the basis of the identification information. Thus, it is possible to monitor a plurality of wireless sensors or bearing units simultaneously.

In addition, the monitoring apparatus according to the invention uses a plurality of wireless sensors or bearing units simultaneously, and management apparatus making communication with the wireless sensors and the bearing units by use of carrier waves differing from one wireless sensor or one bearing unit to another and peculiar to each wireless sensor or each bearing unit. Thus, interference of signals between the wireless sensors and the monitoring system can be prevented.

A bearing unit with sensor according to a fourth embodiment of the invention will be described below with reference to the accompanying drawings. Although the following description will be made upon a double row tapered roller bearing by way of example, the bearing unit with sensor is not limited thereto and a single row tapered roller bearing may be used for the bearing unit with sensor. In addition, the kind of bearing unit is not limited if the bearing unit with sensor is a rolling unit such as a cylindrical roller bearing, a ball bearing, or a bearing unit.

Figure 10:
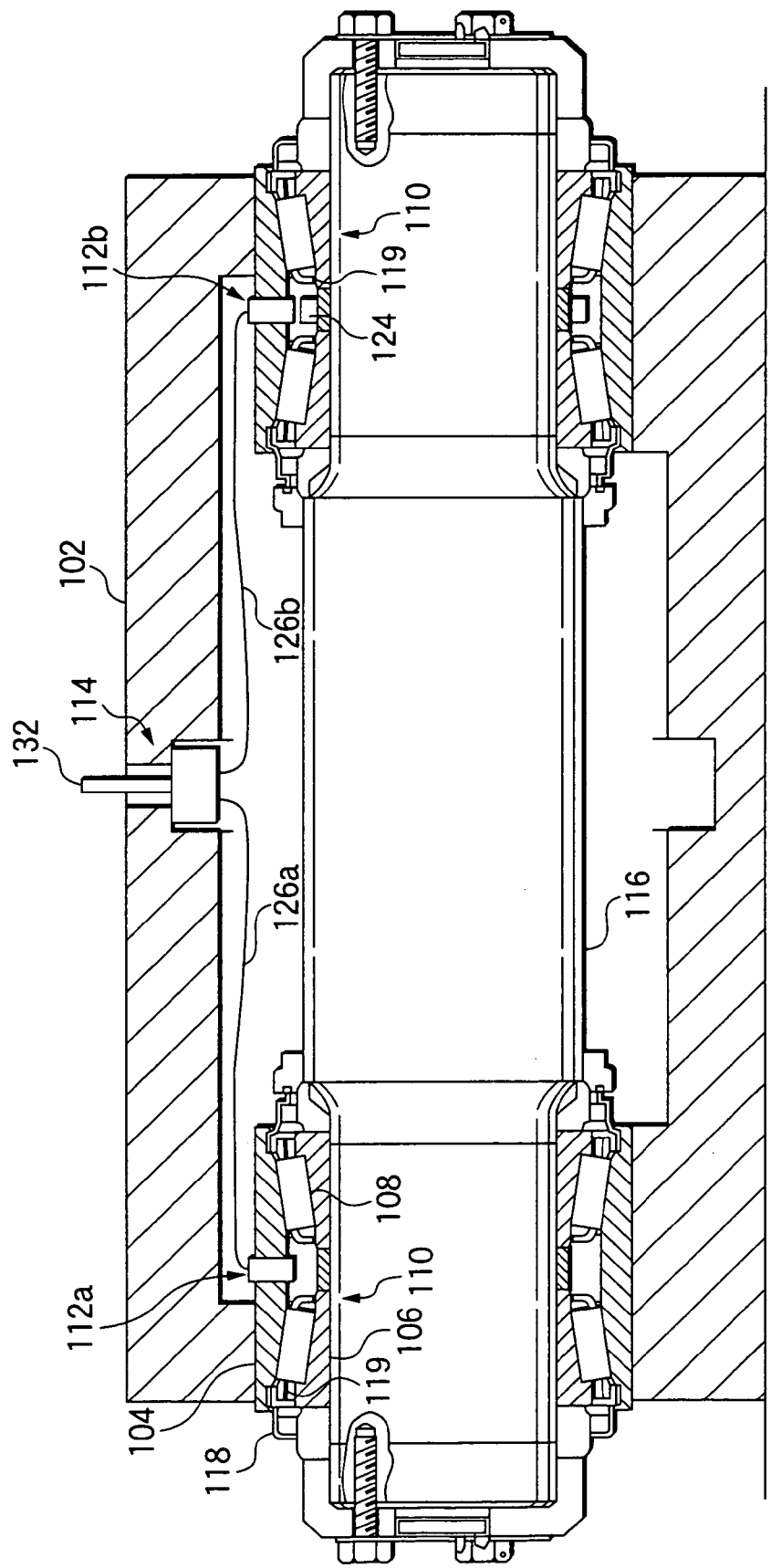
FIG. 10 is a sectional view schematically showing the configuration of a bearing unit with sensor according to a fourth embodiment of the invention.
Figure 11:
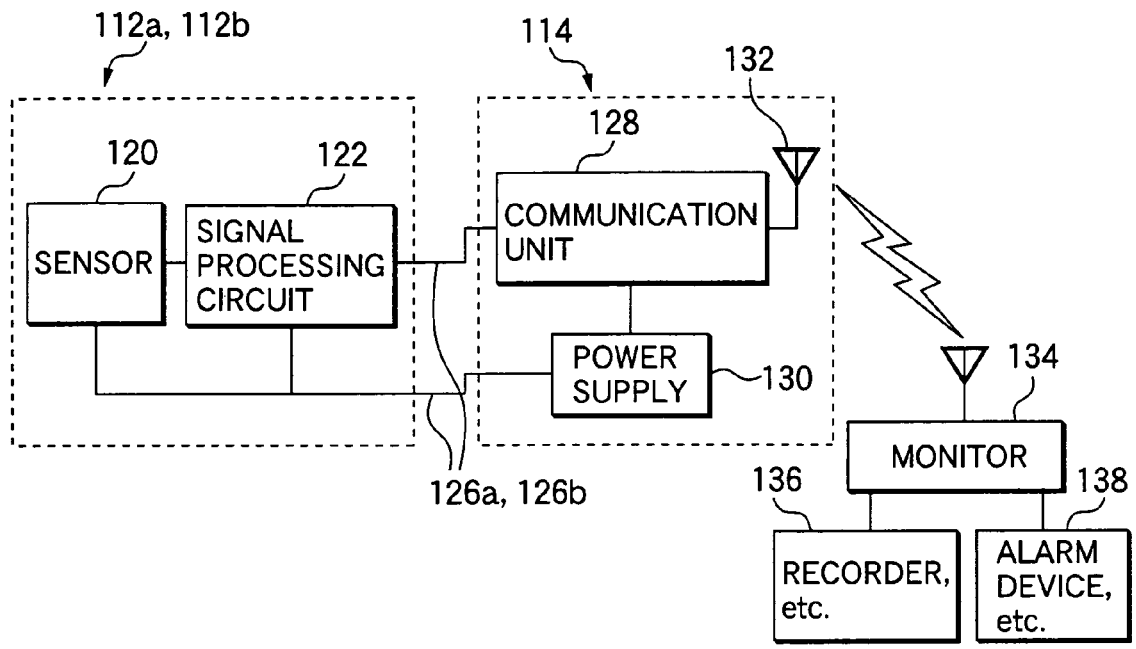
FIG. 11 is a block diagram showing the circuitry of a detection sensor unit and a relay unit shown in FIG. 10.

As shown in FIGS. 10 and 11, the bearing unit with sensor according to this embodiment includes a rolling bearing 110, detection sensor units 112a and 112b, and a relay unit 114. The rolling bearing 110 is incorporated in a housing 102. The rolling bearing 110 includes at least an outer ring 104, an inner ring 106 and a plurality of rolling elements 108. The outer and inner rings 104 and 106 can rotate relatively to each other. The rolling elements 108 are incorporated between the outer and inner rings 104 and 106. The detection sensor units 112a and 112b are set in at least one of the outer ring 104, a member attached to the outer ring 104, the inner ring 106 and a member attached to the inner ring 106 so as to detect the condition of the rolling bearing 110. The relay unit 114 can transmit detection data output from the detection sensor units 112a and 112b to the outside by wireless.

In this embodiment, the outer ring 104 is attached to the housing 102 while the inner ring 106 is attached to the shaft 116. In this case, any system can be selected from an outer ring rotating (inner ring stationary) system for rotating the outer ring 104, an inner ring rotating (outer ring stationary) system for rotating the inner ring 106 and a system for rotating the outer and inner rings 106 and 104 mutually. In addition, other constituent bearing members such as a retainer 119, a sealing plate (contact or non-contact seal or shield) 118, and so on, can be selected in accordance with necessity.

The detection sensor units 112a and 112b can be provided with a function for detecting the condition of the rolling bearing 110 such as vibration, temperature or rotation speed. In this embodiment, the detection sensor units 112a and 112b are provided with a function for detecting the vibration of the rolling bearing 110 and a function for detecting the rotation speed of the rolling bearing 110 respectively by way of example.

Each of the detection sensor units 112a and 112b has a sensor 120 and a signal processing circuit 122 for giving signal processing to the output from the sensor 120 (see FIG. 11).

For example, in the detection sensor unit 112a having a function for detecting the vibration of the rolling bearing 110, a piezoelectric element (not-shown) is applicable to the sensor 120. In this case, when vibration acts on the sensor 120 during the operation of the rolling bearing 110, the piezoelectric element is bent and deformed so that electric charge is generated in the piezoelectric element in accordance with the bending and deformation. Signal processing is given to the charge generated at this time by the signal processing circuit. Thus, the vibration condition of the rolling bearing 110 is detected. Then, the detection data is transmitted to the relay unit 114 as will described later.

On the other hand, as the detection sensor unit 112b having a function for detecting the rotation speed of the rolling bearing 110, for example, there can be used a hall element or hall IC using the Hall effect, or a magneto-resistance element whose resistance value changes in accordance with the change of magnetic flux, such as an MR element (magneto resistance element) or GMR element (giant magneto resistance element). In this case, the sensor 120 is disposed to be opposed to a speed detection ring (tone ring, pulsar ring or the like) 124 (see FIG. 15) attached to the outer circumference of the shaft 116. For example, the change of magnetic flux density occurring during the operation of the rolling bearing 110 is transmitted to the signal processing circuit through the sensor 120, and signal processing is given thereto. Thus, the rotation speed of the rolling bearing 110 is detected. Then, the detection data is transmitted to the relay unit 114 as will described later.

In this embodiment, the detection sensor units 112a and 112b are electrically connected to the relay unit 114 through cables 126a and 126b respectively. The detection data from the detection sensor units 112a and 112b is transmitted to the relay unit 114 through the cables 126a and 126b respectively.

Figure 16:
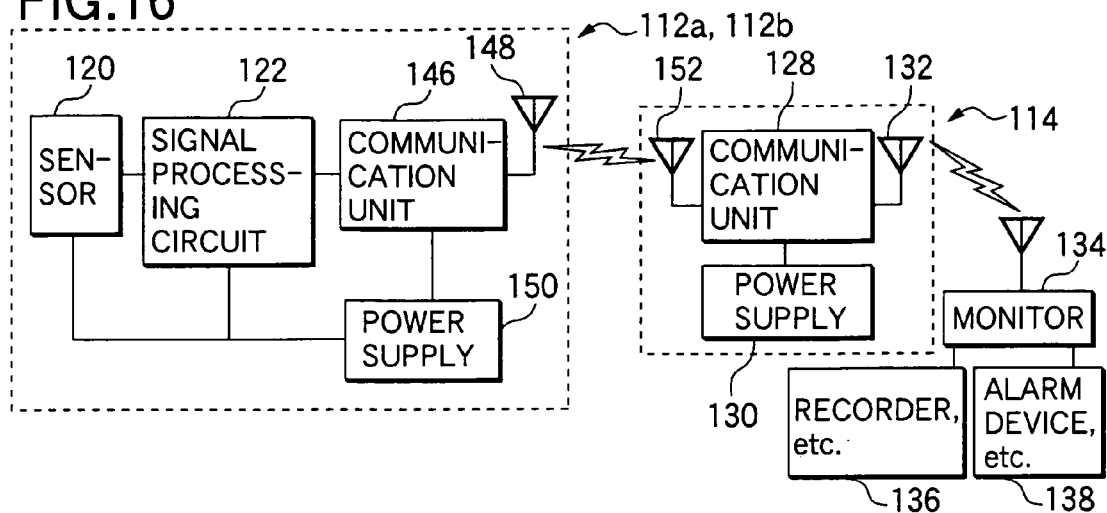
FIG. 16 is a block diagram showing the circuitry of a detection sensor unit and a relay unit shown in FIG. 15.

A communication unit 128 is provided in the relay unit 114 (see FIG. 16). The communication unit 128 can convert the detection data from the respective detection sensor units 112a and 112b into signal waves with a predetermined frequency component, for example, by amplitude modulation (AM), frequency modulation (FM), phase modulation (PM) or the like, and transmit the signal waves to the outside by wireless. Further, the relay unit 114 is provided with a power supply 130 for driving the communication unit 128 and the respective detection sensor units 112a and 112b, and a transmitting antenna 132 for transmitting signal waves by wireless. In this case, radio waves, light waves, ultrasonic waves and the like with a predetermined frequency component can be used as the signal waves. Incidentally, the signal waves can be set to have various frequency components in accordance with the purpose, environment and so on in which the bearing unit with sensor will be used.

Incidentally, the method for setting the detection sensor units 112a and 112b is not limited especially if it can fix the sensor units 112a and 112b to the outer ring 104, a member (housing 102) attached to the outer ring 104, the inner ring 106 or a member (shaft 116) attached to the inner ring 106 surely. For example, any one of various methods such as a bonding method using an adhesive agent, a screwing method or a fitting method can be used. In this embodiment, the detection sensor units 112a and 112b are fixed to the outer ring 104 of the rolling bearing 110 respectively by way of example.

In addition, although the relay unit 114 is attached to the housing 102 in this embodiment, the attachment method thereof is not limited especially. For example, any one of various methods such as a bonding method using an adhesive agent, a screwing method or a fitting method can be used. Further, the position where the relay unit 114 is attached is not limited especially. The relay unit 114 may be attached to be planted in the housing 102 or attached to be exposed outside the housing 102. In either case, it is preferable that the transmitting antenna 132 is disposed so that the forward end portion thereof projects over the housing 102. When the forward end portion of the transmitting antenna 132 is made to project over the housing 102 in such a manner, the transmitting/receiving sensitivity of signal waves between the transmitting antenna 132 and a monitor 134 can be improved.

In the configuration described above, detection data output from the detection sensor units 112a and 112b is transmitted to the relay unit 114 through the cables 126a and 126b respectively during the operation of the bearing unit with sensor (rolling bearing 110). The detection data is converted into predetermined signal waves by the relay unit 114, and then transmitted from the transmitting antenna 132 to the monitor 134 by wireless. At this time, a recorder 136 performs recording/tabulating processing about the vibration condition or the rotation speed condition of the rolling bearing 110, while an alarm device 138 performs monitoring/alarming processing about the change of vibration or the change of rotation speed.

In such a manner, according to this embodiment, the detection data from the detection sensor units 112a and 112b is designed to be transmitted to the outside through the relay unit 114 by wireless so that the number of parts of the bearing unit with sensor can be reduced and the configuration of the unit can be simplified. As a result, it is possible to realize a low-cost and small-size bearing unit with sensor.

In addition, the detection sensor units 112a and 112b are electrically connected to the relay unit 114 through the cables 126a and 126b respectively. Accordingly, even when a communication function cannot be mounted on the respective detection sensor units 112a and 112b, or even when the use environment prevents wireless transmission to the relay unit 114, wireless transmission from the relay unit 114 to the outside can be achieved.

Further, the power supply 130 is disposed in the relay unit 114. Accordingly, the number of parts of each detection sensor unit 112a, 112b can be reduced and the configuration of the unit can be simplified. Thus, each detection sensor unit 112a, 112b can be downsized. As a result, the degree of freedom about the position (disposition) of each detection sensor unit 112a, 112b can be improved.

Furthermore, the forward end portion of the transmitting antenna 132 of the relay unit 114 is made to project over the housing 102. Accordingly, the transmitting/receiving sensitivity of signal waves between the transmitting antenna 132 and the monitor 134 can be improved.

Incidentally, the invention is not limited to the aforementioned fourth embodiment. Various modification can be made as follows.

Figure 12:
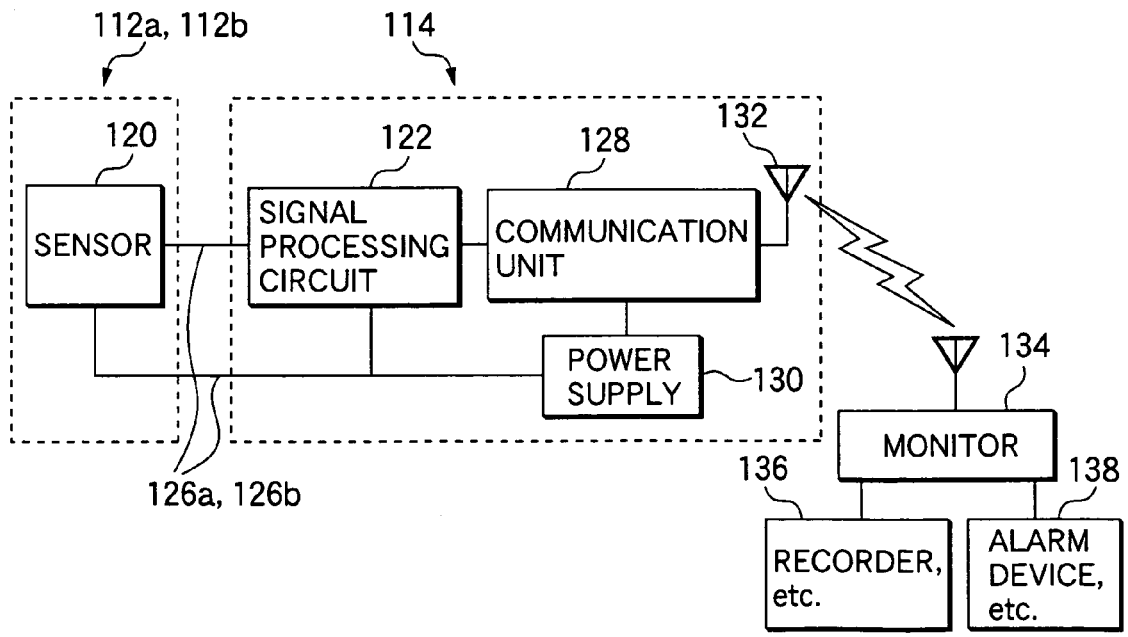
FIG. 12 is a block diagram showing the circuitry of a detection sensor unit and a relay unit according to a first modification of the fourth embodiment.

As a first modification, for example, as shown in FIG. 12, the signal processing circuit 122 may be incorporated in the relay unit 114 while the sensor 120 is mainly disposed in each of the detection sensor units 112a and 112b. According to this configuration, the respective detection sensor units 112a and 112b can be made smaller in size.

Figure 13:
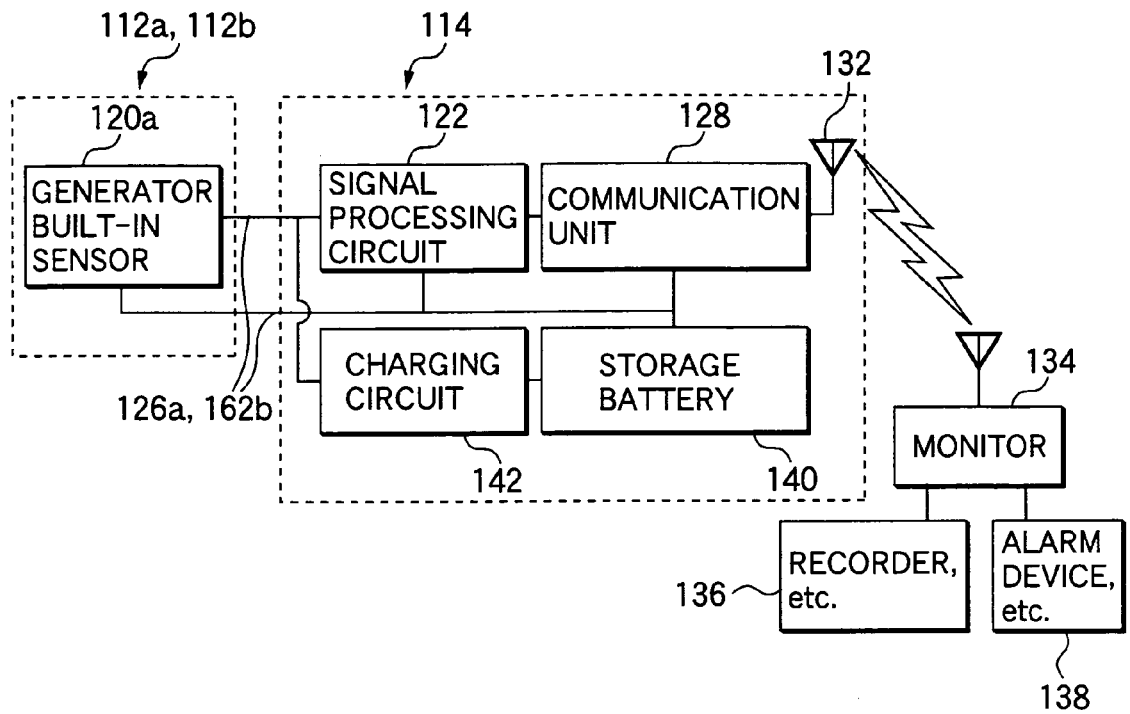
FIG. 13 is a block diagram showing the circuitry of a detection sensor unit and a relay unit according to a second modification of the fourth embodiment.

As a second modification, for example, as shown in FIG. 13, a passive type generator built-in sensor 120a may be incorporated as a rotation sensor in each of the detection sensor units 112a and 112b instead of the sensor 120 so that the signal processing circuit 122 and the communication unit 128 are driven directly by the electric power from the generator built-in sensor 120a. In this case, it is preferable that a storage battery 140 and a charging circuit 142 for charging the storage battery 140 are provided in the relay unit 114. According to this configuration, the signal processing circuit 122 and the communication unit 128 can be driven directly by the electric power from the generator built-in sensor 120a during the operation of the bearing unit with sensor (rolling bearing 110). Further, even when the operation of the bearing unit with sensor (rolling bearing 110) is suspended, the signal processing circuit 122 and the communication unit 128 can be driven continuously by the electric power accumulated in the storage battery 140 because the electric power from the generator built-in sensor 120a has been accumulated in the storage battery 140 through the charging circuit 142 during the operation. In addition, a passive type sensor may be used merely as a rotation sensor.

Figure 14:
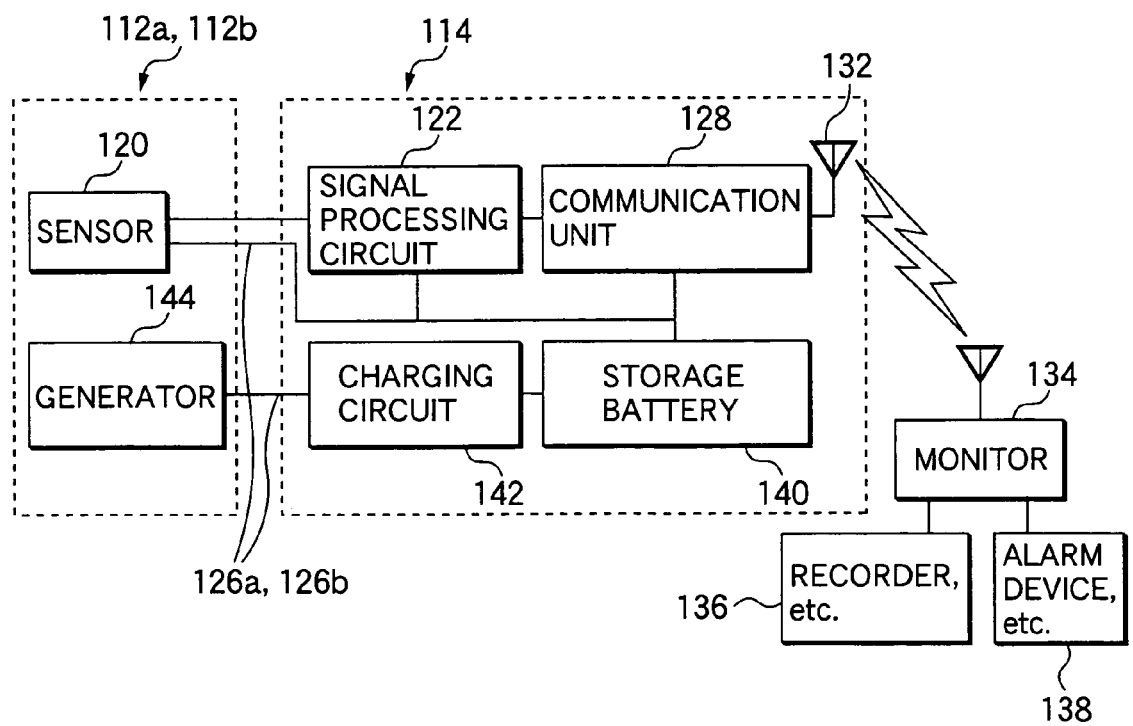
FIG. 14 is a block diagram showing the circuitry of a detection sensor unit and a relay unit according to a third modification of the fourth embodiment.

As a third modification, for example, configuration may be made as shown in FIG. 14. In this example, it is assumed that no rotation sensor is used in each of the detection sensor units 112a and 112b or the rotation sensor is not provided with a function as a power generator. A sensor 120 and a generator 144 are incorporated in each of the detection sensor units 112a and 112b. In this case, electric power from the generator 144 is supplied to the storage battery 140 through the charging circuit 142 of the relay unit 114 so that the signal processing circuit 122 and the communication unit 128 are driven by the electric power of the storage battery 140.

Incidentally, in the configurations of the fourth embodiment and its first to third modifications described above, an antenna (not shown) which can transmit and receive may be used instead of the transmitting antenna 132 of the relay unit 114 while the communication unit 128 has a transmitting/receiving function. According to this configuration, the signal processing circuit 122 can be controlled from the outside through the relay unit 114. As a result, the condition (for example, vibration condition, temperature condition, rotation speed condition, and the like) of the rolling bearing 110 can be detected by remote control.

Next, a bearing unit with sensor according to a fifth embodiment of the invention will be described with reference to the accompanying drawings.

Figure 15:
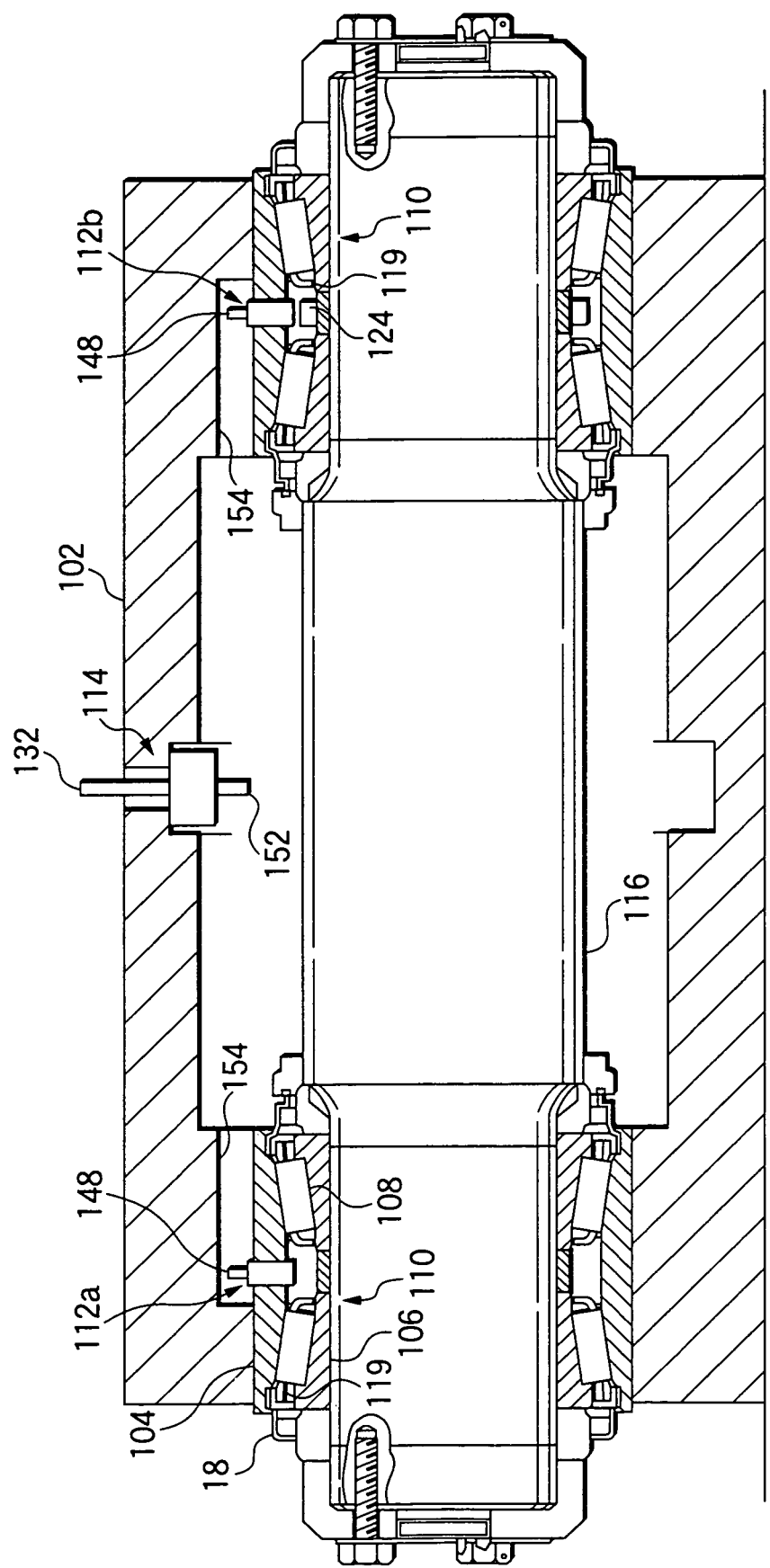
FIG. 15 is a sectional view schematically showing the whole configuration of a bearing unit with sensor according to a fifth embodiment.

As shown in FIGS. 15 and 16, in the bearing unit with sensor according to this embodiment, each of detection sensor units 112a and 112b is provided with a communication unit 146, a transmitting antenna 148 and a power supply (battery cell) 150. By the communication unit 146 and the transmitting antenna 148, detection data of the detection sensor units 112a and 112b can be converted into signal waves with a predetermined frequency component, and transmitted by wireless. The power supply 150 drives a sensor 120, a signal processing unit 122 and the communication unit 146. On the other hand, a relay unit 114 is provided with a receiving antenna 152. By the receiving antenna 152, the detection data of the detection sensor units 112a and 112b transmitted through the transmitting antenna 148 by wireless is received and sent to a communication unit 128. In this case, radio waves, light waves, ultrasonic waves and the like with a predetermined frequency component can be used as the signal waves transmitted from the transmitting antenna 148 to the receiving antenna 152. In addition, the signal waves can be set to have various frequency components in accordance with the purpose, environment and so on in which the bearing unit with sensor will be used.

In addition, a notch portion 154 is formed in the peripheral area of a housing 102 where each of the detection sensor units 112a and 112b is set. By this notch portion 154, a comparatively wide space is ensured in the peripheral area of each detection sensor unit 112a, 112b. As a result, the signal waves transmitted from the transmitting antenna 148 propagate easily toward the relay unit 114. In this case, it is preferable that the relay unit 114 is set inside the housing 102, and the forward end portion of the receiving antenna 152 of the relay unit 114 is disposed to project into the housing 102. In the configuration where the relay unit 114 is set outside the housing 102 and the forward end portion of the receiving antenna 152 of the relay unit 114 is disposed not to project into the housing 102, signal waves from the transmitting antenna 148 is interfered with by the housing 102 so as to be attenuated. Accordingly, the transmitting/receiving sensitivity of the signal waves between the transmitting antenna 148 and the receiving antenna 152 is lowered. However, when the relay unit 114 is set inside the housing 102 and the forward end portion of the receiving antenna 152 of the relay unit 114 is disposed to project into the housing 102 as in this embodiment, the signal waves can be prevented from attenuation. As a result, the transmitting/receiving sensitivity of the signal waves between the transmitting antenna 148 and the receiving antenna 152 can be improved.

Incidentally, the other configuration is the same as that in the fourth embodiment described previously. Therefore, constituent members the same as those in the fourth embodiment are reference correspondingly, and the description thereof will be omitted.

In such a manner, according to this embodiment, detection data is transmitted from the detection sensor units 112a and 112b to the relay unit 114 by wireless. Accordingly, processing of wiring between each of the detection sensor units 112a and 112b and the relay unit 114 is not required. Thus, the number of parts of the bearing unit with sensor can be reduced while the configuration of the unit can be simplified and the cost of the unit can be reduced. Further, it is not necessary to ensure a space for the wiring processing. Accordingly the unit can be downsized.

In addition, also in this embodiment, similarly to the effect of the fourth embodiment described previously, the forward end portion of the transmitting antenna 132 of the relay unit 114 is made to project over the housing 102 so that the transmitting/receiving sensitivity of signal waves between the transmitting antenna 132 and the monitor 134 can be improved.

Incidentally, the invention is not limited to the fifth embodiment. Various modifications can be made as follows.

Figure 17:
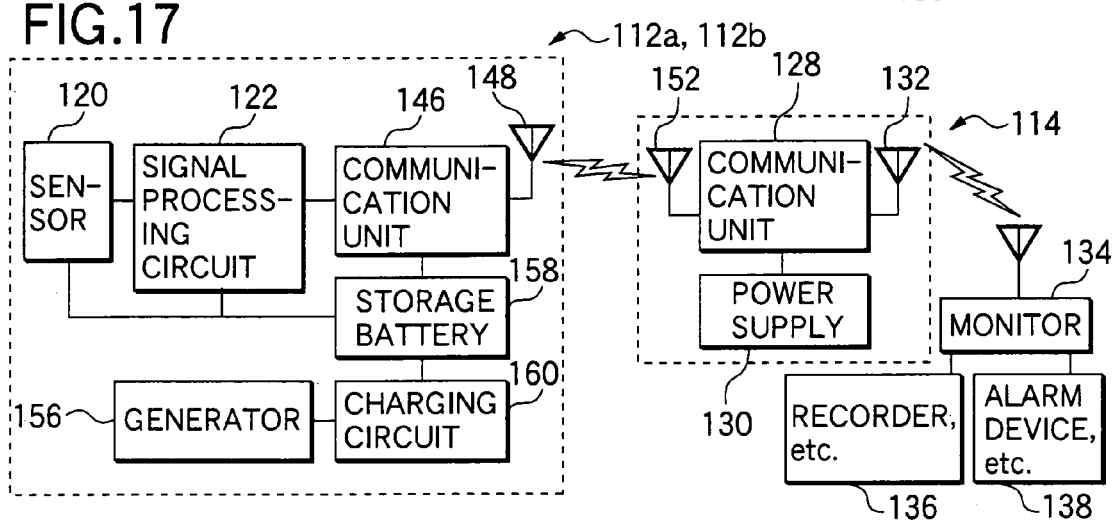
FIG. 17 is a block diagram showing the circuitry of a detection sensor unit and a relay unit according to a first modification of the fifth embodiment.

As a first modification, for example, as shown in FIG. 17, a generator (for example, frequency generator) 156 may be incorporated in each of the detection sensor units 112a and 112b instead of the power supply 50 so that the sensor 120, the signal processing circuit 122 and the communication unit 146 are driven directly by the electric power from the generator 156. In this case, it is preferable that a storage battery 158 and a charging circuit 160 for charging the storage battery 158 are provided in each of the detection sensor units 112a and 112b. According to this configuration, the sensor 120, the signal processing circuit 122 and the communication unit 146 can be driven directly by the electric power from the generator 156 during the operation of the bearing unit with sensor (rolling bearing 110). Further, even when the operation of the bearing unit with sensor (rolling bearing 110) is suspended, the sensor 120, the signal processing circuit 122 and the communication unit 146 can be driven continuously by the electric power accumulated in the storage battery 158 because the electric power from the generator 156 has been accumulated in the storage battery 158 through the charging circuit 160 during the operation.

Incidentally, in the configurations of the fifth embodiment and its first modification described above, an antenna (not shown) which can transmit and receive may be used instead of the transmitting antenna 148 of each of the detection sensor units 112a and 112b while the communication unit 146 has a transmitting/receiving function. According to this configuration, the signal processing circuit 122 in each of the detection sensor units 112a and 112b can be controlled from the outside. As a result, the condition (for example, vibration condition, temperature condition, rotation speed condition, and the like) of the rolling bearing 110 can be detected by remote control.

Figure 18:
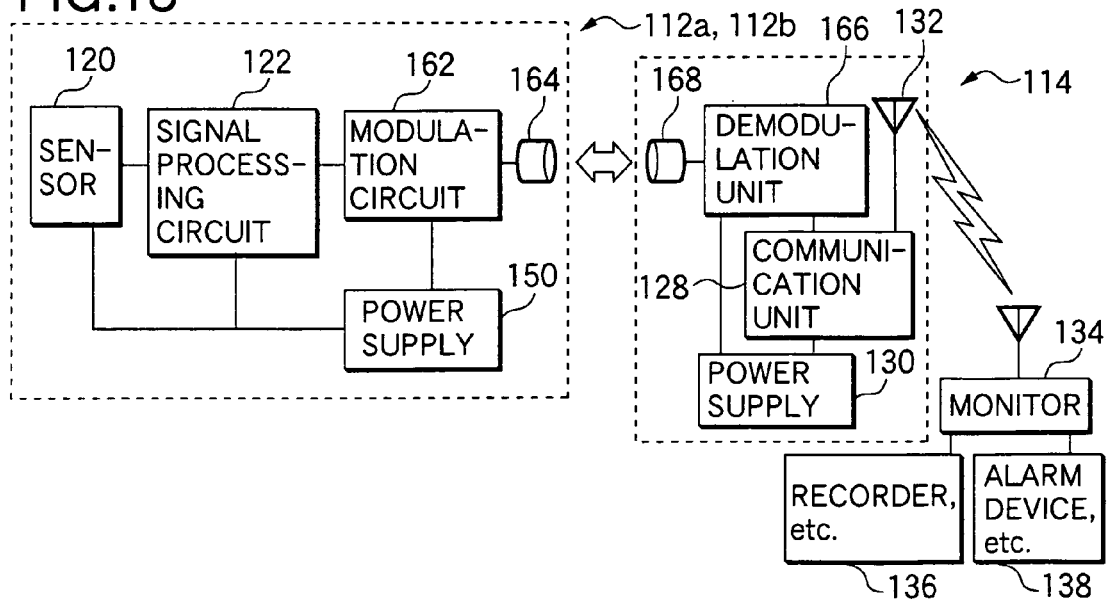
FIG. 18 is a block diagram showing the circuitry of a detection sensor unit and a relay unit according to a second modification of the fifth embodiment.

In addition, as a second modification, for example, as shown in FIG. 18, the detection sensor units 112a and 112b are electrically connected to the relay unit 114 by use of electromagnetic induction. In this case, each of the detection sensor units 112a and 112b is provided with a modulation circuit 162 for modulating detection data thereof into a predetermined modulated signal, and a transmitting coil 164 instead of the transmitting antenna. On the other hand, the relay unit 114 is provided with a demodulation circuit 166 for demodulating the modulated signal, and a receiving coil 168 instead of the receiving antenna. In this configuration, detection data output from the sensor 120 of each detection sensor unit 112a, 112b through the signal processing circuit 122 is modulated into a predetermined modulated signal by the modulation circuit 162, and then applied from the transmitting coil 164 to the receiving coil 168 of the relay unit 114. At this time, the modulated signal is transmitted to the receiving coil by wireless by electromagnetic coupling, and demodulated through the demodulation circuit 166. Then, the demodulated detection data is converted into predetermined signal waves by the communication unit 128, and then transmitted to the monitor 134 through the transmitting antenna 132 by wireless.

Incidentally, in this second modification, the demodulation circuit 166 may be disposed in the monitor 134. In this case, the modulated signal is transmitted to the monitor 134 through the relay unit by wireless as it is, and demodulated by the demodulation circuit disposed in the monitor 134. In addition, a generator may be provided in each of the detection sensor units 112a and 112b instead of the power supply 150 so that the sensor 120, the signal processing circuit 122 and the modulation circuit 162 are driven by the electric power from the generator. Further, configuration may be made so that the power supply 130 of the relay unit 114 is omitted while the electric power of the generators of the detection sensor units 112a and 112b is supplied to the relay unit 114 by electromagnetic induction.

On the contrary, the power supply 150 may be removed from each of the detection sensor units 112a and 112b while power is supplied from the power supply 130 of the relay unit 114 to the detection sensor units 112a and 112b by electromagnetic induction.

Next, a bearing unit with sensor according to a sixth embodiment of the invention will be described with reference to the accompanying drawings.

Figure 19:
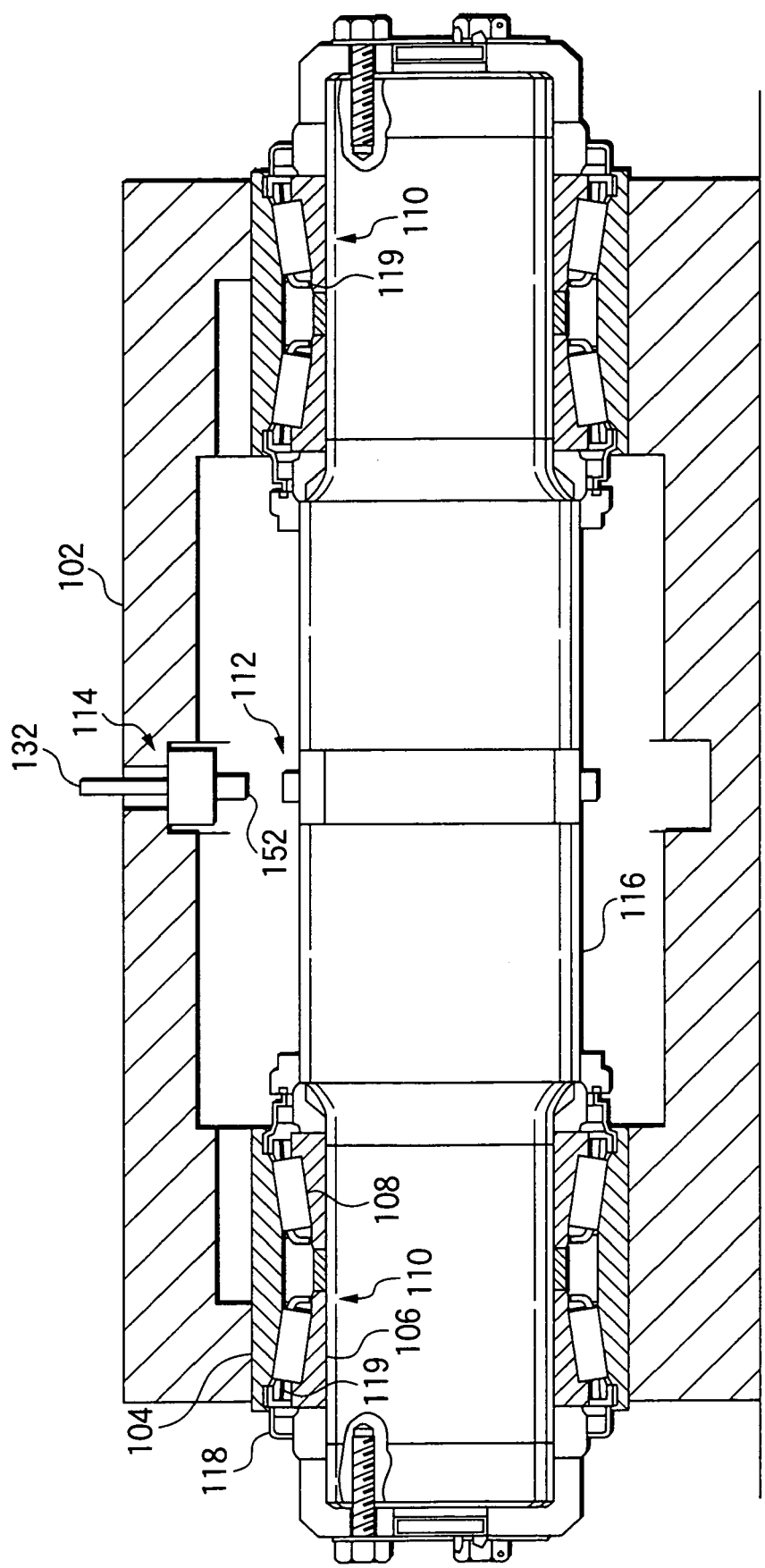
FIG. 19 is a sectional view schematically showing the configuration of a bearing unit with sensor according to a sixth embodiment.

As shown in FIG. 19, in the bearing unit with sensor according to this embodiment, a detection sensor unit 112 is planted in a shaft 116 supported by a rolling bearing 110 so that the condition (such as vibration, temperature, rotation speed, and the like) of the shaft 116 detected by the detection sensor unit 112 can be transmitted to a relay unit 114 by wireless. In this case, the same configuration as that shown in FIG. 15 to FIG. 18 can be adopted as the configuration of the detection sensor unit 112. Therefore, the description of the detection sensor unit 112 will be omitted. The other configuration is the same as that in the fourth embodiment and the fifth embodiment described previously. Therefore, constituent members the same as those in the fourth and fifth embodiments are referenced correspondingly, and the description thereof will be omitted.

In such a manner, according to this embodiment, the detection sensor unit 112 is disposed intensively in the shaft 116. Accordingly, it is possible to realize a smaller-size and lower-cost bearing unit with sensor. In addition, the detailed condition change of the shaft 116 can be detected accurately in spite of non-contact detection. Further, when the detection sensor unit 112 is attached directly to the rotating ring (inner ring 106) of the rolling bearing 110, the condition of the bearing can be also detected simultaneously and accurately.

Incidentally, the invention is not limited to the fourth to sixth embodiments and their modifications described previously. Various modifications can be made as follows.

Detection data transmitted or transmitted/received by the relay unit 114 by wire or by wireless is not limited especially. The detection data may be normal/abnormal signals (judged by an abnormality judging circuit provided in the signal processing circuit), numeric data of the sensor output, numeric data obtained by averaging the sensor output, and so on. In addition, the transmitting (transmitting/receiving) interval of the detection data is not limited especially. The detection data may be transmitted at a fixed interval, at a request time, continuously, or the like.

In addition, ID numbers as an identification information may be assigned to detection sensor units (sensors) respectively so as to manage them individually. In this case, even if a plurality of detection sensor units (sensors) are used simultaneously, the data management thereof can be performed correctly.

In addition, outputs from a plurality of detection sensor units may be received by one relay unit. Alternatively, outputs from a plurality of detection sensor units may be received by a plurality of relay units.

In addition, signals from the relay unit may be received by PHS or portable telephone by way of example so as to be propagated to a remote place through such a telephone network (including the Internet) of PHS or portable telephone. In this case, even if the place where the detection sensor unit is used is distant from the place where it is managed, signals can be transmitted without any problem so that the rolling bearing can be put under center control. Particularly, when a signal transmitting system using a telephone network of PHS or portable telephone is used for an automobile or a railway vehicle, the conditions of bearings, gear boxes, or the like, of the running automobile or the running railway vehicle can be put under central control in real time. Thus, failure or the like can be prevented from occurrence.

Figure 20:
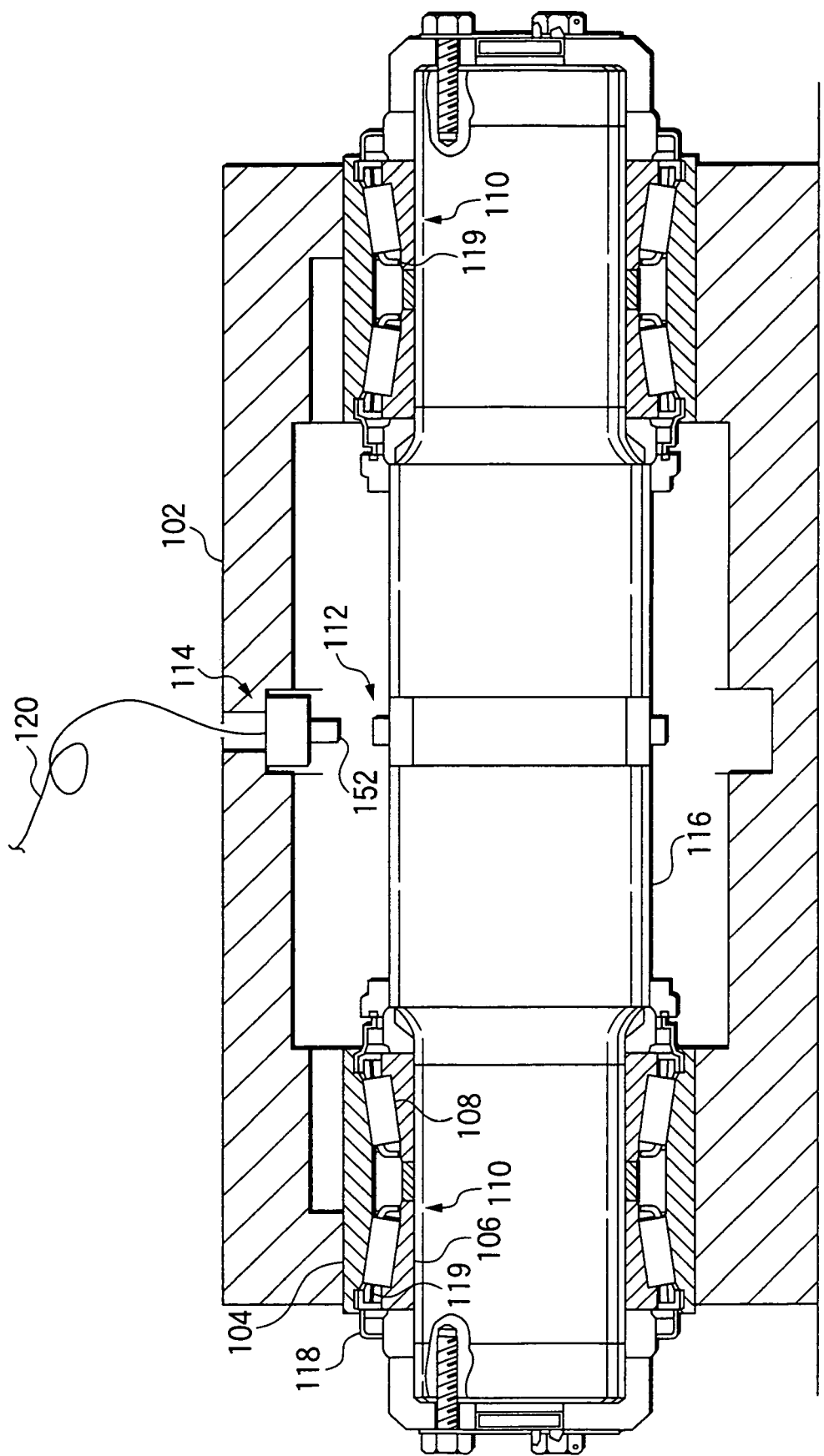
FIG. 20 is a sectional view schematically showing the configuration of a bearing unit with sensor according to a modification of the sixth embodiment.

Incidentally, as shown in FIG. 20, in the bearing unit with sensor according to the sixth embodiment, a signal may be extracted from the rotating portion (shaft) 116 by wireless while a signal is extracted from the relay unit 114 attached to the fixed portion (housing) 102 by the cable 120. Consequently, the cable 120 is prevented from disconnection.

According to the fourth to sixth embodiments, it is possible to realize a low-cost and small-size bearing unit with sensor which can transmit detection data by wireless.

A bearing unit with sensor according to a seventh embodiment of the invention will be described below with reference to FIGS. 21 to 23. Although the following description will be made upon a ball bearing as an example of the bearing unit with sensor with reference to the drawings, it is a matter of course that the bearing unit with sensor is not limited thereto and that the invention may be applied also to a tapered roller bearing, a cylindrical roller bearing, and an angular contact ball bearing.

Figure 21:
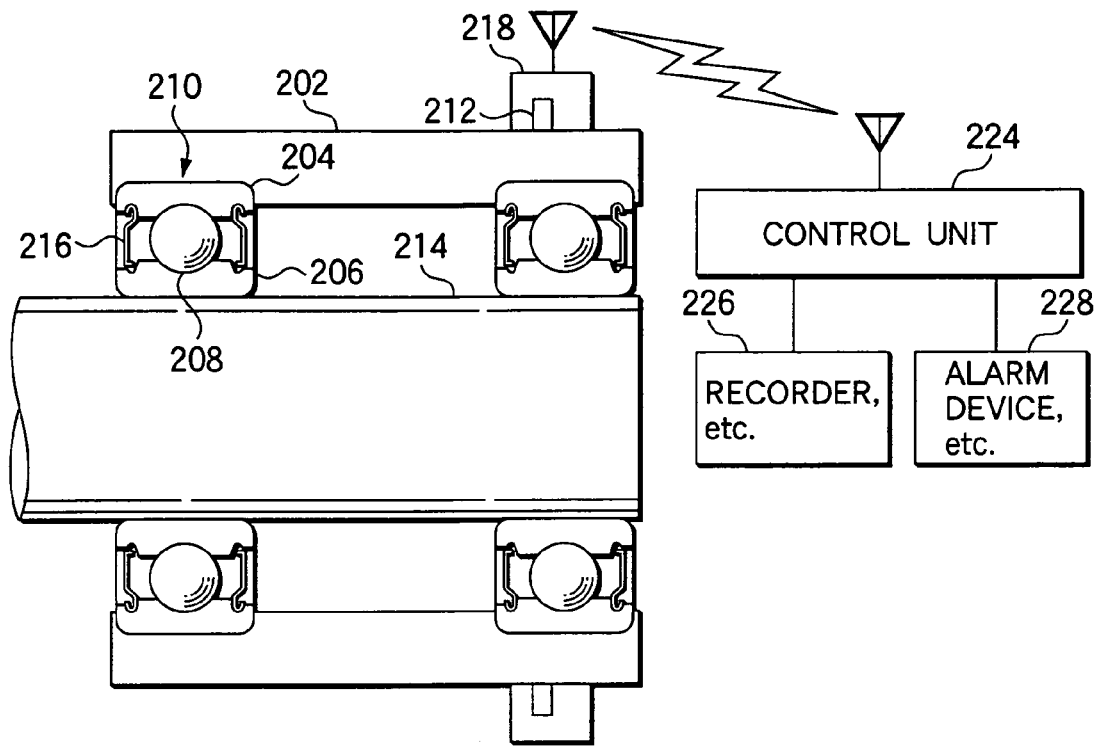
FIG. 21 is a sectional view schematically showing the configuration of a bearing unit with sensor according to a seventh embodiment.
Figure 22:
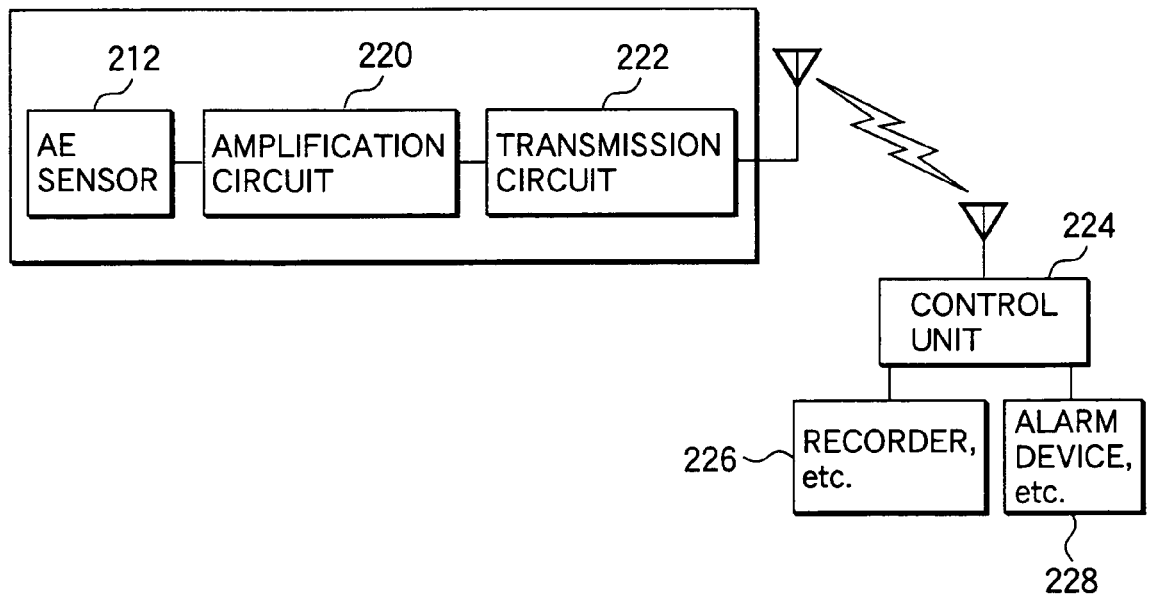
FIG. 22 is a block diagram showing the circuitry of a sensor holder in which an acoustic detection sensor (AE sensor) has been incorporated.

As shown in FIG. 21, the bearing unit with sensor according to the seventh embodiment has a rolling bearing 210 incorporated in a housing 202, and at least one acoustic detection sensor 212 for detecting the vibration condition of the rolling bearing 210. The rolling bearing 210 includes at least outer and inner rings 204 and 206 rotatable relatively to each other, and a plurality of rolling elements 208 disposed between the outer and inner rings. The acoustic detection sensor 212 is set on at least one of the outer ring 204, a member (e.g., housing 202) attached to the outer ring 204, the inner ring 206 and a member (e.g., shaft 214) attached to the inner ring 206. The acoustic detection sensor 212 is provided so that an output of the acoustic detection sensor 212 is transmitted to the outside by wireless.

In this embodiment, the outer ring 204 is attached to the housing 202 while the inner ring 206 is attached to the shaft 214. In this case, any system can be selected from an outer ring rotating (inner ring stationary) system for rotating the outer ring 204, an inner ring rotating (outer ring stationary) system for rotating the inner ring 206 and a system for rotating the outer and inner rings 204 and 206 mutually. In addition, other constituent members such as a retainer (not shown), a sealing plate (contact or non-contact seal or shield) 216, and so on, can be selected in accordance with necessity.

The acoustic detection sensor 212 is formed so that a vibratory wave mechanically generated with a frequency of not lower than tens of kHz can be converted into an electric signal. Specifically, the acoustic detection sensor 212 detects a vibratory wave, replaces the vibratory wave by a change of voltage level and outputs an electric signal corresponding to the voltage value at that point of time. Examples of wave estimated as the vibratory wave include: a vibratory wave generated during the operation of the bearing unit with sensor (rolling bearing 210); and a vibratory wave generated from the bearing unit with sensor (rolling bearing 210) by a shock load given from the outside. Such vibratory waves have various frequency characteristics in accordance with the behavior of the vibration source. For example, the vibratory waves may include: a vibratory wave of a low frequency component which can be detected relatively easily; and a vibratory wave of a high frequency component which is very weak.

Particularly, a vibratory wave of a high frequency component appears as an initial symptom of abnormal vibration caused by infinitesimal deformation, microcrack, abrasion, flaking, etc. of the constituent members (such as the outer ring 204, the member attached to the outer ring 204, the inner ring 206, and the member attached to the inner ring 206) of the bearing unit with sensor (rolling bearing 210) before the constituent members result in being deformed or failed. On this occasion, the vibratory wave serves as a weak elastic wave of a high frequency component with a frequency of not lower than tens of kHz (i.e., an elastic wave in an ultrasonic region). In this embodiment, therefore, the acoustic detection sensor 212 is used for detecting the condition of vibration of the elastic wave sensitively. In this case, a known AE (acoustic emission) sensor can be generally used as the acoustic detection sensor 212. Incidentally, an AE sensor 212 as an example of the acoustic detection sensor 212 is shown in the drawings.

The acoustic detection sensor (AE sensor) 212 is set in a state in which the acoustic detection sensor 212 has been incorporated in a sensor holder 218. An amplification circuit 220, a transmission circuit 222 for transmitting the output of the acoustic detection sensor 212 amplified by the amplification circuit 220 to the outside, and so on, (see FIG. 22) are also provided in the sensor holder 218.

The transmission circuit 222 converts the output of the acoustic detection sensor 212 into a signal wave of a predetermined frequency component so that the signal wave can be transmitted to the outside by wireless. A radio wave, a light wave, an ultrasonic wave or the like with a predetermined frequency component can be anticipated as the signal wave. The signal wave can be set to have various frequency components in accordance with the purpose, environment and so on in which the bearing unit with sensor will be used.

A method of setting the sensor holder 218 in which the acoustic detection sensor 212 has been incorporated is not particularly limited if the method can surely fix the sensor holder 218 to the outer ring 204, the member (e.g., housing 202) attached to the outer ring 204, the inner ring 206 or the member (e.g., shaft 214) attached to the inner ring 206. For example, any one of various methods such as a bonding method using an adhesive agent, a screwing method or a fitting method can be used. In this embodiment, the method in which the sensor holder 218 is fixed to the housing 202 is shown as an example.

In this configuration, a vibratory wave generated during the operation of the bearing unit with sensor (rolling bearing 210) is detected by the acoustic detection sensor (AE sensor) 212. The detection signal of the acoustic detection sensor 212 is amplified by the amplification circuit 220 and then converted into a signal of a predetermined frequency component by the transmission circuit 222. The signal is transmitted to the outside by wireless. On this occasion, a control unit 224 controls a recorder 226 to perform recording/tabulating processing about the condition of vibration of the bearing unit with sensor (rolling bearing 210) and controls an alarm device 228 to perform monitoring/alarming processing on the bearing unit with sensor (rolling bearing 210), on the basis of the detection signal transmitted from the sensor holder 218 by wireless.

In this manner, in accordance with the seventh embodiment, a vibratory wave in a wide range of from a very weak vibratory wave to a large vibratory wave can be detected sensitively because the acoustic detection sensor (AE sensor) 212 is used. Particularly, even in the case where the rolling bearing rotates at a low speed, an initial symptom of abnormal vibration caused by infinitesimal deformation, microcrack, abrasion, flaking, etc. of the constituent members can be detected sensitively before the constituent members result in being deformed or failed. As a result, the symptom that the bearing unit with sensor (rolling bearing 210) begins to become abnormal can be detected in an early stage, so that preventive maintenance of the unit can be attained in advance.

Moreover, in this embodiment, various cables used in the related art need not be used because the output of the acoustic detection sensor (AE sensor) 212 is transmitted by wireless. Hence, the manufacturing cost can be reduced. Moreover, reduction in size of the unit can be attained because it is unnecessary to secure a space for laying such cables in the unit.

Incidentally, the invention is not limited to the aforementioned embodiment, and various changes may be made as follows.

Figure 23:
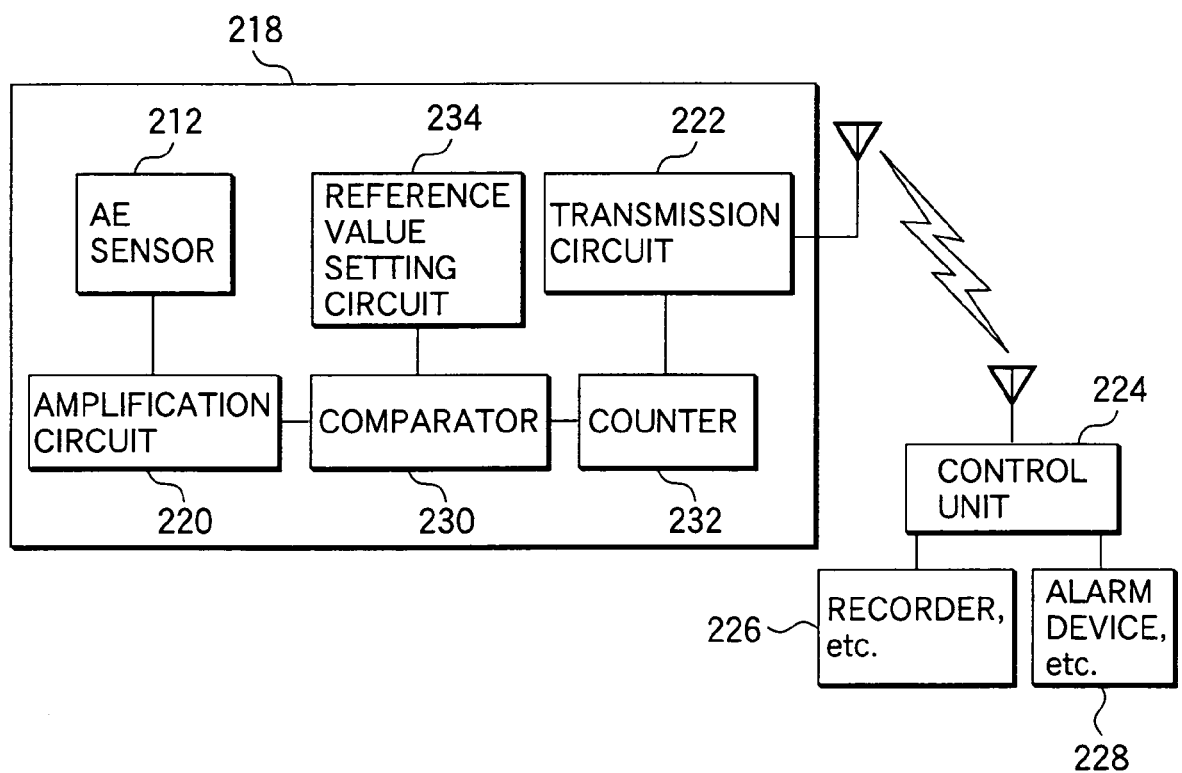
FIG. 23 is a block diagram showing the circuitry of a sensor holder according to a modification of the seventh embodiment.

For example, as shown in FIG. 23, a comparator 230 for comparing the output of the acoustic detection sensor (AE sensor) 212 with a reference value and a counter 232 for counting up the number of times within a predetermined time period whenever the output of the acoustic detection sensor 212 exceeds the reference value may be additionally provided in the sensor holder 218 so that the transmission circuit 222 can transmit the count value to the outside. Incidentally, the reference value can be set optionally (in accordance with the purpose, environment and so on in which the unit will be used) by a reference value setting circuit 234 in advance. According to this modification, the same effect as the effect of the aforementioned embodiment can be obtained and, moreover, the number of times in occurrence of abnormal vibration, the magnitude of vibration, and so on, can be detected in detail when the reference value is set suitably.

Incidentally, the function of the alarm device 228 may be incorporated in the sensor holder 218 so that the transmission circuit 222 transmits an alarm output when the count value of the counter 232 reaches a predetermined value or larger. Further, when a band-pass filter is inserted in between the amplification circuit 220 and the comparator 230 so that the number of times in occurrence of abnormal vibration with only a specific frequency can be detected, more detailed detection can be made. Incidentally, the frequency of the band-pass filter may be preferably selected suitably in accordance with a subject of the detection. Further, when a plurality of band-pass filters are provided so that the number of times in occurrence of abnormal vibration in a plurality of frequency bands can be detected more in detail, more detailed detection can be made.

Though not described particularly in the seventh embodiment, an electric source (not shown) such as a battery and a power generating mechanism (not shown) such as a solar cell may be additionally provided in the sensor holder 218. In this configuration, the degree of freedom for the location of the sensor holder 218 can be improved because any circuitry (e.g., the acoustic detection sensor (AE sensor) 212, the amplification circuit 220, the transmission circuit 222, etc.) incorporated in the sensor holder 218 can be controlled to be driven without necessity of any external electric source.

Further, a magnet (not shown) and a coil (not shown) may be disposed on a rotating portion (e.g., the outer ring 204, the inner ring 206, etc.) of the bearing unit with sensor (rolling bearing 210) and on a fixed portion (e.g., the housing 202 attached to the outer ring 204 in the inner ring rotating system, the shaft 214 attached to the inner ring 206 in the outer ring rotating system, etc.) opposite to the rotating portion respectively to thereby form a power generator so that any circuitry incorporated in the sensor holder 218 can be controlled to be driven by the power generator. Incidentally, in this case, it is preferable that a battery is additionally provided as a storage battery.

According to the seventh embodiment, there can be achieved a bearing unit with sensor which can detect the condition of vibration in a frequency range of from a low frequency to a high frequency and which is inexpensive and compact.

Eighth and ninth embodiments of the bearing unit with sensor according to the invention will be described below with reference to FIGS. 24 and 25. Incidentally, these embodiments need not be specifically understood but they show only examples of the invention.

Figure 24:
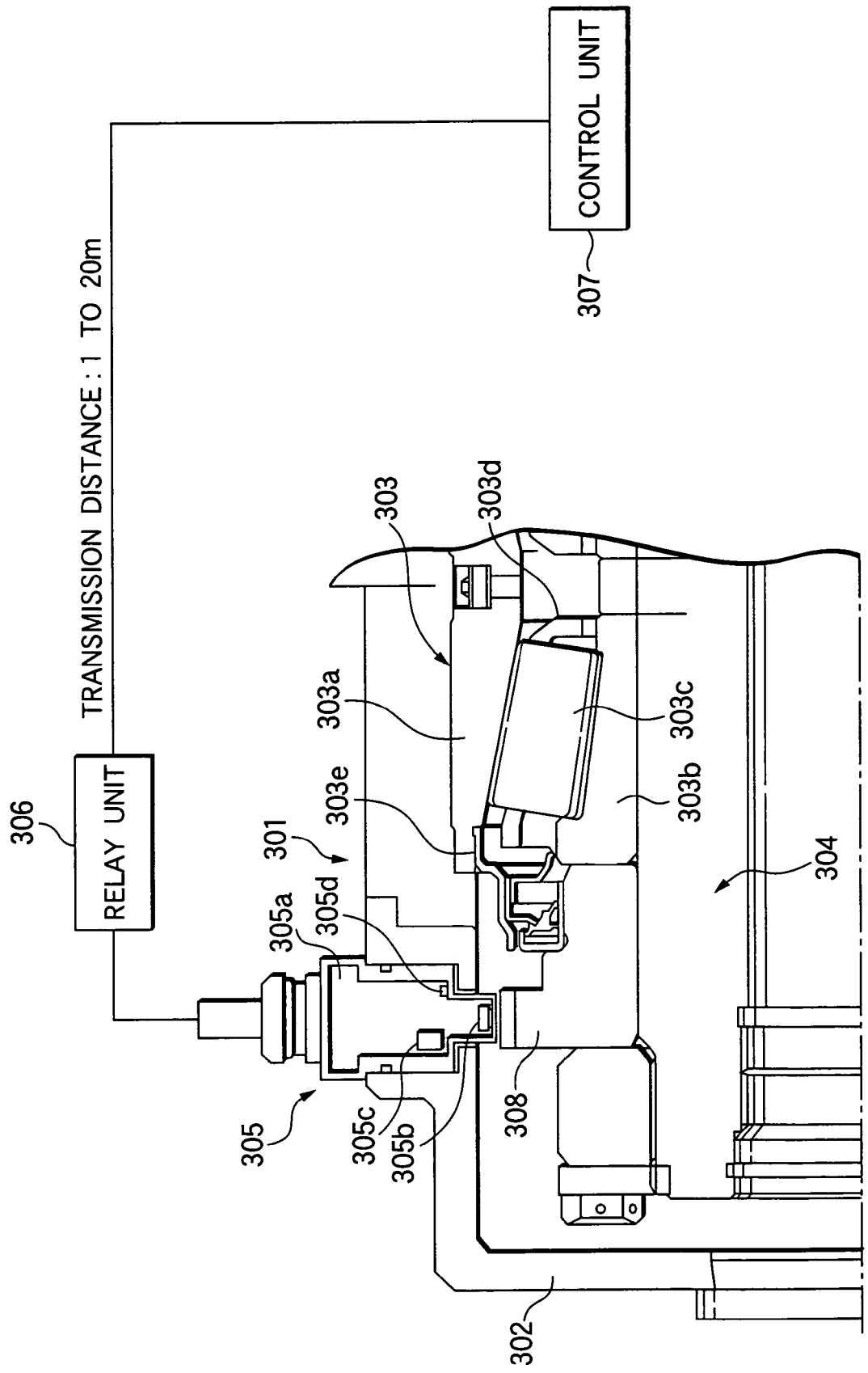
FIG. 24 is a schematic view partially showing a bearing unit according to an eighth embodiment of the invention.

FIG. 24 shows the eighth embodiment of the invention. This embodiment shows an example of application of the invention, that is, the case where the invention is applied to a railway vehicle bearing. A bearing 303 is put in the inside of an axle box 301. An integral-type sensor 305 is attached to a cover 302 which is attached to the axle box 301.

The bearing 303 has at least an outer ring 303a, an inner ring 303b, and a plurality of rolling elements 303c disposed between the outer and inner rings 303a and 303b. In this embodiment, the bearing 303 is a tapered roller bearing in which the outer ring 303a as a stationary ring is attached to the axle box 301 while the inner ring 303b as a rotating ring is fixed to an axle 304. Incidentally, other constituent bearing members such as a retainer 303d, a sealing device 303e, etc. of the bearing can be selectively used in accordance with necessity.

Although this embodiment shows the case where the invention is applied to an inner ring rotating system, the scope of the invention includes the case where the invention is applied to an outer ring rotating system. Although this embodiment shows the case where a tapered roller bearing is used, the invention may be applied also to the case where a ball bearing or a cylindrical roller bearing is used.

The integral-type sensor 305 is formed so that a rotation speed sensor 305b, a vibration sensor 305c, a temperature sensor 305d, etc. for detecting and monitoring the condition of the bearing unit, such as the rotation speed of the axle 304, the temperature of the bearing 303, etc., are incorporated in a single sensor holder 305a. A ring 308 machined to have irregular teeth in its outer circumferential surface is attached to the axle 304 so as to provide the integral-type sensor 305 with a function as an encoder for detecting the rotation speed.

Although this embodiment shows the case where all the aforementioned three kinds of sensors are incorporated as sensors for detecting the condition of the bearing unit, the invention may be applied also to the case where at least one sensor is incorporated. The invention is not limited to the embodiment but the aforementioned sensors are only shown by way of example. Although this embodiment shows the case where the integral-type sensor 305 is integrally attached to the cover 302 attached to the axle box 301, the scope of the invention may include the case where the integral-type sensor 305 is attached directly to the stationary ring, that is, the outer ring 303a in this embodiment.

Respective signal lines from the sensors come out of the integral-type sensor 305 through a cable and are connected to a relay unit 306 disposed near the integral-type sensor 305 or near the bearing 303.

The relay unit 306 includes amplification circuits for amplifying the respective signals. At the same time the respective signals are amplified, impedance in output signals is reduced to thereby reduce the influence of noise on signal transmission.

The relay unit 306 further includes circuits for amplifying the voltages of sensor output signals, for reducing impedance in the output signals and for converting the output signals into current output signals. Hence, the output signals are converted into output signals which are prevented from being influenced by noise or by wiring impedance so that the output signals are adapted to long-distance transmission.

Incidentally, when current output signals are used, the signals are hardly influenced by wiring impedance. The relay unit 306 may include a constant-voltage electric source (a constant-voltage regulator, a DC-DC converter, a constant-voltage diode, etc.) for keeping the power-supply voltage supplied to the sensors constant and keeping the power-supply voltage supplied to the circuits in the relay unit 306 constant.

The relay unit 306 is preferably disposed at a distance of 2 m or less from the integral-type sensor 305 or the bearing unit as a whole in order to avoid the influence of noise. That is, the length of the cable for connecting the relay unit 306 and the integral-type sensor 305 to each other is preferably selected to be not larger than 2 m. If the length of the cable is larger than 2 m, the signals are influenced by noise while the signals go from the integral-type sensor 305 to the relay unit 306.

Therefore, the relay unit 306 is disposed near the integral-type sensor 305 or near the bearing unit. Signals of the integral-type sensor 305 are received by the relay unit 6. In the relay unit 306, the signals of the integral-type sensor 305 are amplified and converted into signals adapted to long-distance transmission. Then, the signals adapted to long-distance transmission are transmitted to the control unit 307 which is attached to the railway vehicle body side and which is 10-20 m distant from the relay unit 306. Accordingly, the signals are hardly influenced by external noise and wiring impedance on the way of long-distance transmission. As a result, the signals of the integral-type sensor 305 can be transmitted to the control unit 307 attached to the railway vehicle body side, in the state where the signals are prevented from being influenced by output waveform distortion, noise or wiring impedance. Moreover, there is nothing to be done but the signals of the integral-type sensor 305 are transmitted to the relay unit 306 at a short distance. Hence, circuits for amplifying the detection signals, for reducing impedance in the output signals and for converting the output signals into current output signals need not be provided in the inside of the sensor body. It is also unnecessary to provide any circuit for converting the signals into signals adapted to long-distance transmission. Accordingly, the size of the integral-type sensor can be reduced because circuits for amplifying signals need not be provided in the sensor. Incidentally, processing circuits for transmitting the detection signals to the relay unit 306 may be incorporated in the integral-type sensor 305 as occasion demands. Structurally, the integral-type sensor 305 is often disposed in the place such as the cover 302 of the axle box 301, the axle box 301, the outer ring 303a, or the like, exposed to strong vibration and heat generated in the bearing. Even in such a case, in accordance with the configuration of the invention, required minimum electronic circuits may be mounted in the integral-type sensor 305 so that it is unnecessary to dispose the relay unit 306 in a place severe in environmental conditions of vibration, temperature, etc. Thus, electronic circuits in the relay unit 306 can be prevented from being exposed to strong vibration and high temperature. As a result, the reliability of the bearing unit with sensor can be improved. Incidentally, connectors may be provided between the sensor and the relay unit and between the relay unit and the control unit. In addition, when a connector is provided between the relay unit and the control unit, the integral-type sensor, the relay unit and the signal cable may be formed as an assembly. Although the eighth embodiment has been described upon the type in which signals are transmitted from the relay unit 306 to the control unit 307 by wire, the invention may be applied also to the case where signals are transmitted by wireless. In this case, there may be used a relay and a control unit each having a communication function, for example, using a radio wave, light, an ultrasonic wave, or the like, for transmitting or transmitting/receiving data by wireless.

In this manner, when signals are transmitted or transmitted/received between the relay unit 306 and the control unit 307 by wireless, it is unnecessary to lay the cable on a long distance. Hence, the number of man-hours for laying the cable can be reduced. Moreover, because it is unnecessary to lay the cable on a long distance, the possibility that the cable will be broken can be reduced.

Figure 25:
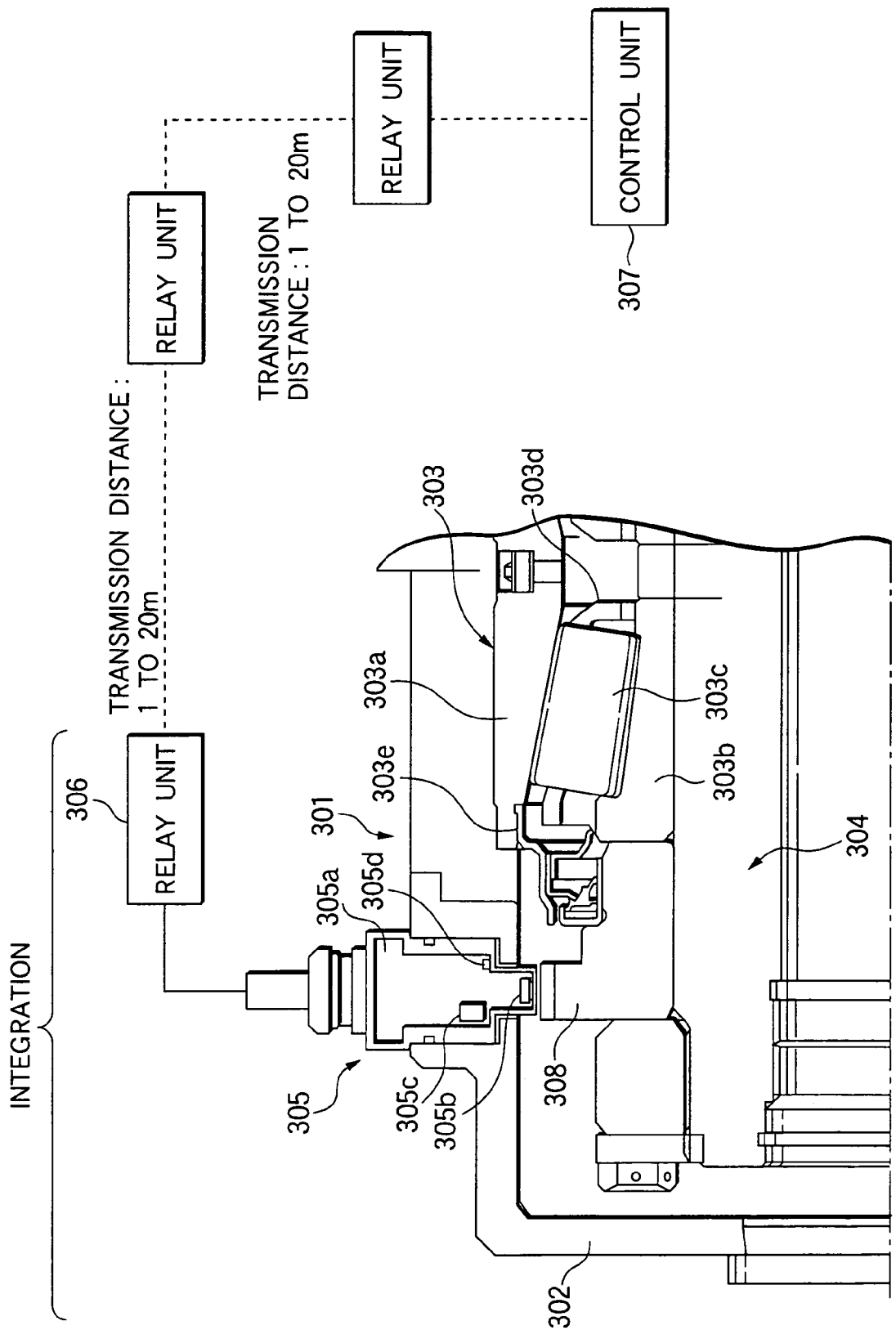
FIG. 25 is a schematic view partially showing a bearing unit according to a ninth embodiment of the invention.

FIG. 25 shows the ninth embodiment of the invention. This embodiment shows the case where the relay unit 306 is provided in a part of the signal cable through which signals are output from the integral-type sensor 305, so that data is transmitted or transmitted/received by the relay unit by wireless. In this embodiment, three relay units are provided between the integral-type sensor and the control unit. It is preferable that signals are transmitted not only via one relay unit but via a plurality of relay units as in this embodiment so that the transmission distance can be extended. That is, on the assumption that one relay unit can transmit signals by the distance of 20 m, 60 m signal transmission can be achieved by providing three relay units before the control unit as in this embodiment. Incidentally, the same things can be applied to the case of wire transmission. When there is a limit in the signal transmission distance with one relay unit, signal transmission may be carried out via a plurality of relay units. Thus, the transmission distance can be further extended. Other configuration, operation and effect are equal to those in the first embodiment, and the description thereof will be omitted.

In the eighth and ninth embodiments, the relay unit is disposed near the integral-type sensor or near the bearing. Signals of the sensors are received by the relay unit. In the relay unit, the signals of the sensors are amplified and converted into signals adapted to long-distance transmission. Then, the signals adapted to long-distance transmission are transmitted to the control unit which is 1-20 m distant from the relay unit and which is attached to the railway vehicle body side. Accordingly, the signals are hardly influenced by external noise or wiring impedance on the way of long-distance transmission. As a result, the signals of the sensor can be transmitted to the control unit attached to the vehicle body side, in the state where the signals are prevented from being influenced by output waveform distortion, noise and wiring impedance.

Moreover, in the invention, required minimum electronic circuits can be mounted in the integral-type sensor 305. Thus, electronic circuits in the relay unit 306 can be prevented from being exposed to strong vibration and high temperature at a place severe in environmental conditions of vibration, temperature, etc. Hence, the reliability of the bearing unit with sensor can be improved.

A bearing unit with sensor according to a tenth embodiment of the invention will be described below with reference to the accompanying drawings. Although the following description will be made upon a tapered roller bearing as an example of the bearing unit with sensor, it is a matter of course that the bearing unit with sensor is not limited thereto and that the invention may be applied also to a spherical roller, a cylindrical roller bearing, a ball bearing and an angular contact ball bearing.

Figure 26:
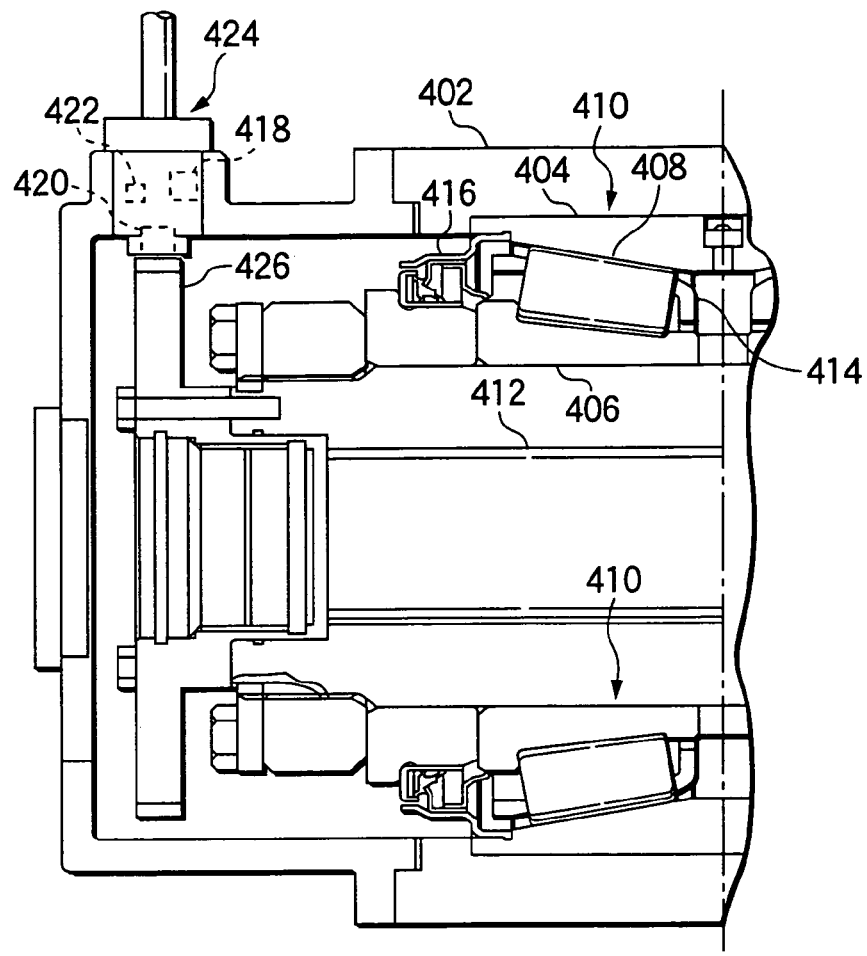
FIG. 26 is a schematic view partially showing a bearing unit with sensor according to a tenth embodiment of the invention.

As shown in FIG. 26, the bearing unit with sensor according to the tenth embodiment has a roller bearing 410 incorporated in a housing 402, and at least one sensor for detecting the operating condition of the rolling bearing 410. The rolling bearing 410 includes at least outer and inner rings 404 and 406 rotatable relative to each other, and a plurality of rolling elements 408 disposed between the outer and inner rings. The bearing unit with sensor is provided so that at least the condition of vibration of the rolling bearing 410 can be measured constantly by the sensor.

In this embodiment, the outer ring 404 is attached to the housing 402 while the inner ring 406 is attached to a rotating shaft 412. Incidentally, any system can be selected from an outer ring rotating (inner ring stationary) system for rotating the outer ring 404, an inner ring rotating (outer ring stationary) system for rotating the inner ring 406 and a system for rotating the outer and inner rings 404 and 406 mutually. In addition, other constituent members such as a retainer 414, a sealing plate (contact or non-contact seal or shield) 416, and so on, can be selected in accordance with necessity.

Further, in this embodiment, a bi-morpheme piezoelectric element as a vibration sensor 418 of a double end support structure, a rotation speed sensor 420 for measuring the rotation speed of the rolling bearing 410 and a temperature sensor 422 for measuring the temperature of the rolling bearing 410 are used as the sensor. These sensors, together with various kinds of electronic elements for driving the respective sensors, are incorporated in a single sensor holder 424 and integrated with the sensor holder 424.

The rotation speed sensor 420 is disposed opposite to a pulsar ring 426 attached to the shaft 412. The rotation speed sensor 420 is provided so that rotation speed can be measured on the basis of the change of magnetic flux density generated during the operation of the rolling bearing 410. As the rotation speed sensor 420, for example, there can be used a hall element or hall IC using the Hall effect, or an MR element (magneto resistance element) or GMR element (giant magneto resistance element) which is a magneto-resistance element having a resistance value changing in accordance with the change of magnetic flux. As the temperature sensor 422, for example, there can be used a thermistor, a temperature IC, a platinum resistance termometer, a thermocouple, or the like.

Particularly the temperature IC is preferably used as the temperature sensor 422 because of its excellent linearity in the output characteristic.

Figure 27A:
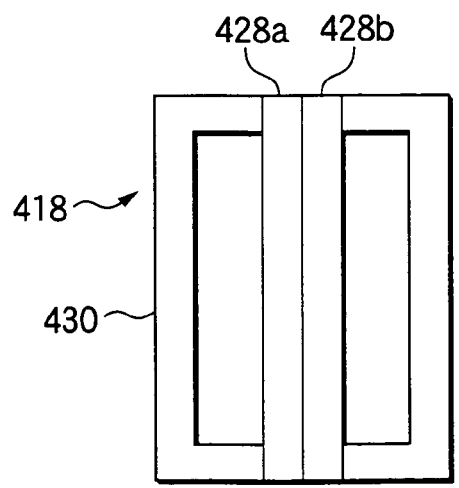
FIGS. 27A and 27B are plan views showing the configuration of a vibration sensor.
Figure 27B:
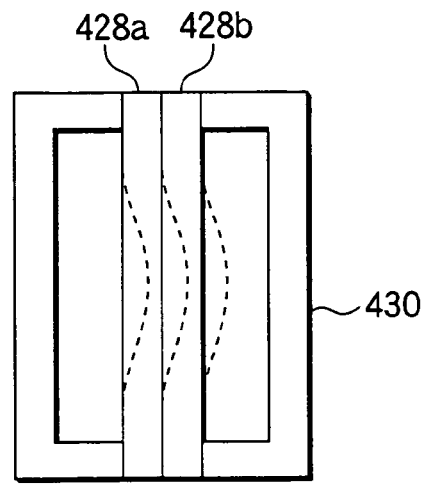

As shown in FIGS. 27A and 27B, the vibration sensor 418 forms a structure in which opposite ends of a laminate of two piezoelectric elements 428a and 428b stuck to each other are supported by a package 430. In this configuration, when acceleration of vibration acts on the vibration sensor 418 during the operation of the rolling bearing 410, the piezoelectric elements 428a and 428b are bent and deformed so that electric charge is accordingly generated in the piezoelectric elements 428a and 428b. When the electric charge generated on this occasion is detected, the condition of vibration of the rolling bearing 410 can be measured on the basis of the detected electric charge. Incidentally, FIG. 27A shows a state (at inactive acceleration) in which acceleration of vibration does not act on the vibration sensor 418, and FIG. 27B shows a state (at active acceleration) in which acceleration of vibration acts on the vibration sensor 418 so that the piezoelectric elements 428a and 428b are bent and deformed.

Incidentally, the vibration sensor may be preferably disposed in a direction in accordance with the acceleration of vibration to be measured. When vibration is to be measured in two or more directions, the vibration sensor may be disposed to be inclined at a predetermined angle with respect to the direction of acceleration of vibration or two or more vibration sensors may be used.

As described above, a bi-morpheme piezoelectric element of a double end support structure is used as the vibration sensor 418. Hence, even in the case where strong vibration or impact acts on the vibration sensor 418, the piezoelectric elements 428a and 428b can be prevented from being broken. Particularly, the vibration sensor 418 is suitable for use in an unsprung structure of a railway vehicle. Even in the case where strong impact during the movement of the railway vehicle acts on the rolling bearing 410 or the vibration sensor 418, the piezoelectric elements 428a and 428b are not broken easily. The vibration sensor 418 is excellent in impact resistance as described above and high in resonant frequency compared with a vibration sensor of a cantilever structure. Accordingly, the condition of vibration in a high frequency region can be detected accurately. As a result, a delicate change of vibration (abnormal vibration, vibration at an early stage of failure in the bearing, etc.) can be measured sensitively.

As various kinds of electronic elements for driving the respective sensors 418, 420 and 422, there are used drive circuits (not shown) and amplification circuits (amplifiers) 432 (see FIGS. 28 and 29) for amplifying output signals of the respective sensors (especially, the vibration sensor 418). The various kinds of electronic elements, together with the sensors 418, 420 and 422, are mounted on a predetermined printed wiring board (not shown). Because the sensors are directly mounted on the printed wiring board, it is unnecessary to provide electric wires for connecting the sensors to the various kinds of electronic elements respectively. Moreover, it is unnecessary to provide fixing parts for fixing the sensors to sensor bodies respectively as in the background art. Hence, the unit can be made compact. If there are electric wires for connection as in the background art, there is a fear that the electric wires may be broken because of fatigue of the electric wires due to time change and external vibration. On the contrary, when the sensors are mounted on the printed wiring board as in this embodiment, the reliability of the sensors can be improved because there is no disadvantage such as aged deterioration or disconnection.

As a method in which the printed wiring board having the sensors mounted thereon is fixed into the sensor holder 424, for example, there can be used screwing or resin molding.

In the case of screwing, the printed wiring board may be directly fixed into the sensor holder 424. In order to improve assembling efficiency, the printed wiring board may be preferably fixed to a fixing member before the fixing member is fixed into the sensor holder 424.

In the case of resin molding, portions on which the sensors and the various kinds of electronic elements have been mounted may be preferably surrounded by flexible silicone rubber or by foaming rubber and then molded of hard molding resin in order to prevent the sensors and the various kinds of electronic elements from being broken due to the difference in thermal expansion coefficient between the material (generally, metal) of the sensor holder 424 and the molding resin. Alternatively, the sensors and the various kinds of electronic elements may be surrounded by a hollow metal housing in order to prevent the sensors and the various kinds of electronic elements from being broken due to the difference in thermal expansion coefficient. A description will be given below of an embodiment of the sensor holder using a silicon rubber and a forming rubber.

Figure 33:
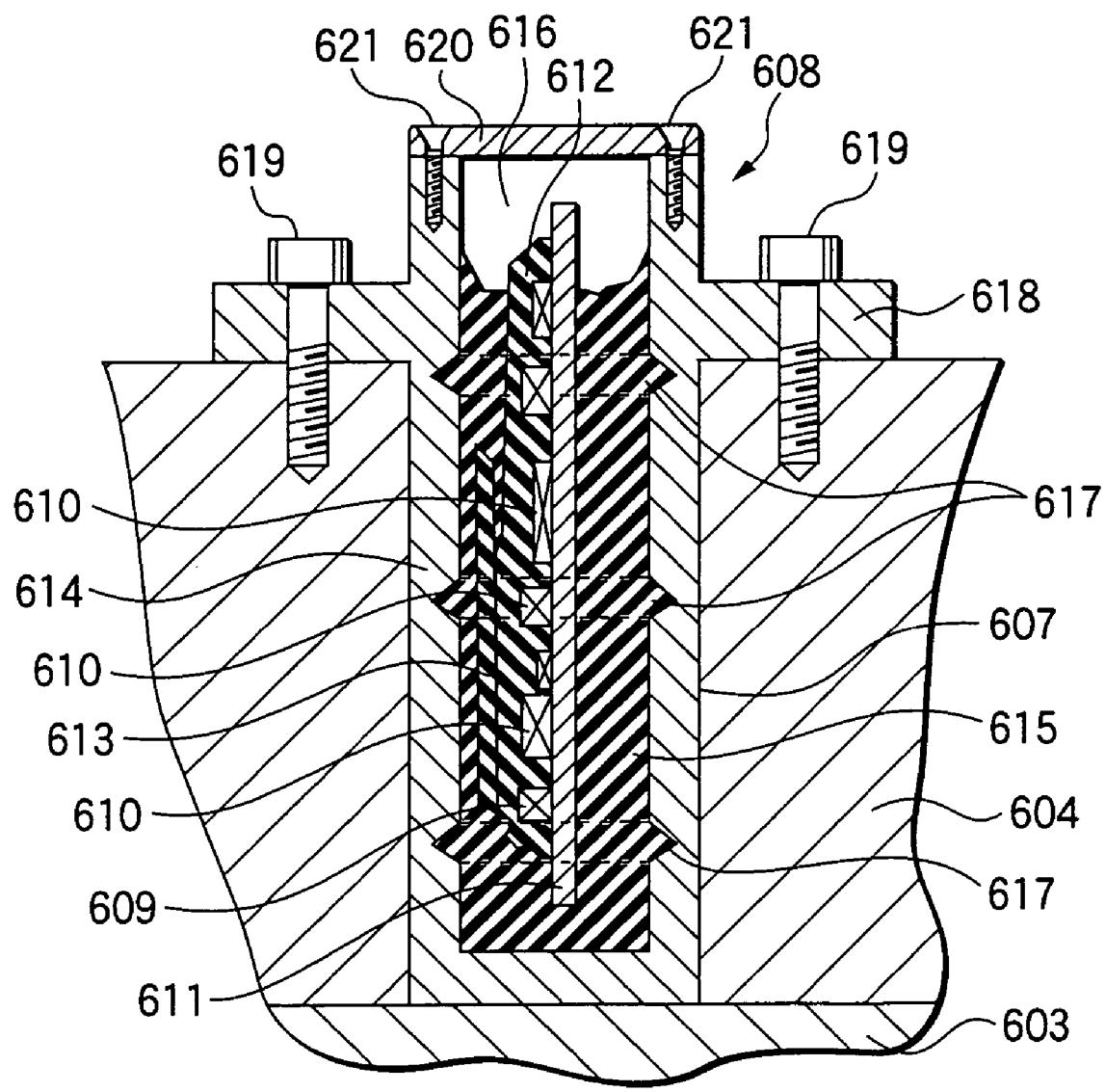
FIG. 33 is a schematic view showing the configuration of the sensor holder using a resin mold.

This sensor 608 has a detection unit 609 and circuit components 610 as shown in FIG. 33. The detection unit 609 detects vibration and temperature. The circuit components 610 process a signal detected by the detection unit 609. The detection unit 609 and the circuit components 610 are mounted on a circuit board 611 respectively. The portions of the circuit board 611 where the detection unit 609 and the circuit components 610 have been mounted are covered with soft resin (e.g. silicone resin) 612. Then, a buffer material 613 such as foaming silicone resin having closed cells is put into a sensor case 614 as a vessel, together with the circuit board 611, and hard resin (e.g. epoxy resin) 615 is charged as filler not to leave any space between the circuit board 611 and the sensor case 614. Thus, the circuit board 611 is fixed into the sensor case 614. At this time, the soft resin 612 is partially exposed from the hard resin 615. In addition, a plurality (three in this embodiment) of grooves 617 each having a tapered triangular shape in section are provided as stopper portions in the inner surface of the sensor case, and the charged hard resin 615 enters the grooves 617 closely. The sensor case 614 is provided with a flange 618 in its outer surface, and fixed to a housing 604 by a bolt 619. In addition, a cover 620 is attached to an opening portion 616 by a countersunk screw 621.

The sensor 608 attached thus detects vibration caused by the rotation of the shaft supported by the bearing unit or heat generated due to rolling friction. At this time, since the circuit board 611 on which the detection unit 609 and the circuit components 610 are mounted, is fixed by the hard resin 615, the sensor 608 is settled into a small size. In addition, since the circuit board 611 on which the detection unit 609 is mounted, is firmly fixed into the sensor case 614 by the hard resin 615, a subject of detection such as vibration of the bearing unit can be detected accurately.

In addition, since the detection unit 609 is circumferentially covered with the soft resin 612 and the hard resin 615 is charged into a space between the detection unit 609 and the sensor case 614, the change of temperature transmitted through the resins 612 and 615 is detected in the detection unit 609. That is, the heat transmission path is limited so that the change of temperature can be detected accurately. Incidentally, although epoxy resin is mentioned as a specific example of the hard resin 615, it is preferable that hard resin or filler having a higher thermal conductivity is used so that the response to the change of temperature is more sensitive. Then, when the detection unit 609 for detecting the temperature is attached to a position closer to the bearing, the delay of detection with respect to the real change of temperature can be reduced.

After the circuit components 610 mounted on the circuit board 611 of the sensor 608 are covered with the soft resin 612, the circuit board 611 is then fixed into the sensor case 614 together with the buffer material 613 by molding of the hard resin 615 so as to expose the soft resin 612 partially. Thus, even when internal stress is caused by the difference in linear expansion coefficient among the resins 612 and 615 and the sensor case 614 in accordance with the change of temperature, the stress is relaxed by the soft resin 612 and the buffer material 613. Accordingly, there is no fear that the circuit components 610 are broken or the soldering portions between the circuit board 611 and the circuit components 610 are peeled off. Incidentally, it is preferable that foaming silicone resin is used for the buffer material 613 so that the sensor 608 can be used in a higher temperature environment.

In addition, a plurality of grooves 617 operating as stopper portions are formed in the inner surface of the sensor case 614 for receiving the sensor 608, and each of the grooves 617 is formed to have a triangular sectional shape tapered in the depth direction thereof. Accordingly, even when a gap caused by the difference in thermal expansion coefficient between the sensor case 614 and the hard resin 615 appears due to the change of temperature, the hard resin 615 is engaged with the grooves 617. Thus, there is no fear that the hard resin 615 is detached from the sensor case 614. In addition, the distance between convex portions formed by the hard resin 615 entering the plurality of grooves 617 provided in the sensor case 614 becomes inevitably shorter than the distance between the grooves 617. Thus, there is no fear that the detection unit 609 and the circuit board 611 fixed to the sensor case 614 by the hard resin 615 rattle. At this time, it is preferable that the sectional shape of the grooves 617 and the distance between the grooves 617 are determined in consideration of the difference in thermal expansion coefficient between the sensor case 614 and the hard resin 615, the dimensions of the sensor case 614, the temperature range to be used, and so on. In this case, the stress load on the circuit board 611 or the circuit components 610 fixed into the hard resin 615 is relieved.

Incidentally, the shape of each of the grooves 617 may be a trapezoid tapered in the depth direction thereof. In addition, each of the grooves 617 may be continuous circumferentially, but it is preferable that the grooves 617 are provided intermittently. In this case, the hard resin 615 is fixed in the rotating direction. Further, a plurality of through holes, grooves each having a fan shape or a rectangular shape in section, dovetail grooves, axial grooves, or the like, that can obtain effect similar to that of the grooves 617 may be provided in the sensor case 614 instead of the grooves 617. Alternatively, stopper portions projecting on the inner surface of the vessel may be provided instead of such grooves. Then, it is more preferable that the hard resin 615 is charged after an adhesive agent having elasticity is applied to the inner circumferential surface of the sensor case 614. In this case, the dimensional difference between the sensor case 614 and the hard resin 615 caused by the change of temperature is absorbed by the elastic adhesive agent.

At least one groove 617 may be provided as a stopper portion in the vessel 614 receiving the circuit board 611 of the sensor 608. Accordingly, even when a gap appears between the hard resin 615 as filler and the vessel 614 due to the change of temperature, the hard resin 615 is engaged with the stopper portion. Thus, the hard resin 615 can be prevented from being detached from the vessel 614. Then, in the case of a plurality of grooves 617 provided as stopper portions in the inner surface of the vessel 614, even when a gap appears between the hard resin 615 and the vessel 614, the distance between convex portions formed by the hard resin 615 entering the grooves 617 becomes inevitably shorter than the distance between the grooves 617. Thus, there is no fear that the detection unit 609 and the circuit board 611 fixed to the vessel 614 by the hard resin 615 rattle. Further, in the case where the stopper portions project from the inner surface of the vessel 614, even when there appears a gap between the vessel 614 and the hard resin 615 due to the change of temperature, the hard resin 615 is constricted to nip the projecting stopper portions. Thus, there is no fear that the detection unit 609 and the circuit board 611 rattle.

Further, the difference in thermal expansion coefficient between the sensor case 614 and the hard resin 615 may cause external pressure applied from the sensor case 614 to the hard resin 615 in accordance with the change of temperature. Even in such a case, since the soft resin 612 is partially exposed from the hard resin 615, the soft resin 612 is deformed toward the exposed portion. Thus, the stress load on the circuit board 611 or the circuit components 610 is relaxed. Then, the inserted buffer material 613 enhances that effect. Incidentally, when the buffer material 613 is included, the closed cells of the buffer material 613 are deformed to relax the stress. Therefore, the soft resin 612 does not have to be always partially exposed.

Figure 28:
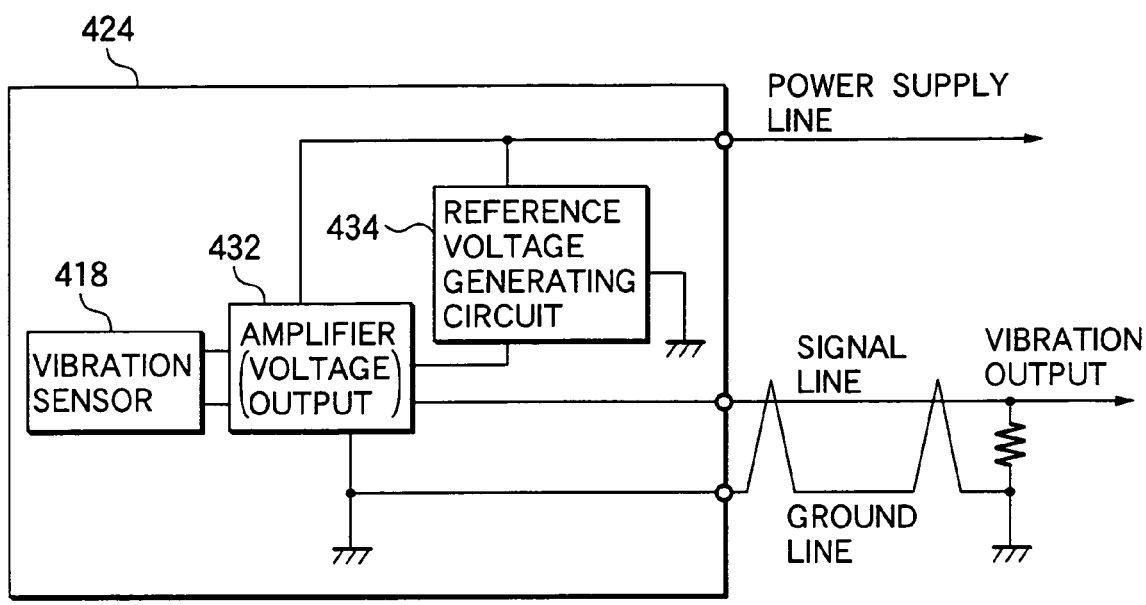
FIG. 28 is a diagram showing the circuitry for a voltage output of the vibration sensor.
Figure 29:
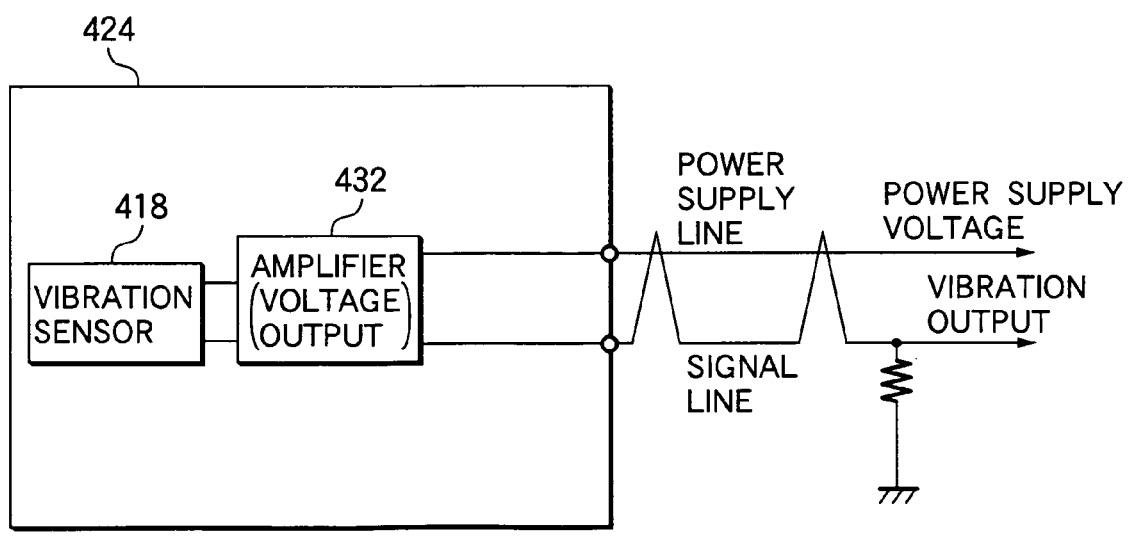
FIG. 29 is a diagram showing the circuitry for a current output of the vibration sensor.
Figure 30:
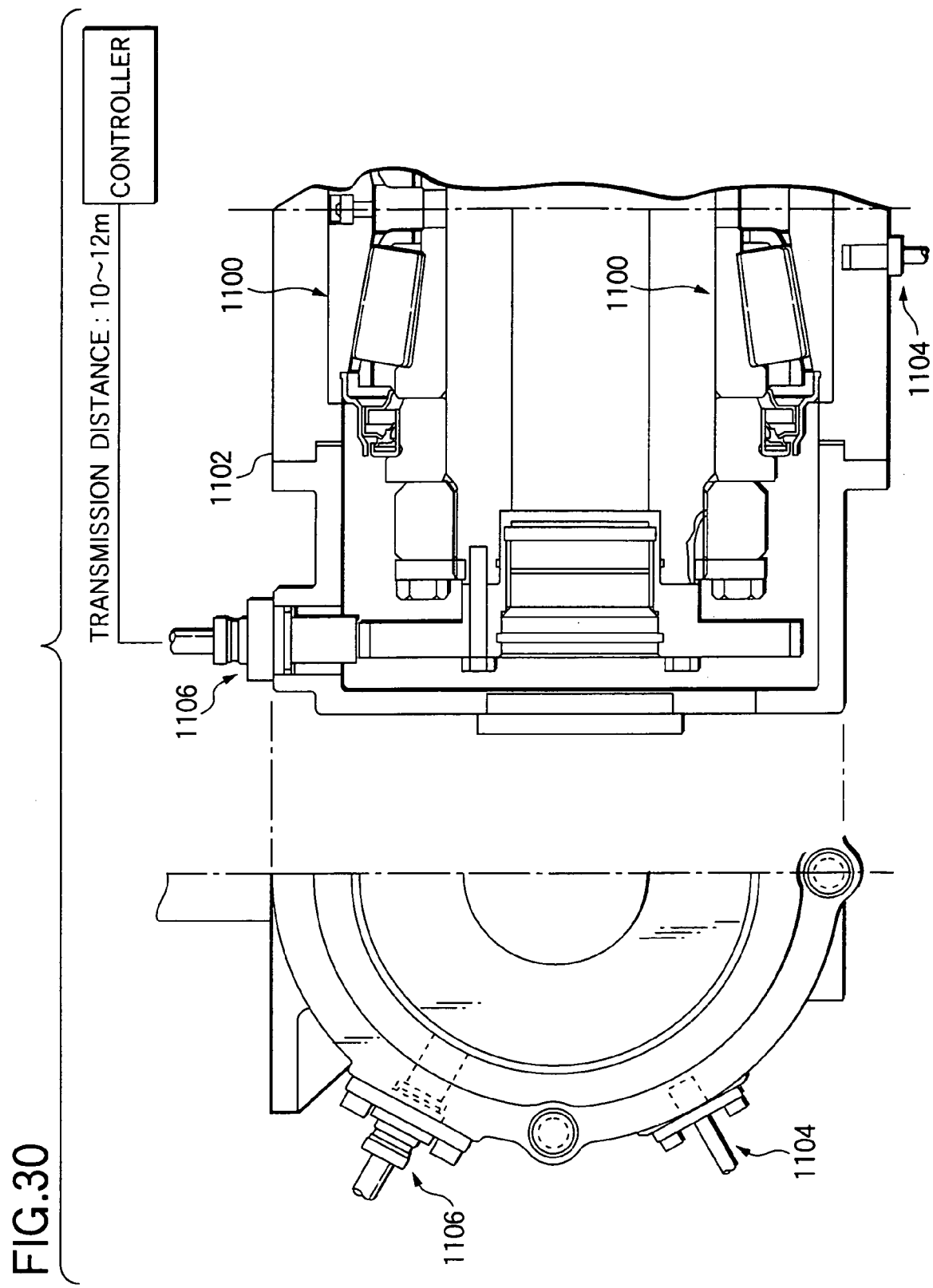
FIG. 30 is a schematic view showing the configuration of a related-art bearing unit.
Figure 31:
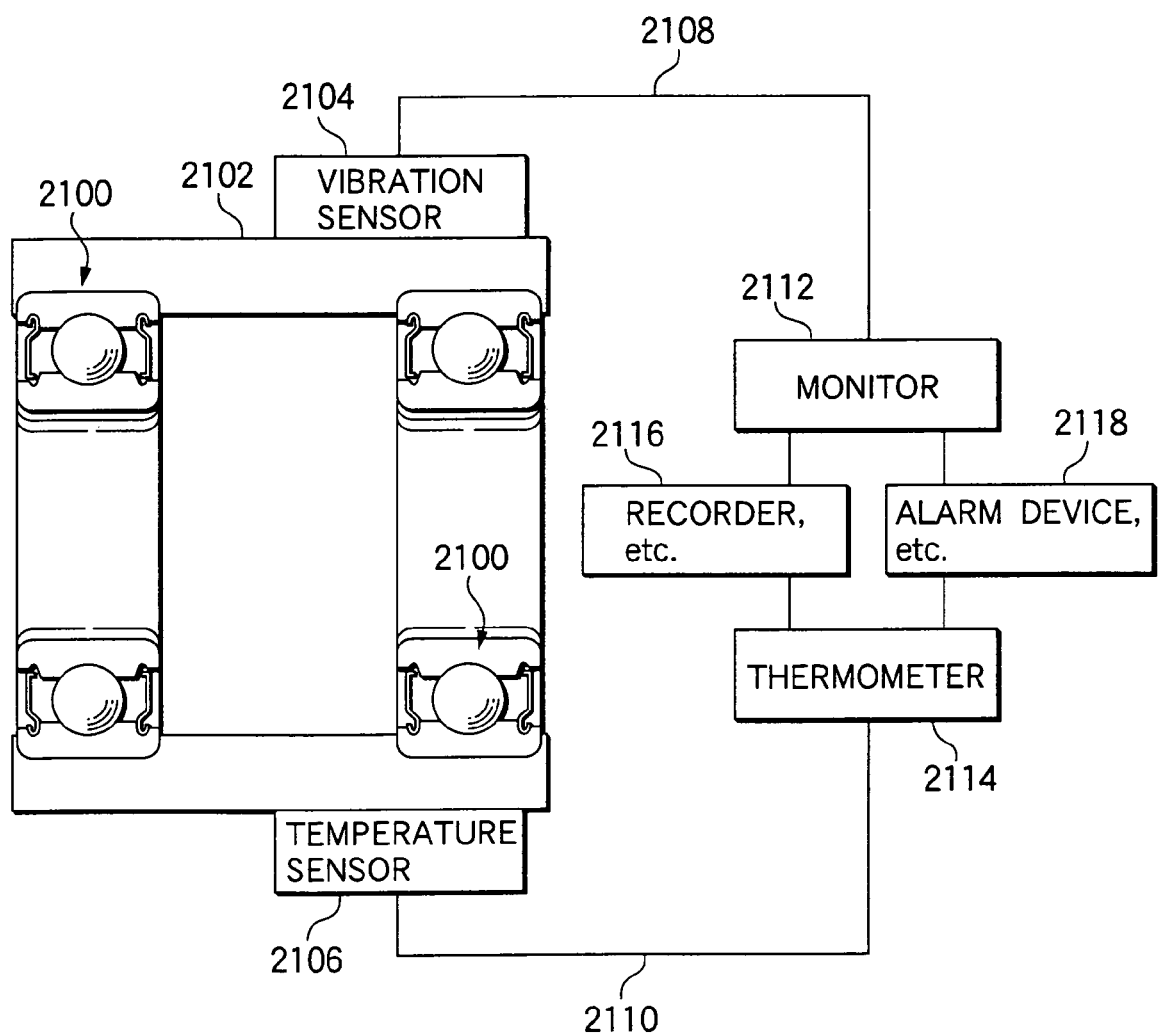
FIG. 31 is a schematic view showing the configuration of a related-art bearing unit with sensor.

Further, as shown in FIGS. 28 and 29, output signals of the sensors (especially, the vibration sensor 418) may be amplified by the amplification circuits (amplifiers) 432 so that the output signals are hardly influenced by noise.

FIG. 28 shows a diagram of the circuitry for the voltage output of the vibration sensor 418.

When acceleration of vibration acts on the vibration sensor 418 during the operation of the rolling bearing 410, electric charge proportional to the direction of the acceleration is generated. On this occasion, a voltage is generated between a plus output terminal and the other output terminal. When the differential voltage between the terminals is measured, an output voltage proportional to the acceleration of vibration can be obtained. In this case, the output voltage may be directly put out to the outside but the output is high in impedance and weak in voltage value. Therefore, the output voltage is amplified by the amplifier 432 as in this embodiment so that a high S/N output voltage can be obtained. Further, a constant voltage generated by a reference voltage generating circuit (a constant-voltage regulator, a DC-DC converter, a reference voltage IC, a reference voltage diode, etc.) 434 is used as a reference voltage so that the output voltage is offset by the reference voltage. As a result, a high S/N output voltage can be obtained without provision of any minus side power supply. In this embodiment, by way of example, a constant voltage of 5 V is used as a reference voltage so that the output voltage of the vibration sensor 418 is amplified by the amplifier 432 in accordance with the reference voltage. In this manner, an output signal (vibration output) of the vibration sensor 418 is obtained.

FIG. 29 shows a diagram of the circuitry for the current output of the vibration sensor 418.

In this configuration, the output signal from the vibration sensor 418 is put out as a current signal to the outside through an amplifier 432. The current output is further hardly influenced by noise compared with the voltage output (see FIG. 28). Hence, the current output is hardly influenced by impedance of the cable. Accordingly, the current output is suitable for long-distance transmission of an output signal.

As shown in FIGS. 28 and 29, in the configuration in which the output of the vibration sensor 418 is amplified by the amplifier 432 and then put out to the outside, the output signal can be provided to be hardly influenced by noise compared with the case where the output signal is put out from the vibration sensor 418 directly to the outside. That is, the vibration sensor 418 using the piezoelectric elements 428a and 428b (see FIGS. 27A and 27B) is apt to be influenced by noise because the output voltage is weak and the impedance is high. However, when the output signal is amplified by the amplifier 432, the output signal becomes high in voltage and the impedance is low. Accordingly, the output signal can be made to be hardly influenced by noise.

In either the voltage output (FIG. 28) or the current output (FIG. 29), when signal lines in the circuitry are twisted, the influence of noise on the output signal can be reduced. In this case, in the circuitry for the voltage output, it is preferable that the output signal line and the ground line are twisted. In the circuitry for the current output, it is preferable that the output signal line and the power supply line are twisted.

Incidentally, the circuitry for the voltage output and the circuitry for the current output can be applied also to the output of the temperature sensor. The S/N ratio of the output signal of the temperature sensor 422 can be improved.

Further, when wiring from the vibration sensor 419 to the amplifier 432 is surrounded by protective wiring in which a reference voltage is set, the influence of noise (noise from the outside and inside of the unit) can be reduced. In this case, it is preferable that protective wiring is laid on the rear surfaces of the vibration sensor 418 and the amplifier 432. When a multi-layer board is used, an interlayer can be used as a protective wiring pattern. In this configuration, noise generated in the inside and outside of the unit can be absorbed to or shielded by the protective wiring. Hence, the influence of noise on the various kinds of electronic elements and the output signal can be reduced. As a result, a high S/N signal can be obtained.

Further, in the aforementioned embodiment, various kinds of sensors and various kinds of electronic elements are integrated with the sensor holder 424 so that the sensor holder 424 can be made to function as an integral-type sensor. As a result, the degree of freedom for the position of the sensor holder 424 to be attached to the bearing unit with sensor can be improved, so that the space for attaching the sensor holder 424 can be reduced compared with the background art.

According to the tenth embodiment, there can be provided a bearing unit with sensor having at least one compact sensor which can detect the condition of the bearing (initial condition in which abnormal vibration or failure occurs) accurately.

What is claimed is:

1. A bearing unit comprising:
a detection sensor unit for detecting a running condition of said bearing unit, and one or more relay unit for receiving and then transmitting the detected data from said detection sensor unit,
wherein
said detection sensor unit has a function for transmitting or transmitting/receiving a data with the external,
the number of said relay unit is less than the number of said detection sensor unit, and
said one or more relay unit transmits a detection signal of said detection sensor unit by wireless transmission.

2. The bearing unit according to claim 1, wherein said relay unit is provided with a communicating unit for converting the data from said sensor detection unit into a predetermined frequency component signal wave to transmit said data externally by wireless transmission.

3. The bearing unit according to claim 2, wherein
the signal wave is one of a radio wave, a light wave and an ultrasonic wave with a predetermined frequency component.

4. The bearing unit according to claim 1, wherein
said sensor detection unit is provided with a communicating unit for converting the data into a signal with a predetermined frequency component to transmit said data to said relay unit by wireless transmission.

5. The bearing unit according to claim 4, wherein
said relay unit is provided with a communicating unit for converting the data from said sensor detection unit into a predetermined frequency component signal wave to transmit said data externally by wireless transmission.

6. The bearing unit according to claim 4, wherein
the signal wave is one of a radio wave, a light wave and an ultrasonic wave with a predetermined frequency component.
7. The bearing unit according to claim 1, wherein
said sensor detection unit accommodates at least one of an vibration sensor, a temperature sensor and a rotation speed sensor in a single sensor holder.
8. The bearing unit according to claim 1, wherein
said relay unit converts an output signal from said sensor into a signal suitable for amplifying or long-distance transmitting, and transmits said output signal to a control apparatus mounted externally.
9. The bearing unit according to claim 8, wherein
said relay unit is provided with an amplifying circuit for amplifying an output signal from said sensor.
10. The bearing unit according to claim 8, wherein
said relay unit is provided with a circuit for converting an output signal from said sensor into a current output.
11. The bearing unit according to claim 1, wherein
said detection sensor unit adds an identification number specific to the data and transmits said identification number.
12. The bearing unit according to claim 11, wherein
the number of said relay units is less than the number of a plurality of signals having identification numbers.
13. The bearing unit according to claim 1, wherein
said bearing unit includes a housing provided with a rolling bearing,
at least one of said detection sensor unit is provided with at least one of a rolling wheel of said rolling bearing, a member in contact with said rolling wheel, a stating wheel and a member in contact with said stating wheel,
said housing is provided with said relay unit, and
the detection data from said detection sensor unit is transmitted to said transmitting unit.
14. The bearing unit according to claim 1, wherein
said detection sensor unit and said relay unit are electrically connected by using electromagnetic induction,
said detection sensor unit is provided with a modulating circuit for modulating the detected data to a predetermined modulated signal,
said relay unit is provided with a demodulating circuit for demodulating the modulated signal.
15. The bearing unit according to claim 1, further comprising:
a PHS or a cellular phone for receiving a signal from said relay unit.
16. The bearing unit according to claim 15, wherein
a signal received by a PHS or a cellular phone is managed via a telephone network or an internet.
17. A bearing unit comprising
a detection sensor unit for detecting a running condition of said bearing unit, and
one or more relay unit for receiving and then transmitting the detected data from said detection sensor unit,
wherein
said relay unit is provided with a circuit for reducing an impedance of an output signal from said sensor.
18. The bearing unit according to claim 17, wherein,
said relay unit converts an output signal from said sensor into a signal suitable for amplifying or long-distance transmitting, and transmits to a control apparatus mounted externally.
19. The bearing unit according to claim 18, wherein,
said relay unit is provided with an amplifying circuit for amplifying an output signal from said sensor.
20. The bearing unit according to claim 18, wherein,
said relay unit is provided with a circuit for converting an output signal from said sensor into a current output.
21. The bearing unit according to claim 18, wherein
said relay unit is provided with a circuit for converting an output signal from said sensor into a current output.
22. The bearing unit according to claim 17, wherein
said detection sensor unit adds an identification number specific to the detected data and transmits thereof.
23. The bearing unit according to claim 22, wherein
the number of said relay units is less than the number of a plurality of signals having identification numbers.
24. The bearing unit according to claim 22, wherein
the number of said relay units is less than the number of said detection sensor units.
25. A linear motion unit comprising:
a detection sensor unit for detecting a running condition of a ball screw or a linear guide, and
one or more relay unit for receiving and then transmitting the detected data from said detection sensor unit,
wherein
said detection sensor unit has a function for transmitting or transmitting/receiving a data with the external,
the number of said relay unit is less than the number of said detection sensor unit, and
said one or more relay unit transmits a detection signal of said detection sensor unit by wireless transmission.
26. The linear motion unit according to claim 25, wherein
said relay unit is provided with a communicating unit for converting the data from said sensor detection unit into a predetermined frequency component signal wave to transmit the data externally by wireless transmission.
27. The linear motion unit according to claim 26, wherein
the signal wave is one of a radio wave, a light wave and an ultrasonic wave with a predetermined frequency component.
28. The linear motion unit according to claim 25, wherein
said sensor detection unit is provided with a communicating unit for converting the data into a signal with a predetermined frequency component to transmit the data to said relay unit by wireless transmission.
29. The linear motion unit according to claim 28, wherein
said relay unit is provided with a communicating unit for converting the data from said sensor detection unit into a predetermined frequency component signal wave to transmit the data externally by wireless transmission.
30. The linear motion unit according to claim 28, wherein
the signal wave is one of a radio wave, a light wave and ultrasonic wave with a predetermined frequency component.
31. The linear motion unit according to claim 25, wherein
said sensor detection unit accommodates at least one of an vibration sensor, a temperature sensor and a rotation speed sensor in a single sensor holder.
32. The linear motion unit according to claim 25, wherein
said relay unit converts an output signal from said sensor into a signal suitable for amplifying or long-distance transmitting, and transmits to a control apparatus mounted externally.
33. The linear motion unit according to claim 32, wherein
said relay unit is provided with an amplifying circuit for amplifying an output signal from said sensor.
34. The linear motion unit according to claim 32, wherein
said relay unit is provided with a circuit for converting an output signal from said sensor into a current output.

35. The linear motion unit according to claim 25, wherein
said detection sensor unit adds an identification number specific to the data and transmits said identification number.

36. The linear motion unit according to claim 35, wherein the number of said relay units is less than the number of a plurality of signals having identification numbers.

37. The linear motion unit according to claim 25, wherein
said linear motion unit includes a housing provided with a rolling bearing,
at least one of said detection sensor unit is provided with at least one of a rolling wheel of said rolling bearing, a member in contact with said rolling wheel, a stating wheel and a member in contact with said stating wheel,
said housing is provided with said relay unit, and
the detection data from said detection sensor unit is transmitted to said transmitting unit.

38. The linear motion unit according to claim 25, wherein
said detection sensor unit and said relay unit are electrically connected by using electromagnetic induction,
said detection sensor unit is provided with a modulating circuit for modulating the detected data to a predetermined modulated signal, and
said relay unit is provided with a demodulating circuit for demodulating the modulated signal.

39. The linear motion unit according to claim 25, further comprising:
a PHS or a cellular phone for receiving a signal from said relay unit.

40. The linear motion unit according to claim 39, wherein
a signal received by a PHS or a cellular phone is managed via a telephone network or an internet.

41. A linear motion unit comprising:
a detection sensor unit for detecting a running condition of a ball screw or a linear guide, and
one or more relay unit for receiving and then transmitting the detected data from said detection sensor unit,
wherein
said one or more relay unit is provided with a circuit for reducing an impedance of an output signal from said sensor.

42. The bearing unit according to claim 41, wherein
said relay unit converts an output signal from said sensor into a signal suitable for amplifying or long-distance transmitting, and transmits to a control apparatus mounted externally.

43. The bearing unit according to claim 42, wherein
said relay unit is provided with an amplifying circuit for amplifying an output signal from said sensor.

44. The bearing unit according to claim 41, wherein
said detection sensor unit adds an identification number specific to the detected data and transmits thereof.

45. The bearing unit according to claim 44, wherein
the number of said relay units is less than the number of a plurality of signals having identification numbers.

46. The bearing unit according to claim 44, wherein the number of relay units is less than the number of said detection sensor units.

* * * * *